(12) United States Patent
Wetzstein et al.

(10) Patent No.: US 10,951,875 B2
(45) Date of Patent: Mar. 16, 2021

(54) DISPLAY PROCESSING CIRCUITRY

(71) Applicant: Raxium, Inc., Fremont, CA (US)

(72) Inventors: Gordon Wetzstein, Palo Alto, CA (US); Andrew Victor Jones, San Jose, CA (US); Tomi Petteri Maila, San Jose, CA (US); Kari Pulli, Belmont, CA (US); Ryan Phillip Spicer, San Jose, CA (US)

(73) Assignee: Raxium, Inc., Fremont, CA (US)

( * ) Notice: Subject to any disclaimer, the term of this patent is extended or adjusted under 35 U.S.C. 154(b) by 0 days.

(21) Appl. No.: 16/460,880

(22) Filed: Jul. 2, 2019

(65) Prior Publication Data

US 2020/0014904 A1 Jan. 9, 2020

Related U.S. Application Data

(60) Provisional application No. 62/693,607, filed on Jul. 3, 2018.

(51) Int. Cl.
*H04N 13/167* (2018.01)
*G06K 9/62* (2006.01)
(Continued)

(52) U.S. Cl.
CPC ......... *H04N 13/167* (2018.05); *G06K 9/6267* (2013.01); *G06N 3/08* (2013.01);
(Continued)

(58) Field of Classification Search
None
See application file for complete search history.

(56) References Cited

U.S. PATENT DOCUMENTS

| 5,349,379 A | 9/1994 | Eichenlaub |
| 5,905,521 A | 5/1999 | Gatto et al. |

(Continued)

FOREIGN PATENT DOCUMENTS

| TW | 202014876 A | 4/2020 |
| WO | 2018014040 A1 | 1/2018 |

(Continued)

OTHER PUBLICATIONS

International Invitation to Pay Additional Fees and, Where Applicable, Protest Fee corresponding to International Application No. PCT/US2019/040474, dated Oct. 11, 2019.

(Continued)

*Primary Examiner* — Duane N Taylor, Jr.
(74) *Attorney, Agent, or Firm* — KPPB LLP

(57) ABSTRACT

The disclosure describes aspects of a display processing circuitry. In an aspect, one or more displays that support multiple views include one or more arrays of pixels, one or more backplanes, and a processing circuitry configured to receive one or more data streams, control processing of the data streams based on policies from which to select a mode of operation, each mode of operation defining which rays of light the arrays of pixels in the displays are to contribute to generate a particular view or views and the tasks to be performed by the processing circuitry to modify the data streams accordingly. The processing circuitry further provides signaling representative of the modified data streams to the arrays of pixels through a circuit configuration of the backplanes for the arrays of pixels to contribute the rays that will to generate the particular view or views. A corresponding method is also described.

125 Claims, 18 Drawing Sheets

(51) Int. Cl.

| | | |
|---|---|---|
| *H04N 13/128* | (2018.01) | |
| *H04N 13/15* | (2018.01) | |
| *H04N 13/32* | (2018.01) | |
| *H04N 13/327* | (2018.01) | |
| *H04N 13/383* | (2018.01) | |
| *H04N 13/178* | (2018.01) | |
| *H04N 13/324* | (2018.01) | |
| *H04N 13/139* | (2018.01) | |
| *H04N 13/194* | (2018.01) | |
| *H04N 13/398* | (2018.01) | |
| *G06N 3/08* | (2006.01) | |
| *G06T 3/40* | (2006.01) | |
| *G06T 5/00* | (2006.01) | |
| *G06T 7/00* | (2017.01) | |
| *G06T 7/20* | (2017.01) | |
| *H04N 7/01* | (2006.01) | |

(52) U.S. Cl.
CPC ............ *G06T 3/4053* (2013.01); *G06T 5/009* (2013.01); *G06T 7/0002* (2013.01); *G06T 7/20* (2013.01); *H04N 7/0117* (2013.01); *H04N 13/128* (2018.05); *H04N 13/139* (2018.05); *H04N 13/15* (2018.05); *H04N 13/178* (2018.05); *H04N 13/194* (2018.05); *H04N 13/32* (2018.05); *H04N 13/324* (2018.05); *H04N 13/327* (2018.05); *H04N 13/383* (2018.05); *H04N 13/398* (2018.05); *G06T 2207/10021* (2013.01); *G06T 2207/20081* (2013.01); *G06T 2207/20084* (2013.01); *G06T 2207/20208* (2013.01)

(56) References Cited

U.S. PATENT DOCUMENTS

| | | | |
|---|---|---|---|
| 9,448,459 | B2 * | 9/2016 | Pijlman .................... G02F 1/29 |
| 2005/0053135 | A1 | 3/2005 | Haskell et al. |
| 2008/0231805 | A1 | 9/2008 | Schwerdtner |
| 2010/0149313 | A1 | 6/2010 | Kroll et al. |
| 2010/0303294 | A1 | 12/2010 | Zschau |
| 2012/0194508 | A1 | 8/2012 | Panas et al. |
| 2013/0063424 | A1 | 3/2013 | Ueki et al. |
| 2013/0154498 | A1 | 6/2013 | Missbach |
| 2014/0361990 | A1 | 12/2014 | Leister |
| 2015/0100530 | A1 | 4/2015 | Mnih et al. |
| 2016/0021355 | A1 | 1/2016 | Alpaslan et al. |
| 2016/0301918 | A1 * | 10/2016 | Mukhtarov ........... H04N 13/359 |
| 2016/0301921 | A1 * | 10/2016 | Zhang .................... G02F 1/137 |
| 2017/0237970 | A1 | 8/2017 | Karafin et al. |
| 2017/0316736 | A1 | 11/2017 | Hughes et al. |
| 2018/0269234 | A1 | 9/2018 | Hughes et al. |
| 2018/0356591 | A1 | 12/2018 | Karafin et al. |
| 2018/0372926 | A1 | 12/2018 | Karafin et al. |
| 2018/0372958 | A1 | 12/2018 | Karafin et al. |
| 2019/0004228 | A1 | 1/2019 | Bevensee et al. |
| 2019/0004319 | A1 | 1/2019 | Karafin et al. |
| 2019/0004326 | A1 | 1/2019 | Karafin et al. |
| 2019/0011621 | A1 | 1/2019 | Karafin et al. |
| 2019/0064435 | A1 | 2/2019 | Karafin et al. |

FOREIGN PATENT DOCUMENTS

| | | |
|---|---|---|
| WO | 2018014044 A1 | 1/2018 |
| WO | 2018014045 A2 | 1/2018 |
| WO | 2018014048 A2 | 1/2018 |
| WO | 2019140269 A1 | 7/2019 |
| WO | 2019140343 A1 | 7/2019 |
| WO | 2019140346 A2 | 7/2019 |
| WO | 2019140347 A1 | 7/2019 |
| WO | 2019140348 A2 | 7/2019 |
| WO | 2019140398 A1 | 7/2019 |
| WO | 2019140405 A1 | 7/2019 |
| WO | 2019140413 A1 | 7/2019 |
| WO | 2019140414 A1 | 7/2019 |
| WO | 2019140416 A2 | 7/2019 |
| WO | 2020010183 A2 | 1/2020 |
| WO | 2020010183 A3 | 2/2020 |

OTHER PUBLICATIONS

Peemen, M.C.J., "Improving the efficiency of deep convoluational networks", PhD Thesis, Oct. 12, 2017, pp. 1-171; [URL: https://pure.tue.nl/ws/files/77700147/20171012_Peemen.pdf].

"Autostereoscopic system delivers 3-D images using cylindrical lenses", VisionSystems Design, May 1, 2000, Retrieved from: https://www.vision-systems.com/articles/print/volume-5/issue-5/applications/spotlight/autostereoscopic-system-delivers-3-d-images-using-cylindrical-lenses.html, 14 pgs.

"The Parallel Reality Technology", MisappliedSciences, Retrieved from: misappliedsciences.com/Home/Technology, Retrieved on May 10, 2019, 7 pgs.

Aksit et al., "Light Engine and Optics for Helium3D Auto-Stereoscopic Laser Scanning Display", 2011 3DTV Conference: The True Vision—Capture, Transmission and Display of 3 D Video, May 16-18, 2011, Antalya, Turkey, 4 pgs.

Algorri et al., "Liquid Crystal Microlenses for Autostereoscopic Displays", Materials, vol. 9, No. 36, 2016, DOI: 10.3390/ma9010036, 17 pgs.

Bates et al., "Building an Autostereoscopic Multiple-Viewer Television Display", 8th Asian Symposium on Information Display, Nanjing, Jiangsu, China, Feb. 14-17, 2004, 4 pgs.

Buckley et al., "Multi-Viewer Autostereoscopic Display with Dynamically-Addressable Holographic Backlight", Apr. 2009, DOI: 10.1889/JSID17.4.345, 6 pgs.

De La Barre, Rene, "Adapting of Electronic Image Content for Autostereoscopic Presentation", Fraunhofer Heinrich Hertz Institute, White paper, Jan. 2010, 16 pgs.

Dodgson, "Analysis of the viewing zone of multi-view autostereoscopic displays", Stereoscopic Displays and Applications XIII, Jan. 21-23, 2002, San Jose, CA, 12 pgs.

Dodgson, "On the number of viewing zones required for head-tracking autostereoscopic display", Proceedings of SPIE, The International Society for Optical Engineering, Feb. 2006, 12 pgs.

Dodgson, Neil, "Autostereoscopic 3D Displays", IEEE Computer Society, Aug. 2005, pp. 31-36.

Halle, Michael, "Autostereoscopic displays and computer graphics", Computer Graphics, ACM SIGGRAPH, vol. 31, No. 2, May 1997, pp. 58-62.

Jones et al., "Interpolating Vertical Parallax for an Autostereoscopic 3D Projector Array", Journal of Electronic Imaging, vol. 23, No. 1, Mar. 5, 2014, 20 pgs.

Jurik et al., "Prototyping a Light Field Display Involving Direct Observation of a Video Projector Array", CVPR 2011 Workshops, Jun. 20-25, 2011, Colorado Springs, CO, 6 pgs.

Kang et al., "Feasibility of Eye-tracking based Glasses for 3D Autostereoscopic Display Systems for Medical 3D Images", In the Proceedings of the 9th International Joint Conference on Biomedical Engineering Systems and Technologies, vol. 2, 2016, pp. 134-138.

Kellnhofer et al., "GazeStereo3D: Seamless Disparity Manipulations", SIGGRAPH 2016 Technical Paper, Jul. 24-28, 2016, Anaheim, CA, 13 pgs.

Kooima et al., "A Multi-view Tiled Autostereoscopic Virtual Reality Display", VRST 2010: Proceedings of the 17th ACM Symposium on Virtual Reality Software and Technology, Nov. 2010, 4 pgs.

Lee et al., "Autostereoscopic 3D display using directional subpixel rendering", Optics Express, vol. 26, No. 16, Aug. 6, 2018, 15 pgs.

Li et al., "Enhancing 3D Applications Using Stereoscopic 3D and Motion Parallax", Proceedings of the Thirteenth Australasian User Interface Conference, Melbourne, Australia, Jan. 2012, pp. 59-68.

Perlin et al., "An Autostereoscopic Display", SIGGRAPH, New Orleans, LA, Jul. 23-28, 2000, 8 pgs.

(56) References Cited

OTHER PUBLICATIONS

Surman et al., "A Road Map for Autostereoscopic Multi-Viewer Domestic TV Displays", 2006 IEEE International Conference on Multimedia and Expo, Jul. 9-12, 2006, Toronto, Canada, 4 pgs.

Surman et al., "Head tracked retroreflecting 3D display", Journal of the Society for Information Display, 2015, DOI: 10.1002/jsid.295, 13 pgs.

Surman et al., "Head Tracked Single and Multi-user Autostereoscopic Displays", The 3rd European Conference on Visual Media Production, Part of the 2nd Multimedia Conference 2006, Nov. 29-30, 2006, London, UK, 9 pgs.

Surman et al., "Muted and HELIUM3D autostereoscopic displays", 2010 IEEE International Conference on Multimedia and Expo, Jul. 19-23, 2010, Suntec City, SG, 6 pgs.

Urey et al., "State of the Art in Stereoscopic and Autostereoscopic Displays", Proceedings of the IEEE, vol. 99, No. 9, Apr. 2011, pp. 540-555.

Willman et al., "16.4: The Optics of an Autostereoscopic Multiview Display", DOI: 10.1889/1.3500412, 2010, 4 pgs.

Woodgate et al., "Observer Tracking Autostereoscopic 3D Display Systems", Signal Process: Image Communication, vol. 14, Issue No. 1-2, Nov. 6, 1998, 10 pgs.

Woods, Andrew, "How are Crosstalk and Ghosting defined in the Stereoscopic Literature", Proceedings of SPIE Stereoscopic Displays and Applications XXII, vol. 7863, 2011, 12 pgs.

International Search Report and Written Opinion corresponding to International Application No. PCT/US2019/040474, dated Jan. 16, 2020.

NHK Science and Technical Research Laboratories, "Annual Report 2017", Japan Broadcasting Corporation, May 1, 2018 (60 pages).

\* cited by examiner

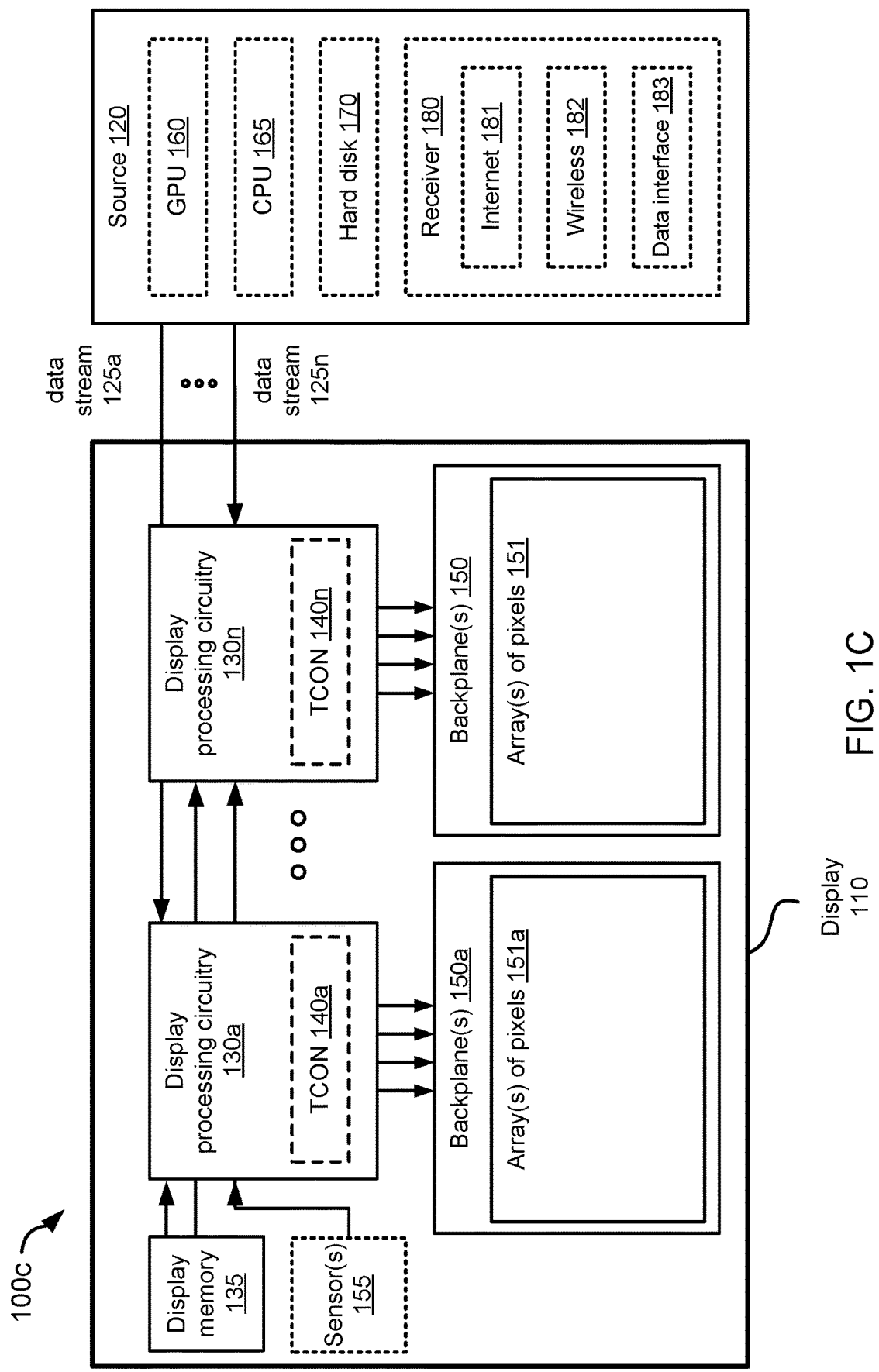

DISPLAY PROCESSING CIRCUITRY

CROSS REFERENCE TO RELATED APPLICATIONS

The present application claims priority to and the benefit of U.S. Provisional Application No. 62/693,607, entitled "DISPLAY PROCESSING UNIT," and filed on Jul. 3, 2018, the contents of which are incorporated herein by reference in their entirety.

BACKGROUND OF THE DISCLOSURE

Aspects of the present disclosure generally relate to displays, and more specifically, to a display processing unit that processes content within a display.

Ultra-high-resolution displays, high-dynamic-range (that is, high-contrast) displays, and light field (that is, glasses-free 3D) displays suffer from a lack of existing content. Whereas novel cameras and computer-generated content may allow this content to be produced in the future, there is a need for offline and on-the-fly processing of legacy content and other types of content to, for example, up-sample resolution, convert low-dynamic-range content into high-dynamic-range content, and convert two-dimensional (2D) images or 2D images with depth information, to high-resolution, high-dynamic-range, and/or light field data for display.

Moreover, there is limited bandwidth offered by existing standards (e.g., HDMI or DisplayPort) for transferring data from the central processing unit (CPU) or graphics processing unit (GPU) to the display itself. The bandwidth required by emerging ultra-high-resolution display panels, high-dynamic-range displays, and light field displays require orders of magnitude more data to be transferred between the CPU or GPU to the display. While future standards or future evolution of existing standards may enable more bandwidth, the limitations of current standards may necessitate that a significant amount of image processing be performed directly on the display after data is transferred to the display.

Some existing displays may perform simple interpolation (e.g., linear, cubic interpolations) to improve the spatial and temporal resolution of video and they may scale an image to improve the contrast or dynamic range, but there is a need for more sophisticated image and video processing with low latency, with low power consumption, and with high quality.

Smart TVs (see, e.g., U.S. Pat. No. 5,905,521) use integrated hardware to connect television displays to a processing unit and network connection. This technology enables the streaming of multimedia content to accompany conventional broadcasts. Set-top boxes (e.g., Apple TV, Google ChromeCast, Amazon FireTV) and gaming consoles (e.g., Microsoft Xbox, Sony PlayStation, Nintendo Wii U) use dedicated central processing unit/graphics processing units (CPU/GPUs) to record, stream, and navigate multiple sources of over-the-air, cable, gaming, and internet content with a common interface. However the resolution of these systems is still limited by current display protocols, and these systems do not provide processing of 2D, three-dimensional (3D), and light field content.

New standards have been developed for transmission and streaming of high-dynamic-range content (HDR10, HDR10+, Hybrid-Log-Gamma) by encoding additional metadata, bit depth, and extended transfer functions such as SMPTE ST280 in the transmitted video. While support for these standards in new displays may improve the dynamic range and contrast for newly-generated content, the standards do not address the need to upconvert existing low-dynamic-range legacy content to existing low-dynamic-range legacy content.

Accordingly, techniques and devices are desirable that enable effective handling of different types of content in different types of displays, particularly when large amounts of data are needed.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In an aspect of this disclosure, one or more displays that support multiple view are described that include one or more arrays of pixels, one or more backplanes coupled to the one or more arrays of pixels, and processing circuitry coupled to the one or more backplanes, where the processing circuitry is configured to receive one or more data streams, control processing of the one or more data streams based on policies from which to select a mode of operation supported by the processing circuitry, each mode of operation defining which rays of light the one or more arrays of pixels in the one or more displays are to contribute to generate a particular view or views and the tasks to be performed by the processing circuitry to modify the one or more data streams such that the one or more arrays of pixels contribute the rays of light that will generate the particular view or views of the mode of operation, and provide signaling representative of the modified one or more data streams to the one or more arrays of pixels through a circuit configuration of the one or more backplanes for the one or more arrays of pixels to contribute the rays that will to generate the particular view or views of the mode of operation.

In another aspect of this disclosure, a method for processing data streams on one or more displays that support multiple views is described that includes receiving one or more data streams on a processing circuitry of the one or more displays, the processing circuitry being coupled to one or more backplanes of the one or more displays, which in turn are coupled to one or more arrays of pixels of the one or more displays; controlling, by the processing circuitry, processing of the one or more data streams based on policies from which to select a mode of operation supported by the processing circuitry, each mode of operation defining which rays of light the one or more arrays of pixels in the one or more displays are to contribute to generate a particular view or views and the tasks to be performed by the processing circuitry for modifying the one or more data streams such that the one or more arrays of pixels contribute the rays of light that will generate the particular view or views of the mode of operation; and providing, by the processing circuitry, signaling representative of the modified one or more data streams to the one or more arrays of pixels through a circuit configuration of the one or more backplanes for the one or more arrays of pixels to contribute the rays that will generate the particular view or views of the mode of operation.

In an aspect of the disclosure, processing circuitry to process content within a display (also referred to as display processing circuitry or unit) includes an input component configured to receive the content from a source, a processing component configured to implement and execute one or more neural networks to perform a set of tasks that modify the content for presentation by the display, the one or more neural networks being implemented using multiple weights stored in a memory of the display, and an output component configured to provide the modified content to a respective panel in the display.

In an aspect of the disclosure, a method for processing circuitry to process content within a display (e.g., display processing circuitry or unit) includes receiving, at an input component of the processing unit, the content from a source, implementing, at a processing component of the processing unit, one or more neural networks, the one or more neural networks being implemented using multiple weights stored in a memory of the display, performing, by executing the one or more neural networks, a set of tasks that modify the content for presentation by the display, and providing, by an output component of the processing unit, the modified content to a respective panel in the display.

BRIEF DESCRIPTION OF THE DRAWINGS

The appended drawings illustrate only some implementation and are therefore not to be considered limiting of scope.

FIG. 1C illustrates an example of multiple display processing circuitries in a display, in accordance with aspects of this disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

Figure 1A:
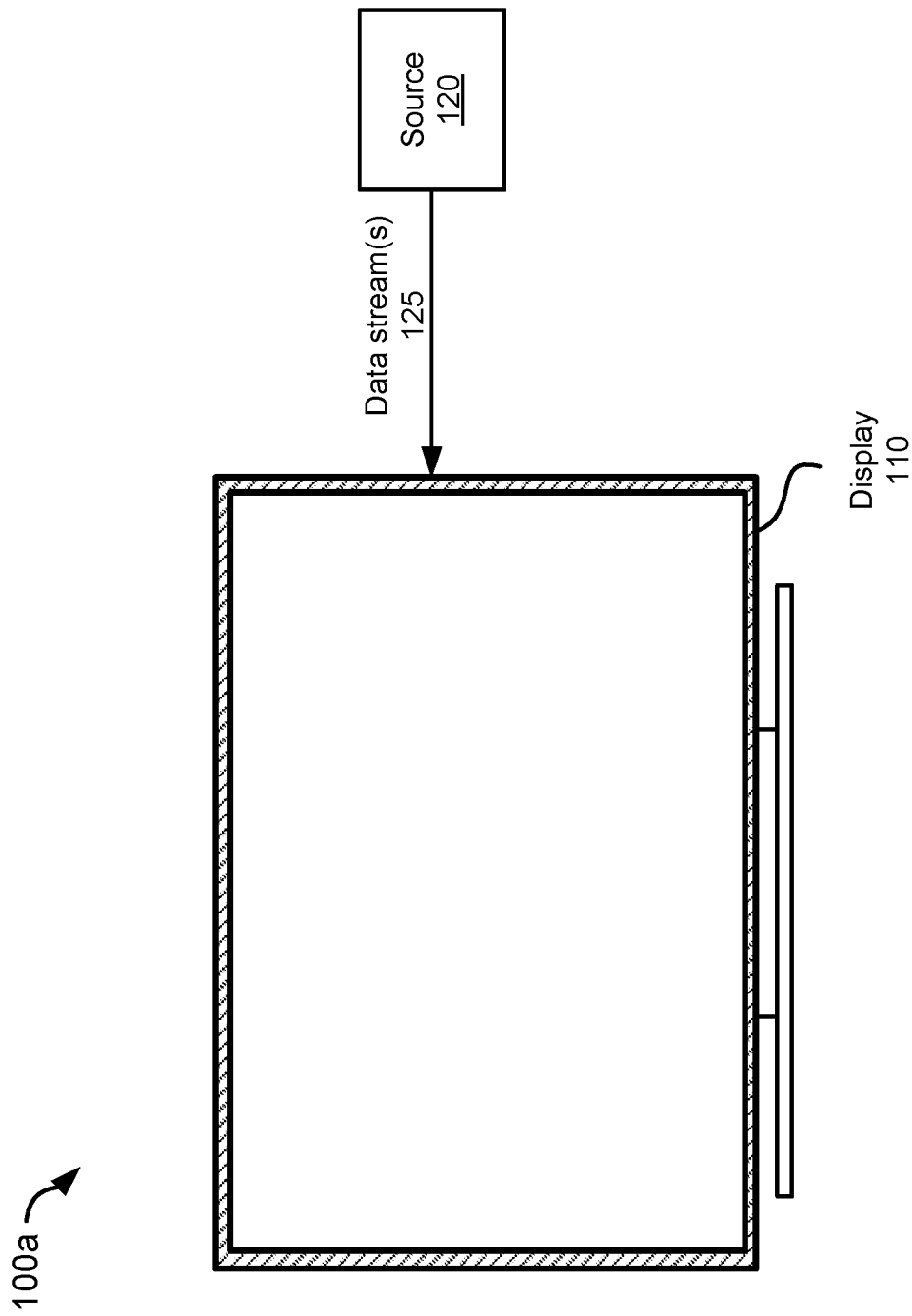
FIG. 1A illustrates an example of a display and a source of data streams for the display, in accordance with aspects of this disclosure.
Figure 1B:
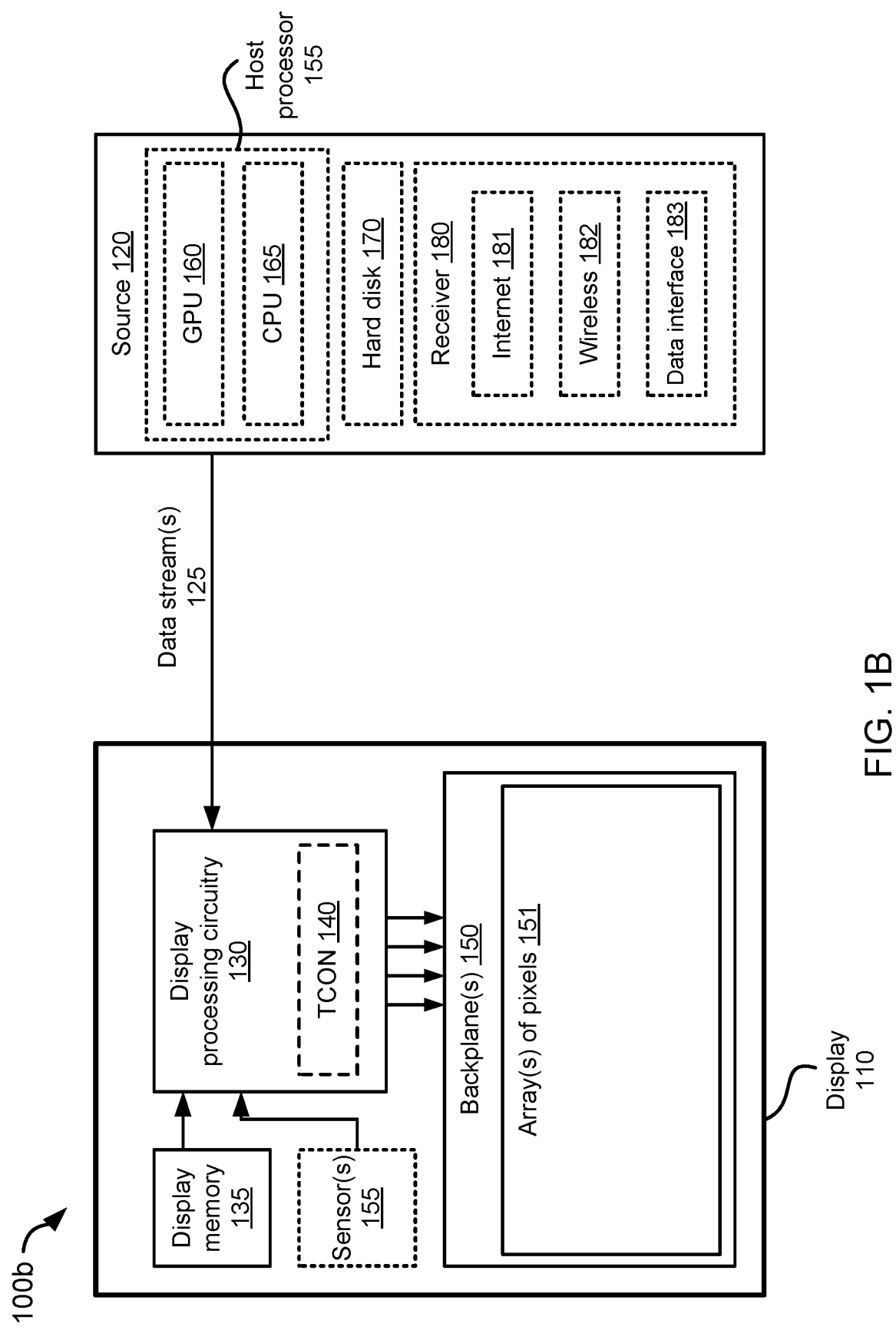
FIG. 1B illustrates an example of a display processing circuitry in a display, in accordance with aspects of this disclosure.

In current display systems, a source of content or data can include a central processing unit (CPU) and/or a graphics processing unit (GPU) (see, e.g., FIGS. 1B and 1C). The source can receive user input, three-dimensional (3D) models, video, or other content, and can render computer-generated (CG) content and process the content or data. The source can provide the content/data to a display through a digital visual interface (DVI), a high-definition multimedia interface (HDMI), DisplayPort (DP), embedded DisplayPort (eDP), or any other data interface suitable for transferring content/data to the display. In one example, HDMI 2.1 may be used for content/data transfer, which supports 42 Gb/s data rate and 8-16 bits per color (bpc). For 8 pbc, 4K@144 Hz and/or 8K@30 Hz can be supported, while for 10 bpc (HDR10), 4K@144 Hz and/or 8K@30 Hz can be supported. In another example, DisplayPort 1.4 may be used for content/data transfer, which supports 25.92 Gb/s and 8-10 bpc. For 8 pbc, 4K@144 Hz and/or 8K@30 Hz can be supported. In yet another example, USB-C 3.1 may be used as an alternative to DP 1.4 for transferring content/data to a display.

Current displays may include a driver board that provides color management, data conversion, and optionally, an LED backlight driver for the panel(s). The driver board may provide the processed data to a timer controller (TCON) (see, e.g., TCON 140 in FIG. 1B) through low voltage differential signaling (LVDS), a MIPI interface, or eDP, where the TCON in turn drives the panel(s) in the display. LVDS is a serial bus and MIPI display serial interface (DSI) is a protocol that uses LVDS as a transmission method (MIPI DSI handles 1440p @ 60 Hz max).

As mentioned above, current displays or display systems are unable to handle the bandwidth required by emerging ultra-high-resolution display panels, high-dynamic-range displays, and light field displays, and are also limited in their ability to handle different types of content or data. For example, for light field displays where multiple views are possible, a 4K display (e.g., 4K UHD with 3840×2160=8,294,400,00 pixels) with 100 views, 10 bits-per-pixel (bpp), and 60 Hz would require 497,664,000,000 bits (or 62,208,000,000 bytes, 60,750,000 kbytes, 59,327 mbytes) per second. Various techniques implemented within a display to enable effective handling of different types of content in different types of displays are described in more detail below in connection with FIGS. 1A-9.

FIG. 1A shows a diagram 100a that illustrates an example of a display 110 that receives content/data or other information in one or more data streams 125 (e.g., image content, video content, or both) from a source 120. The display 110 may include one or more panels (e.g., an array of elements), where each panel in the display 110 is a light-emitting panel, a light reflective panel, a light transmissive panel, a light modifying panel. When light-emitting panels are used they can include multiple light-emitting elements (see, e.g., light-emitting elements 225 in FIG. 2A). These light-emitting elements can be light-emitting diodes (LEDs) made from one or more semiconductor materials. The LEDs can be an inorganic LEDs. The LEDs can be, for example, micro-LEDs, also referred to as microLEDs, mLEDs, or µLEDs. Other display technologies from which the light-emitting elements can be made include as liquid crystal display (LCD) technology or organic LED (OLED) technology. The terms "light-emitting element," "light emitter," or simply "emitter," may be used interchangeably in this disclosure. For elements that are non-emitting, the terms "light-reflective element," "light-transmissive element," or "light-modifying element" may be used.

The display 110 can have capabilities that include ultra-high-resolution capabilities (e.g., support for resolutions of 8K and higher), high-dynamic-range (e.g., high-contrast) capabilities, and/or light field capabilities (e.g., capable of contributing rays that are perceived as one or more views). When the display 110 has light field capabilities and can operate as a light field display, the display 110 can include multiple picture elements (e.g., super-raxels), where each picture element has a respective light-steering optical element and an array of light-emitting elements (e.g., sub-raxels) integrated on a same semiconductor substrate, and where the light-emitting elements in the array are arranged into separate groups (e.g., raxels) to provide multiple views supported by the light field display (see, e.g., FIGS. 2A-2C).

A diagram 100b is shown in FIG. 1B to illustrate additional details of the display 110 and the source 120 in FIG. 1A. It is to be understood that while a single source 120 is shown, the display 110 may be capable of receiving one or more data streams 125 from multiple sources 120. In this example, the source 120 provides the data stream(s) 125 (e.g., with content/data or other information) to a display processing circuitry 130 integrated within the display 110. The terms "display processing circuitry" and "processing circuitry" may be used interchangeably in this disclosure. In addition to the functionality described above for a display source, the source 120 can be configured to stream red-green-blue and depth (RGBD) data from movies or special cameras, and may also render RGBD data from computer generated content. In this regard, the source 120 may provide multi-color data with depth information, where the multi-color data need not be limited to RGB data. The source 120 may provide the data stream(s) 125 though HDMI/DP, for example, and the data stream(s) 125 can include 10-bit high-dynamic-range (HDR) data, or RGBD data, or some other type of data.

The display processing circuitry 130 is configured to process one or more data streams 125 based on policies (e.g., rules or principles embedded in the operation of to the display processing circuitry 130 to guide decisions) from which to select a mode of operation from multiple modes of operation supported by the display processing circuitry 130. The display processing circuitry 130 may be based on a neural network architecture, a fixed-function logic signal processing architecture, a programmable pipeline architecture, or some combination of these. Accordingly, the display processing circuitry 130 may be configured to implement and execute one or more neural networks to perform a set of tasks that modify an image or video content (or some other type of information) in the data stream(s) 125 for presentation by the display 110. The one or more neural networks can be implemented by using multiple weights that are stored in a display memory 135, stored in the display processing circuitry 130, or hard coded in the display processing circuitry 130. The display memory 135, or at least a portion of it, can be integrated with the display processing circuitry 130. The set of tasks that can be performed by the display processing circuitry 130 may include tasks associated with color management, data conversion, and/or multi-view processing operations. It is to be understood that the tasks that can be performed by the display processing circuitry 130 may be more extensive and details of various and varied tasks are described below in more detail. Each of these tasks can be individually selected/enabled or deselected/disabled in the display processing circuitry 130. In some cases, the task or tasks to be performed are selected based on a mode of operation of the display processing circuitry 130, which may be configured to support one or more modes of operations. When multiple modes of operation are supported, a policy controller (not shown) may be used by the display processing circuitry 130 to identify and perform an appropriate mode of operation.

As shown in the diagram 100b in FIG. 1B, the display processing circuitry 130 may include the functionality of a timing controller (TCON) 140, which in turn provides the appropriate information and/or signaling to one or more arrays of pixels 151 through one or more backplanes 150. The TCON 140, as illustrated by the dashed lines, may also be implemented outside or separate from the display processing circuitry 130. In some cases, the architecture of the display processing circuitry 130 is such that a TCON 140 or its functionality is not appropriate and would therefore not be used in connection with the display processing circuitry 130. In one example, a combination of one or more backplanes 150 (or a subset thereof) with one or more arrays of pixels 151 (or a subset thereof) may be referred to as a panel of the display. In some cases, multiple LVDS and/or MIPI interfaces may be used to transfer information to the TCON 140. Similarly, the information or signaling from the TCON 140 to the backplane(s) 150 and the array(s) of pixels 151 can be parallelized as illustrated by the multiple arrows. It is to be understood that the backplane(s) 150 may consist of a single backplane 150 or a group of backplanes 150 that logically operate as a single backplane. Similarly, it is to be understood that the array(s) of pixels 151 may consist of a single array of pixels 151 or a group of arrays of pixels 151 that logically operate as a single array of pixels.

The source 120 can include a GPU 160 and/or a CPU 165. The GPU 160 and the CPU 165 can be part of a host processor 155, which can be implemented separate from the display 110 or can be implemented as an integral component of the display 110. In the latter case, the host processor 155 (and therefore at least part of the source 120) may be part of the display 110. The host processor 155 may be configured to perform a few tasks on the data stream(s) 125 before sent to the display processing circuitry 130, where further tasks are performed on the data stream(s) 125. In one example, the host processor 155 can transmit or transfer image or video content to the display processing circuitry 130 in the display 110 via one or more HDMI or DisplayPort connections. The host processor 155 can transmit or transfer image or video content to the display processing circuitry 130 in the display 110 as 10-bit high-dynamic-range data and including red, green, blue, and depth information (RGBD). The host processor 155 can be configured to perform rasterization or ray-tracing for rendered imagery, depth sensors, or camera arrays to produce real-world image or video content. Moreover, the host processor 155 can be configured to perform data compression of image or video content, or of some other type of information.

Additionally or alternatively, the source 120 can include a hard disk 170 that stores content/data to be provided to the display 110 through the data stream(s) 125. Additionally or alternatively, the source 120 can include a receiver 180 configured to receive content/data from various inputs or connections such as an internet connection 181, a wireless connection 182 (including wireless internet), and a data interface 183, where the content/data is to be provided to the display 110. The data interface 183 can include a digital video interface. The data interface 183 can be a universal serial interface (USB) (e.g., USB-C or USBC) and/or a video graphics array (VGA) interface, for example. Just like the host processor 155, the hard disk 170 and/or the receiver 180 can be implemented separate from the display 110 or can be implemented as an integral component of the display 110.

The display 110 can also include one or more sensors 155 (e.g., audio sensors, microphones, cameras, photosensors, etc.) that can provide information to the display processing circuitry 130, which the display processing circuitry 130 can use in connection with one or more of the various tasks described herein. For example, the display processing circuitry 130 can use the sensor information as part of viewer-specific operations, such as user tracking, described in more detail below. In this example, the one or more sensors 155 may include sensors capable of enabling user or viewer tracking.

FIG. 1C shows a diagram 100c that illustrates an example of the display 110 having multiple display processing circuitries 130. In this example, the source 120 can provide multiple data streams to the display 110, such as a data stream 125a, . . . , data stream 125n. For each of these data streams, there is a respective display processing circuitry 130 such that in the diagram 100c the data stream 125a is received and processed by a display processing circuitry 130a and the data stream 125n is received and processed by a display processing circuitry 130n. Each of the display processing circuitries 130a, . . . , 130n has a corresponding TCON 140 (or the built-in functionality of a TCON 140) and corresponding backplane(s) 150 and array(s) of pixels 151 (although as mentioned above a TCON may not be necessary in some implementations of the display processing circuitry 130). That is, the display processing circuitry 130a may provide processed content/data resulting from the modification of the data stream 125a to corresponding backplane(s) 150a and array(s) of pixels 151a through a TCON 140a. Similarly, the display processing circuitry 130n may provide processed resulting from the modification of the data stream 125n to corresponding backplane(s) 150n and array(s) of pixels 151n through a TCON 140n. The backplane(s)/array(s) of pixels supported by different display processing circuitries 130 may be of the same size or may be of different sizes. Each of the display processing circuitries 130a, . . . , 130n may use information stored in the display memory 135.

In the example illustrated in the diagram 100c, the multiple display processing circuitries 130, the multiple backplane(s) 150, and the multiple array(s) of pixels 151 may be integrated with the display 110. In some instances, such an integrated display 110 may be part of a handheld device, such as a wireless communication device, or a near-eye device, or a much larger display, for example.

Figure 1D:
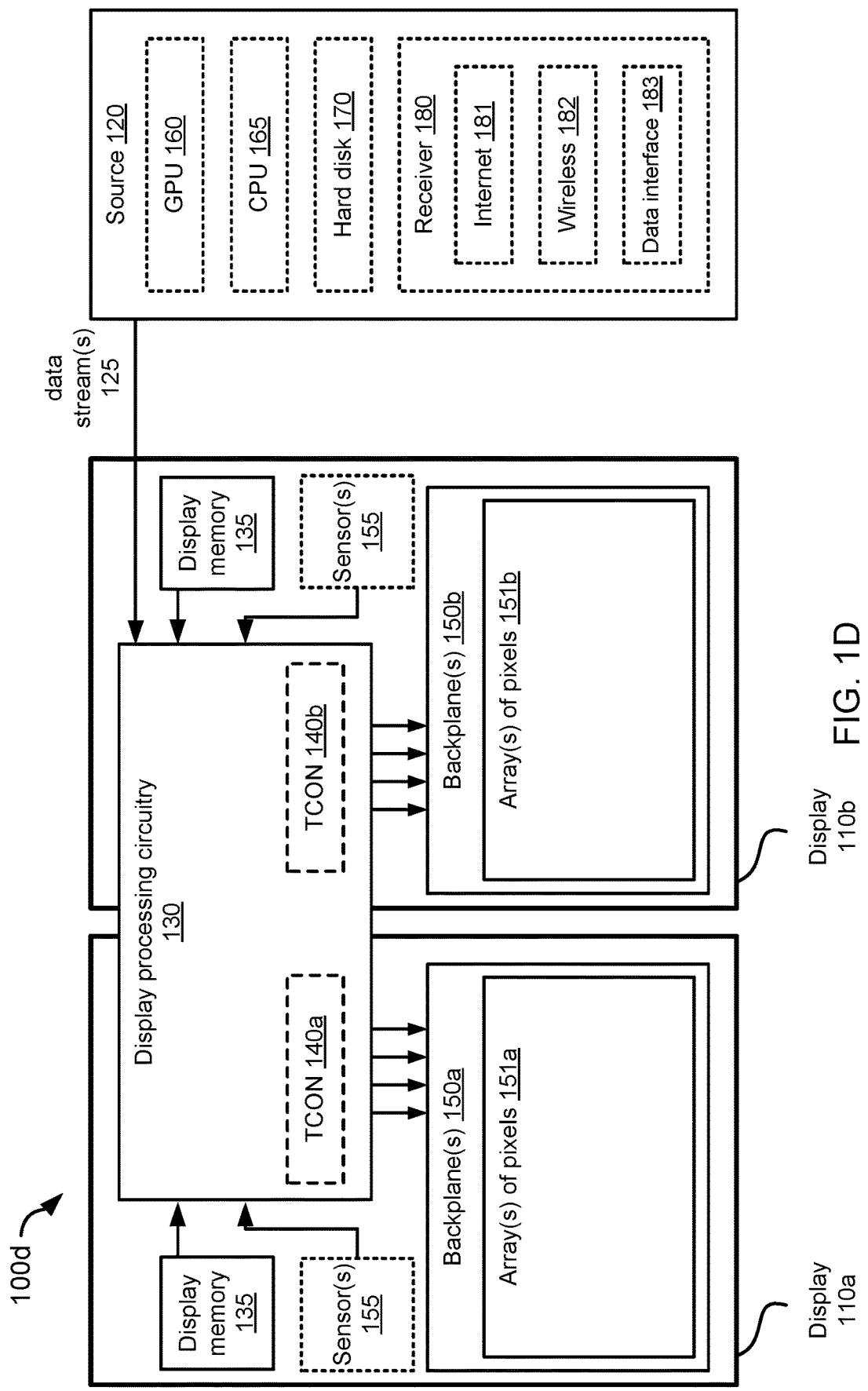
FIG. 1D illustrates an example of one or more displays with a common or shared display processing circuitry, in accordance with aspects of this disclosure.

FIG. 1D shows a diagram 100d that illustrates the case where the display processing circuitry 130 is configured to be used with more than one display 110. In this example, the display processing circuitry 130 may be used in a first display 110a, which includes backplane(s) 150a and array(s) of pixels 151a, while it may be concurrently used in a second display 110b, which includes backplane(s) 150b and array(s) of pixels 151b. Each display may include its own memory (e.g., display memory 135) and/or its own sensors (e.g., sensor(s) 155). The display processing circuitry 130 in this example may receive one or more data streams 125 for processing and to have any modification to the data streams (e.g., to the content/data in the data streams) be provided to the respective backplane(s)/array(s) of pixels for display.

Figure 2A:
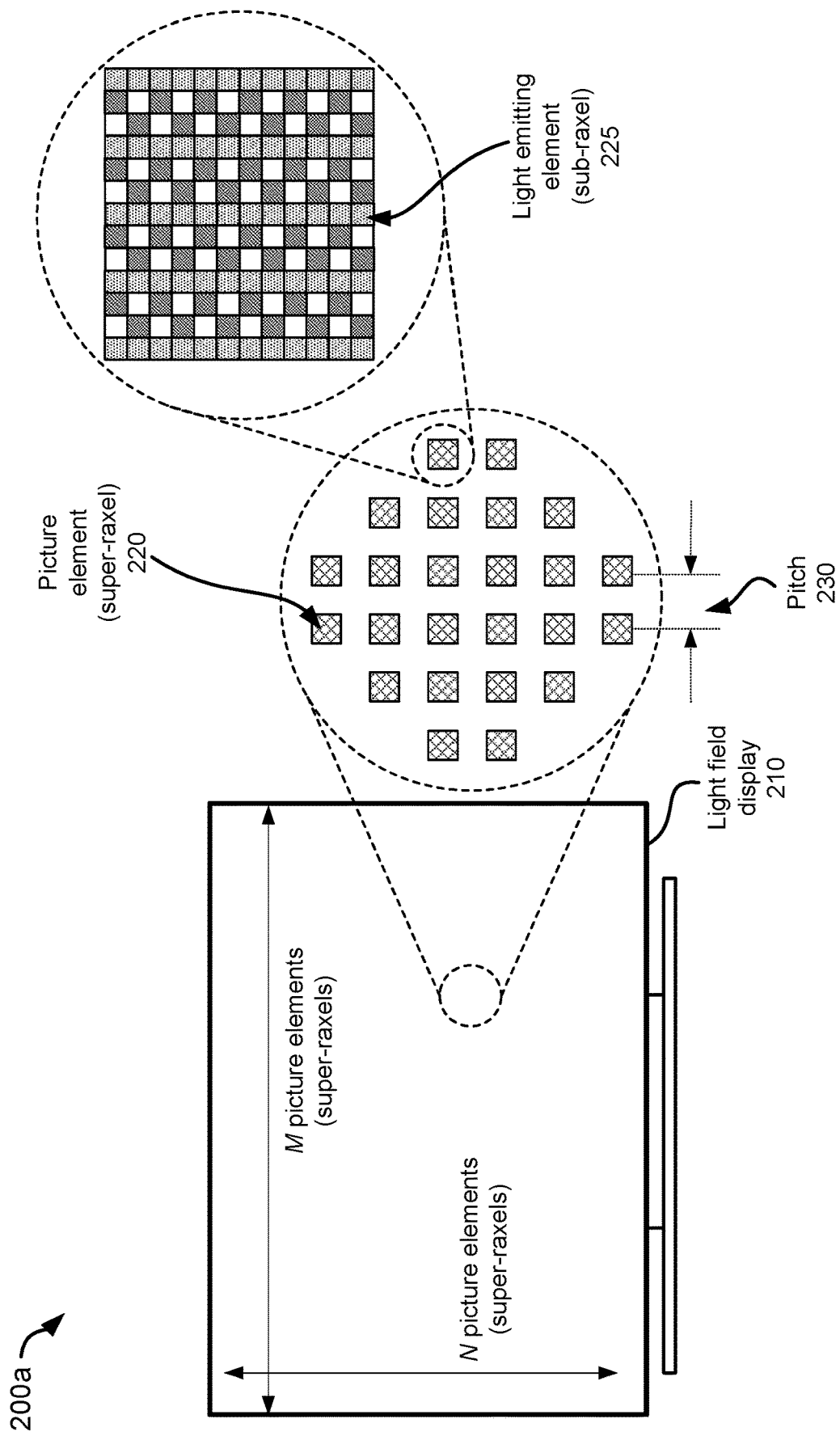
FIG. 2A illustrates an example of a light field display having multiple picture elements, in accordance with aspects of this disclosure.
Figure 2B:
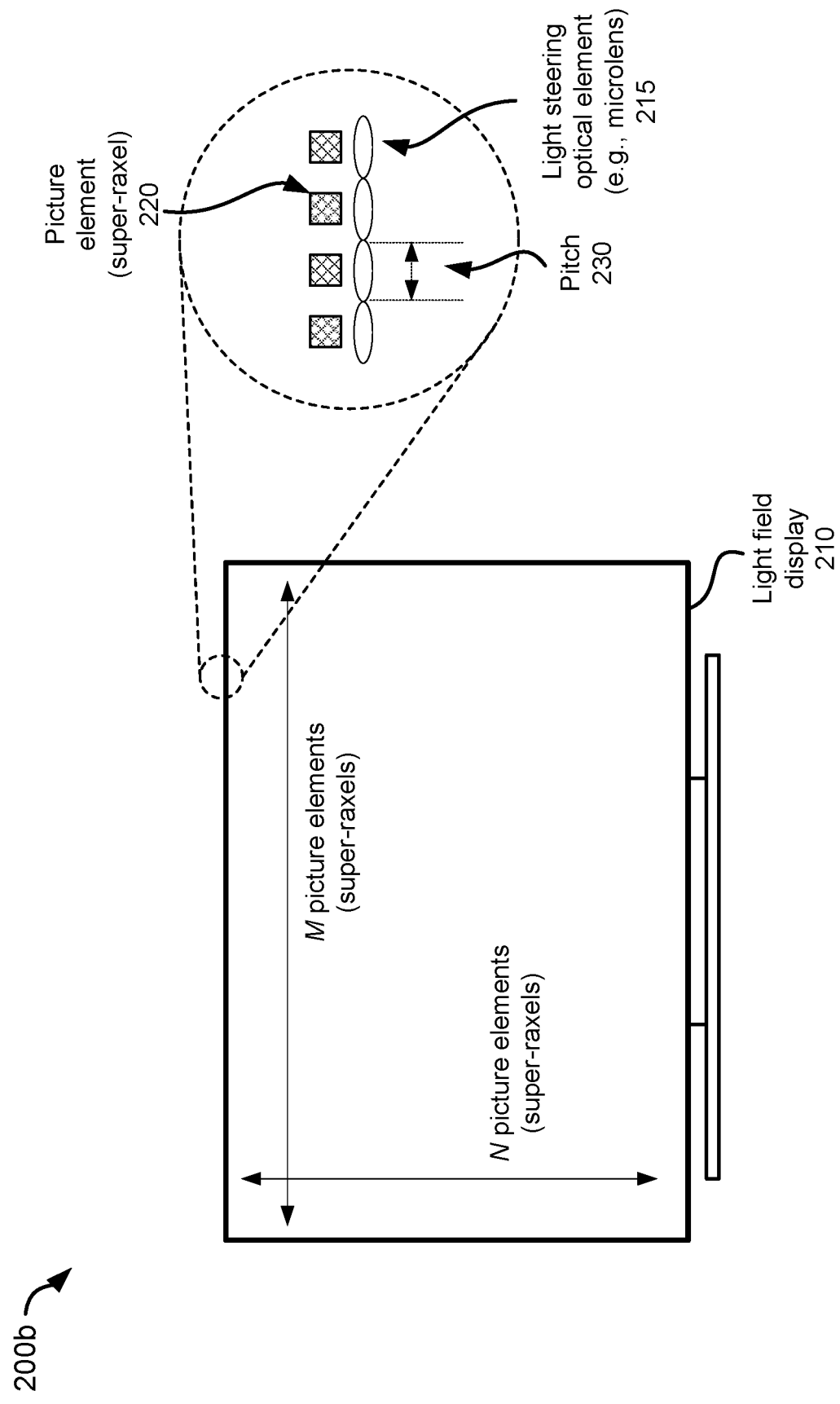
FIG. 2B illustrates another example of a light field display having multiple picture elements, in accordance with aspects of this disclosure.
Figure 2C:
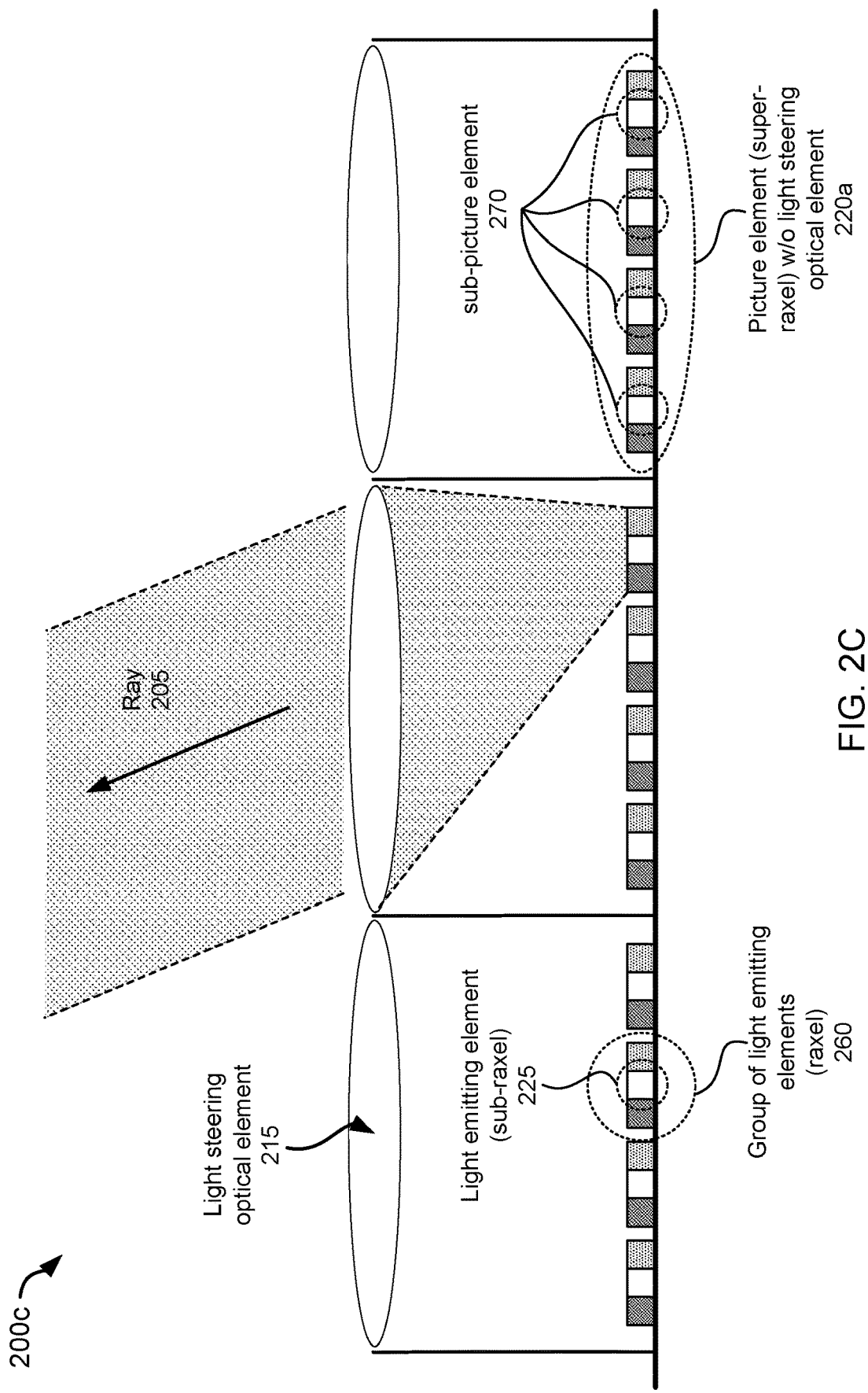
FIG. 2C illustrates an example of a cross-sectional view of a portion of a light field display, in accordance with aspects of this disclosure.

As described above, the display 110 can have different capabilities, including ultra-high-resolution capabilities, high-dynamic-range (contrast) capabilities, and/or light field capabilities. When the display 110 can operate as a light field display, it may have an architectural configuration that enables the generation of multiple fields or views for a user or viewer to see, which other types of displays may not be able to produce. FIGS. 2A-2C below provide additional details regarding a display, such as the display 110, having an architecture that enables light field capabilities (e.g., a light field display).

A diagram 200a in FIG. 2A shows a light field display 210, which is an example of the displays 110 in FIGS. 1A-1D when the display is capable or supports capabilities for light field operations and such capabilities are enabled. As such, the light field display 210 may include one or more display processing circuitries 130 to perform various tasks including, for example, color management, content or data conversion, and multiview processing. The light field display 210 may have multiple picture elements or super-raxels 220. In this disclosure, the term "picture element" and the term "super-raxel" can be used interchangeably to describe a similar structural unit in a light field display. The light field display 210 can be used for different types of applications and its size may vary accordingly. For example, a light field display 210 can have different sizes when used as displays for watches, near-eye applications, phones, tablets, laptops, monitors, televisions, and billboards, to name a few. Accordingly, and depending on the application, the picture elements 220 in the light field display 210 can be organized into arrays, grids, or other types of ordered arrangements of different sizes. The picture elements 220 of the light field display 210 can be arranged into arrays of pixels as illustrated in FIGS. 1B-1D.

In the example shown in FIG. 2A, the picture elements 220 can be organized or positioned into an N×M array, with each picture element 220 in the array having itself an array or grid of light-emitting elements 225.

In a more specific example, for a 4K light field display in which the pixels in a traditional display are replaced by the picture elements 220, the N×M array of picture elements 220 can be a 2,160×3,840 array including approximately 8.3 million picture elements 220. Depending on the number of light-emitting elements 225 in each of the picture elements 220, the 4K light field display can have a resolution that is one or two orders of magnitude greater than that of a corresponding traditional display. When the picture elements or super-raxels 220 include as light-emitting elements 225 different LEDs on a same semiconductor substrate that produce red (R) light, green (G) light, and blue (B) light, the 4K light field display can be said to be made from integrated RGB LED super-raxels. Although not described in detail, 8K or larger light field displays are also possible using a similar architecture.

Each of the picture elements 220 in the light field display 210, including its corresponding light-steering optical element 215 (an integral-imaging lens illustrated in a diagram 200b in FIG. 2B), can represent a minimum picture element size limited by display resolution. In this regard, an array or grid of light-emitting elements 225 of a picture element 220 can be smaller than the corresponding light-steering optical element 215 for that picture element. In practice, however, it is possible for the size of the array or grid of light-emitting elements 225 of a picture element 220 to be similar to the size of the corresponding light-steering optical element 215 (e.g., the diameter of a microlens or lenslet), which in turn is similar or the same as a pitch 230 between picture elements 220.

As mentioned above, an enlarged version of an array of light-emitting elements 225 for a picture element 220 is shown to the right of the diagram 200a. The array of light-emitting elements 225 can be a P×Q array, with P being the number of rows of light-emitting elements 225 in the array and Q being the number of columns of light-emitting elements 225 in the array. Examples of array sizes can include P≥5 and Q≥5, P≥8 and Q≥8, P≥9 and Q≥9, P≥10 and Q≥10, P≥12 and Q≥12, P≥20 and Q≥20, and P≥25 and Q≥25. In an example, a P×Q array is a 9×9 array including 81 light-emitting elements or sub-raxels 225.

For each picture element 220, the light-emitting elements 225 in the array can include separate and distinct groups of light-emitting elements 225 (see, e.g., group of light-emitting elements 260 in FIG. 2C) that are allocated or grouped (e.g., logically grouped) based on spatial and angular proximity and that are configured to produce the different light outputs (e.g., directional light outputs) that contribute to produce light field views provided by the light field display 210 to a viewer. The grouping of sub-raxels or light-emitting elements into raxels need not be unique. For example, during assembly or manufacturing, there can be a mapping of sub-raxels into particular raxels that best optimize the display experience. A similar re-mapping can be performed by the display once deployed to account for, for example, aging of various parts or elements of the display, including variations over time in brightness of light-emitting elements of different colors and/or in the changing characteristics of light-steering optical elements. In this disclosure, the term "groups of light-emitting elements" and the term "raxel" can be used interchangeably to describe a similar structural unit in a light field display. The light field views produced by the contribution of the various groups of light-emitting elements or raxels can be perceived by a viewer as continuous or non-continuous views.

Each of the groups of light-emitting elements 225 in the array of light-emitting elements 225 includes light-emitting elements that produce at least three different colors of light (e.g., red light, green light, blue light, and perhaps also white light). In one example, each of these groups or raxels includes at least one light-emitting element 225 that produces red light, one light-emitting element 225 that produces green light, and one light-emitting element 225 that produce blue light. In another example, each of these groups or raxels includes two light-emitting elements 225 that produce red light, one light-emitting element 225 that produces green light, and one light-emitting element 225 that produces blue light. In yet another example, each of these groups or raxels includes one light-emitting element 225 that produces red light, one light-emitting element 225 that produces green light, one light-emitting element 225 that produces blue light, and one light-emitting element 225 that produces white light.

Because of the various applications (e.g., different-sized light field displays) described above, the sizes or dimensions of some of the structural units described in connection with the light field display 210 can vary significantly. For example, a size of an array or grid of light-emitting elements 225 (e.g., a diameter, width, or span of the array or grid) in a picture element 220 can range between about 10 microns and about 1,000 microns. That is, a size associated with a picture element or super-raxel 220 can be in this range. The term "about" as used in this disclosure indicates a nominal value or a variation within 1%, 2%, 3%, 4%, 5%, 10%, 15%, 20%, or 25% from the nominal value.

In another example, a size of each group of light-emitting elements 225 (e.g., a diameter, width, or span of the group) in a picture element 220 can range between about 1 micron and about 10 microns. That is, a size associated with a group of light-emitting elements 225 (e.g., raxel 260) can be in this range.

In yet another example, a size of each light-emitting element 225 (e.g., a diameter, width, or span of the light-emitting element or sub-raxel) can range between about 0.4 microns and about 4 microns. Similarly, a size of each light-emitting element 225 (e.g., a diameter, width, or span of the light-emitting element or sub-raxel) can be less than about 1 micron. That is, a size associated with a light-emitting element or sub-raxel 225 can be in the ranges described above.

In yet another example, a size of a light-steering optical element 215 (e.g., a diameter, width, or span of a microlens or lenslet) can range between about 10 microns and about 1,000 microns, which is similar to the range of sizes for a picture element or super-raxel.

In FIG. 2B, a diagram 200b shows another example of the light field display 210 illustrating an enlarged view of a portion of an array of picture elements 220 with corresponding light-steering optical elements 215 as described above. The pitch 230 can represent a spacing or distance between picture elements 220 and can be about a size of the light-steering optical element 215 (e.g., size of a microlens or lenslet).

In this example, the light field display 210 in FIG. 2B can be a 4K light field display with a 2,160×3,840 array of picture elements or super-raxels 220. In such a case, for a viewer distance of about 1.5 meters or about 5 feet, a size of the light-steering optical element 115 can be about 0.5 millimeters. Such a size can be consistent with human acuity of about 1 arc-minute/picture element. The viewer's field of view (FOV) in this example can be less than a viewing angle provided by the picture element (e.g., viewing angle>FOV). Moreover, the multiple views provided by the 4K light field display in this example can have a 4 millimeter spacing, consistent with a diameter of the human pupil. This can translate to the light-steering optical element 215 steering the output light produced by a picture element 220 having, for example, $31^2$ light-emitting elements 225. Accordingly, the 4K light field display in this example can provide continuous parallax with light field phase. A similar result may be provided by light field displays of 8K or larger size.

A diagram 200c in FIG. 2C shows a cross-sectional view of a portion of a light field display (e.g., the light field display 210) to illustrate some of the structural units described in this disclosure for when the display 110 in FIG.

1A is configured as a light field display. For example, the diagram 200c shows three adjacent picture elements or super-raxels 220a, each having a corresponding light-steering optical element 215. In this example, the light-steering optical element 215 can be considered separate from the picture element 220a but in other instances the light-steering optical element 215 can be considered to be part of the picture element.

As shown in FIG. 2C, each picture element 220a includes multiple light-emitting elements 225 (e.g., multiple sub-raxels), where several light-emitting elements 225 (e.g., several sub-raxels) of different types can be grouped together into the group 260 (e.g., into a raxel). A group or raxel can produce various components that contribute to a particular ray element (ray) 205 as shown by the right-most group or raxel in the middle picture element 220a. It is to be understood that the ray elements 205 produced by different groups or raxels in different picture elements can contribute to a view perceived by viewer away from the light field display.

An additional structural unit described in FIG. 2C is the concept of a sub-picture element 270, which represents a grouping of the light-emitting elements 225 of the same type (e.g., produce the same color of light) of the picture element 220a.

For a light field display, one or more display processing circuitries 130 can be used to process or modify the content or data that is used to drive the light-emitting elements 225 or groups of light-emitting elements 260 in the picture elements 220. Accordingly, the various architectural features described above in connection with FIGS. 1A-1C can be combined with the architectural features described above in connection with FIGS. 2A-2C to provide enhanced displays with light field capabilities. In this regard, the display processing circuitry 130 may be configured to generate appropriate information at the super-raxel level (picture elements 220), at the raxel level (group of light-emitting elements 26), and/or at the sub-raxel level (light-emitting elements 225). That is, the display processing circuitry 130 may be configured to receive data streams and modify the data streams while performing one or more tasks, and the modified data streams may be used to provide signals or other instructions to the backplane(s) 150 and the array(s) of pixels 151 such that the pixels in the array, whether they are super-raxels, raxels, or sub-raxels, receive the appropriate signals or instructions to contribute the ray elements or rays 205 that are needed to produce the desired views or views of the light field display.

Figure 2D:
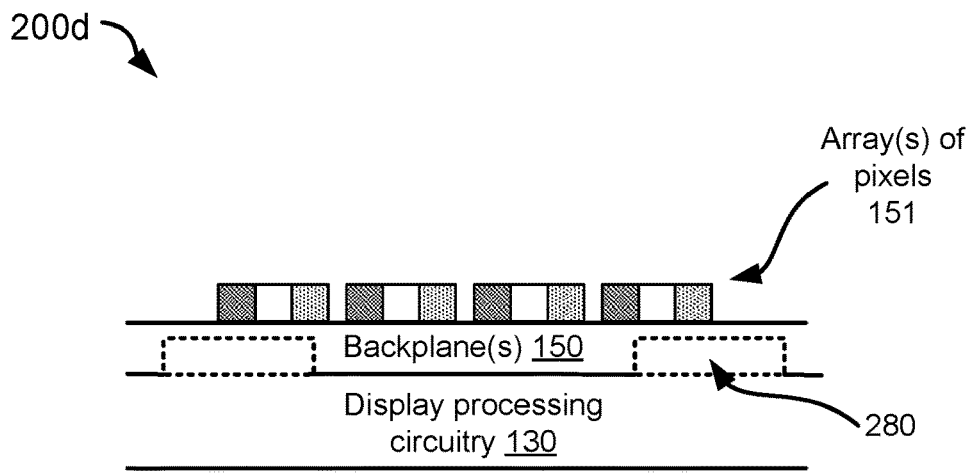
FIG. 2D illustrates an example of integration between display processing circuitry and one or more backplanes, in accordance with aspects of this disclosure.

FIG. 2D shows a diagram 200d that illustrates an example of integration between display processing circuitry 130 and backplane(s) 150 in light field displays such as the display 210. As shown, the display processing circuitry 130 is coupled to one or more backplanes 150, which in turn are coupled to one or more arrays of pixels 151.

The one or more arrays of pixels 151 in the diagram 200d may include directional pixels. Moreover, different subsets of pixels in the one or more arrays of pixels 151 are configured to contribute to light directed towards different directions. That is, the pixels in the one or more arrays of pixels 151 are configured to contribute different colors of light and different intensities of light in one or more directions.

The one or more arrays of pixels 151 may include one or more layers (not shown), where each layer includes one or more of light producing elements (see, e.g., light emitting elements 225), light absorbing elements, light reflective elements, light transmissive elements, light modifying elements, or optical elements. The optical elements include on or more of lenses, optical barriers, waveguides, fiber optics, switchable optics, directional modifying elements, polarization modifying elements, or light splitting elements.

The display processing circuitry 130 may include one or more of application specific integrated circuits (ASICs), field programmable gate arrays (FPGAs), programmable integrated circuits, central processing units, graphics processing units, tensor processing units, neural network integrated circuits, vision processing units, or neuromorphic processors. In other words, the display processing circuitry 130 may include some form of electronic hardware. In some implementations, the display processing circuitry may also include stored instructions to operate the electronic hardware in accordance with policies and selected mode of operation. The instructions are in the form of software, firmware, or both. There may be implementations in which the display processing circuitry 130 may operate without stored instructions. For example, the logic of the operation may be built into an ASIC or FPGA, neural network chips may have their logic implemented in an ASIC or FPGA and have their weights stored but without the need for instructions.

Figure 2E:
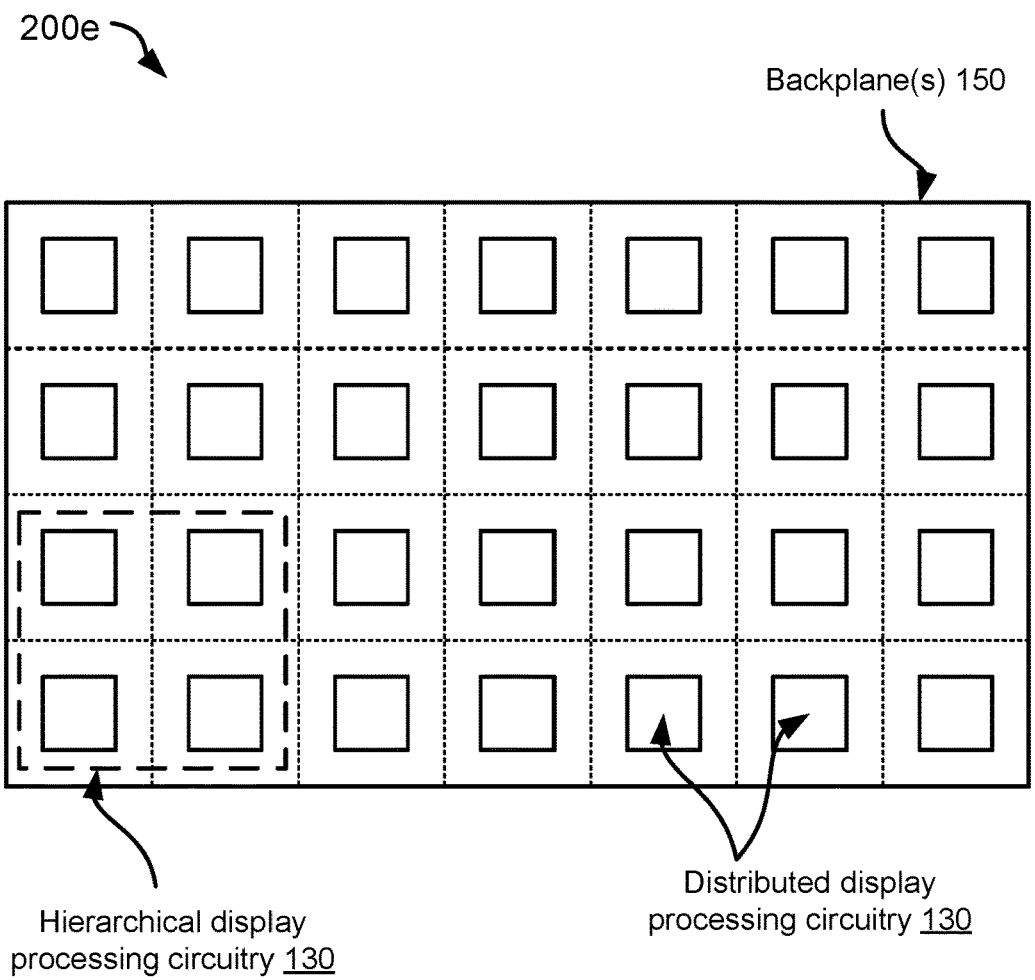
FIG. 2E illustrates an example of distribution of display processing circuitry over one or more backplanes, in accordance with aspects of this disclosure.

FIG. 2E shows a diagram 200e that illustrates an example of distribution of the display processing circuitry 130 over backplane(s) 150, in accordance with aspects of this disclosure. For example, electronic hardware in the display processing circuitry 130 includes transistor-level circuitry spatially distributed across the one or more backplanes 150. In some implementations, the transistor-level circuitry distributed across the one or more backplanes 150 is formed on a same substrate as transistor-level circuitry of a circuit configuration of the backplane 150 (see, e.g., portions 280 of the display processing circuitry 130 formed in the backplane(s) 150 in the diagram 200d in FIG. 2D).

The diagram 200e shows that the electronic hardware in the display processing circuitry 130 may include multiple discrete integrated circuit (IC) units 285 spatially distributed across the backplane, wherein each IC unit 285 may be associated with a subset of the array of pixels. In some instances, the IC units are configured to perform the same functionality. In other instances, the IC units are configured to perform different functionality.

In another implementation, the electronic hardware in the display processing circuitry 130 may include multiple IC units 285 spatially distributed across the one or more backplanes 150 as well as transistor-level circuitry that is also spatially distributed across the one or more backplanes 150.

The electronic hardware in the display processing circuitry 130 may implemented as a hierarchy of circuits that separate processing tasks spatially, angularly, temporally, by random distribution, by order of arrival, by some other order associated with the one or more data streams, or by a combination thereof. The separate processing tasks in the hierarchy of circuits may be processed simultaneously, sequentially, or both. The diagram 200e shows a hierarchy with a higher level, which may be implemented using an IC unit, and a lower level which is shown implemented using one or more of the IC units 285. It is to be understood that this is only provided as an illustrative example and other implementation of hierarchical arrangements for the display processing circuitry 130 are also possible.

Figure 3:
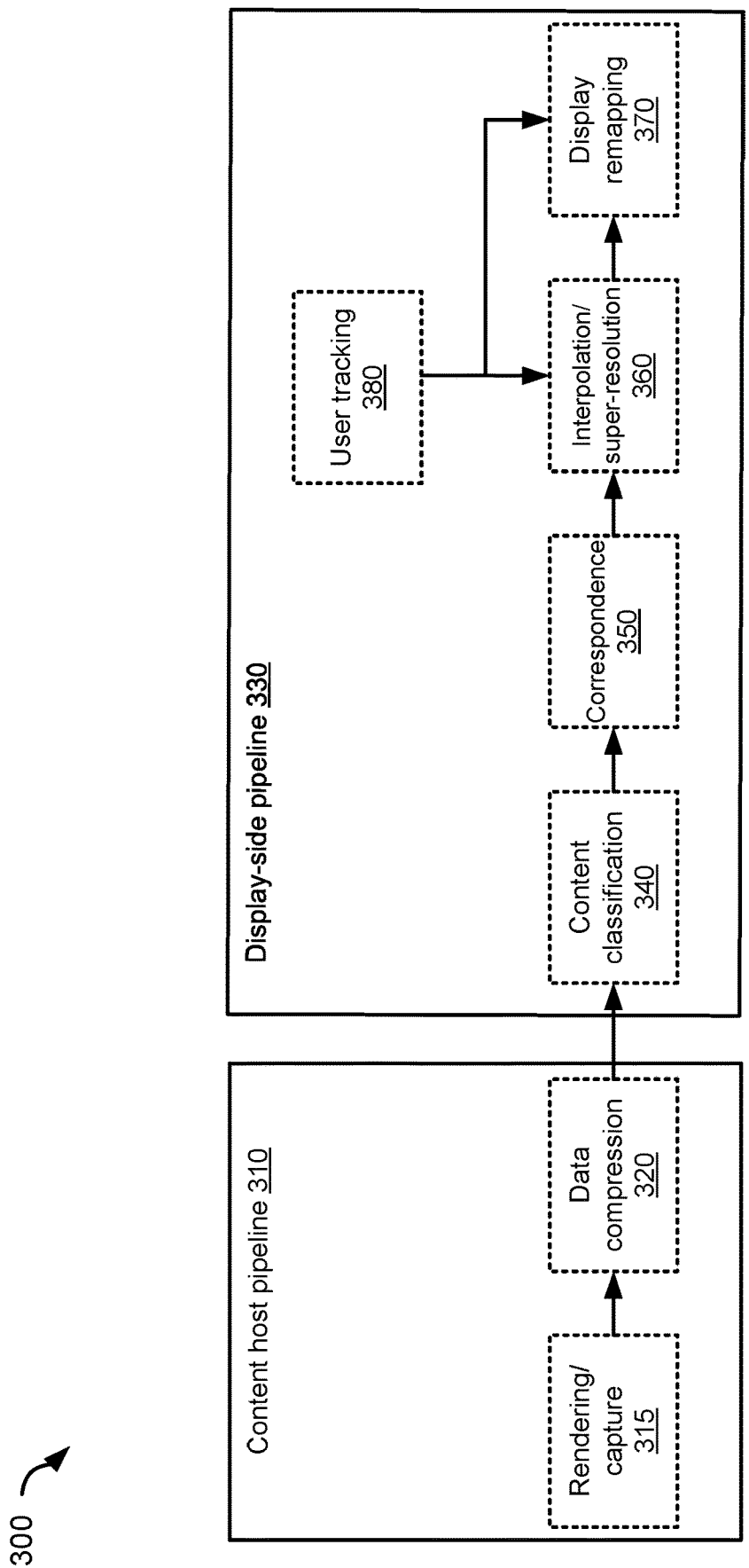
FIG. 3 illustrates an example of a processing pipeline for a display processing unit, in accordance with aspects of this disclosure.

FIG. 3 shows a diagram 300 that illustrates an example of a processing pipeline for processing data used in a display. The processing pipeline can include a content host pipeline 310, which includes examples of tasks that can be performed by a processing host such as, for example, the host processor 155 (or some part of the source 120). The processing pipeline can also include a display-side pipeline 330, which includes examples of tasks that can be performed by a processing engine in a display such as, for example, the display processing circuitry 130 (or multiple display processing circuitries 130) in the display 110. While the example shows the processing pipeline split between tasks performed by a processing host and tasks performed on the display side, when the processing host is integrated into the display then the entire processing pipeline can be performed on the display side.

The content host pipeline 310 can include one or more tasks. In this example, the content host pipeline 310 can optionally include a rendering/capture 315 and/or a data compression 320, which can be performed by the host processor 155. As described above, the host processor 155 can stream RGBD data from movies or RGBD cameras, or can render RGBD data from computer-generated content. Similarly, the host processor 155 can perform data compression operations to be able to send content/data in the data stream(s) 125 to the display processing circuitry 130 through HDMI/DP connections.

When the content host pipeline 310 is performed display-side, the display processing circuitry 130 can use one of several architectures to perform the tasks. In one example, the display processing circuitry 130 may implement and execute one or more neural networks (see, e.g., FIGS. 5A and 5B) using a unique set of multiple weights to perform the tasks. In some cases, a single neural network may be implemented and executed, while in other cases multiple neural networks may be implemented and executed.

The display-side pipeline 330 can include one or more tasks. In this example, the display-side pipeline 330 can optionally include a content classification 340, a correspondence 350, an interpolation/super-resolution 360, and/or a display remapping 370. In addition, the display-side pipeline 330 can also include a user tracking 380, which can be used to provide feedback to either or both of the interpolation/super-resolution 360 and the display remapping 370.

It is to be understood that while the various tasks shown in the content host pipeline 310 and the display-side pipeline 330 are described in a particular order or sequence, the same tasks, or a subset of the same tasks, may be performed in a different order or sequence to that shown in the diagram 300. Moreover, each of the tasks shown may be optional such that the content host pipeline 310 and the display-side pipeline 330 may contain fewer tasks than those shown in the diagram 300. In addition, the diagram 300 is provided by way of illustration and not of limitation. As described in more detail below, different tasks than those shown in the diagram 300 may also be performed, and these different tasks may include aspects or features of the tasks described in the diagram 330 and/or may be used in addition to some of the tasks described in the diagram 300. For example, aspects of the interpolation/super-resolution 360 may be used in multiple conversion tasks described in more detail below.

Returning to the display-side pipeline 330, the content classification 340 can provide for dimension reduction to classify individual pixels, two-dimensional (2D) features, three-dimensional (3D) features, image type, or a combination thereof. In one example, the content classification 340 provides for classification of content (e.g., the content/data 125) from a source (e.g., the source 120) based on one or more criteria and such classification can be used to identify an appropriate processing operation consonant with the outcome of the classification. In some implementations, the content classification 340 may identify high level characteristics of editing (cuts), lighting, camera framing (closeup/wide angle) that effect image processing or type of content (sports, film, desktop processing, gaming etc), or low level image features. In one example, when the display processing circuitry 130 uses neural networks, the display processing circuitry 130 can be configured to dynamically load a unique set of multiple weights from different sets of multiple weights stored in memory of the display (e.g., the memory 135) in response to the classification. Moreover, the display processing circuitry 130 can then implement and execute one or more neural networks (see, e.g., FIGS. 5A and 5B) using the unique set of multiple weights. In some cases, a single neural network may be implemented and executed, while in other cases multiple neural networks may be implemented and executed.

The content classification 340 described above may include one or more of the following: classifying content by application (e.g., gaming, word-processing, sports, teleconferencing, etc.), classifying content by subject (humans, text, landscape, indoor, outdoor, etc.), performing classification based on estimated depth, motion, performing estimation/classification of scene parameters (e.g., lighting, camera, geometry), and performing estimation of scene cuts (e.g., due to magnitude of change, intensity, motion). Scene estimation relates both to content classification but also general depth/3D estimation. Estimation of depth is a lot more robust if each frame is not treated in isolation, but use the additional information to fill in holes, estimate depth from motion, reduce noise, etc. In some applications, such as word-processing, will tend to be dominated by 2D text—in which case content would most likely be optimized to be viewed at the display plane with a focus on spatial resolution, contrast, and legibility. Teleconferencing tends to focus on the human body where capturing the eyes and mouth detail is most important. Other applications such as gaming or sports will be more dynamic and have much larger range of content for purposes of classification. In practice it would be possible to train a neural network on a specific class of data (e.g., faces, sports, text) and switch the weights needed by the neural network at run-time based on the data being processes.

The correspondence 350 can perform for one or more of stereo matching or optical flow. The interpolation/super-resolution 360 can perform for one or both of 2D-to-3D conversion or low-dynamic-range to high-dynamic-range (LDR-to-HDR) conversion. In some implementations, the correspondence 350 and the interpolation/super-resolution 360 can span one or more of spatial dimensions, temporal dimensions, or angular dimensions.

The display remapping 370 can perform one or more of an intensity remapping, a brightness remapping, a resolution remapping, an aspect ratio remapping, a color remapping, or a content depth remapping in cases where the content/data received does not directly map to the capabilities of the display.

The display remapping 370 can perform a depth remapping that provides for an adjustment of weights used in a neural network implementation of the interpolation portion of the interpolation/super-resolution 360 to warp image intensity and disparity to fit within a display depth budget using one or more perceptual metrics (e.g., perceptual metrics provided by the user tracking 380).

In another aspect, the display remapping 370 can perform a depth remapping that is applicable when depth information is available (e.g., the content or data includes depth information) or a disparity remapping that is applicable when depth information is not available. The disparity remapping can be used in connection with content or data that includes stereo image or stereo video. In an implementation, the disparity remapping may be converted to depth information, in which case depth remapping may be performed as a result of the conversion of the disparity remapping.

With respect to depth remapping, light field displays can represent 3D content at the highest resolution and accuracy when the content is placed close to the plane of the physical display. Content that is increasingly behind the display plane, or that is increasingly in front of the display, can be represented and displayed only with reduced resolution and accuracy. If part of the scene to be displayed is far from the display plane, it often appears blurry. The process of depth remapping involves modifying the 3D structure of the scene so that parts of the scene are moved closer to the display plane. Some ways to achieve this include moving the whole scene or individual objects within the scene, uniformly scaling the size of the scene or objects, scaling only the depth direction of the scene or objects, or applying a non-linear spatial transformation for the whole scene or parts of the scene.

The display remapping 370 may be based on one or more remapping parameters associated with one or both of parameters of the display or capabilities of the display, and the one or both of parameters of the display or capabilities of the display include one or more of spatial resolution, angular resolution, dynamic range, or field of view. In other words, when incoming content or data does not fit within the spatial resolution, angular resolution, dynamic range, and/or field of view (or other similar parameters or capabilities of the display), display remapping 360 may be performed to better fit the content or data to the physical and performance limitations of the display.

When the display processing circuitry 130 is used to implement and execute one or more neural networks to perform the tasks in the display-side pipeline 330, the display processing circuitry 130 may implement and execute one neural network to perform the display remapping 370 and one or more additional neural networks to perform any or all of the other tasks in the display-side pipeline 330.

In another aspect, the display processing circuitry 130 can implement and execute a single neural network to perform the content classification 340, the interpolation/super-resolution 360, and the display remapping 370. By using a single neural network, all of these tasks can be combined into a single neural network operation instead of being performed as separate and sequential neural network operations.

The user tracking 380 provides for optimization of computational resources and perceptual metrics for expected viewing positions and may be based on sensor feedback, for example.

In view of the wide range of possible tasks that can be performed, the present disclosure proposes the use of neural networks for image and video processing on the display, that is, after data transfer from a CPU/GPU or some other source. Neural networks have demonstrated state of the art quality for image processing in computer vision and camera-centric tasks for a variety of applications, but these techniques have not been used for display-centric processing yet. Accordingly, the present disclosure proposes the use of neural networks to perform several specific tasks described herein on the display. These specific tasks or algorithms are to be implemented on a dedicated processor on the display, the display processing circuitry 130, which can also be referred to as a PU (processing unit) or a display processing unit (DPU). By using display-centric tasks as described herein, it may be possible to save bandwidth and transmit as little content/data from the source 120 (e.g., the CPU 165/GPU 160) to the display 110 as possible.

As described above in connection with FIGS. 1B and 1C, one or more display processing circuitries 130 can be installed or integrated on the display 110 or on multiple displays 110, where these display processing circuitries 130 can be programmable, and in some cases, may provide hardware acceleration, including hardware acceleration for specific architectures such as for neural network-specific computations. When using a neural network architecture (where the display processing circuitry 130 may also use a fixed-function logic signal processing architecture or a programmable pipeline architecture), the display processing circuitry 130 may be a custom-designed chip or it may be implemented using a generic neural network accelerator (e.g., Google's Tensor Processing Unit or Intel's Movidius chip). In another example, the display processing circuitry 130 can be implemented in a field programmable gate array (FPGA), a digital signal processor (DSP), an ARM processor, or a GPU, for example. In any of these cases, the display processing circuitry 130 may be used for display-centric image or video processing including the various tasks described herein (including the tasks in the content host pipeline 310 and/or the display-side pipeline 330) and/or other display-related tasks.

Figure 4:
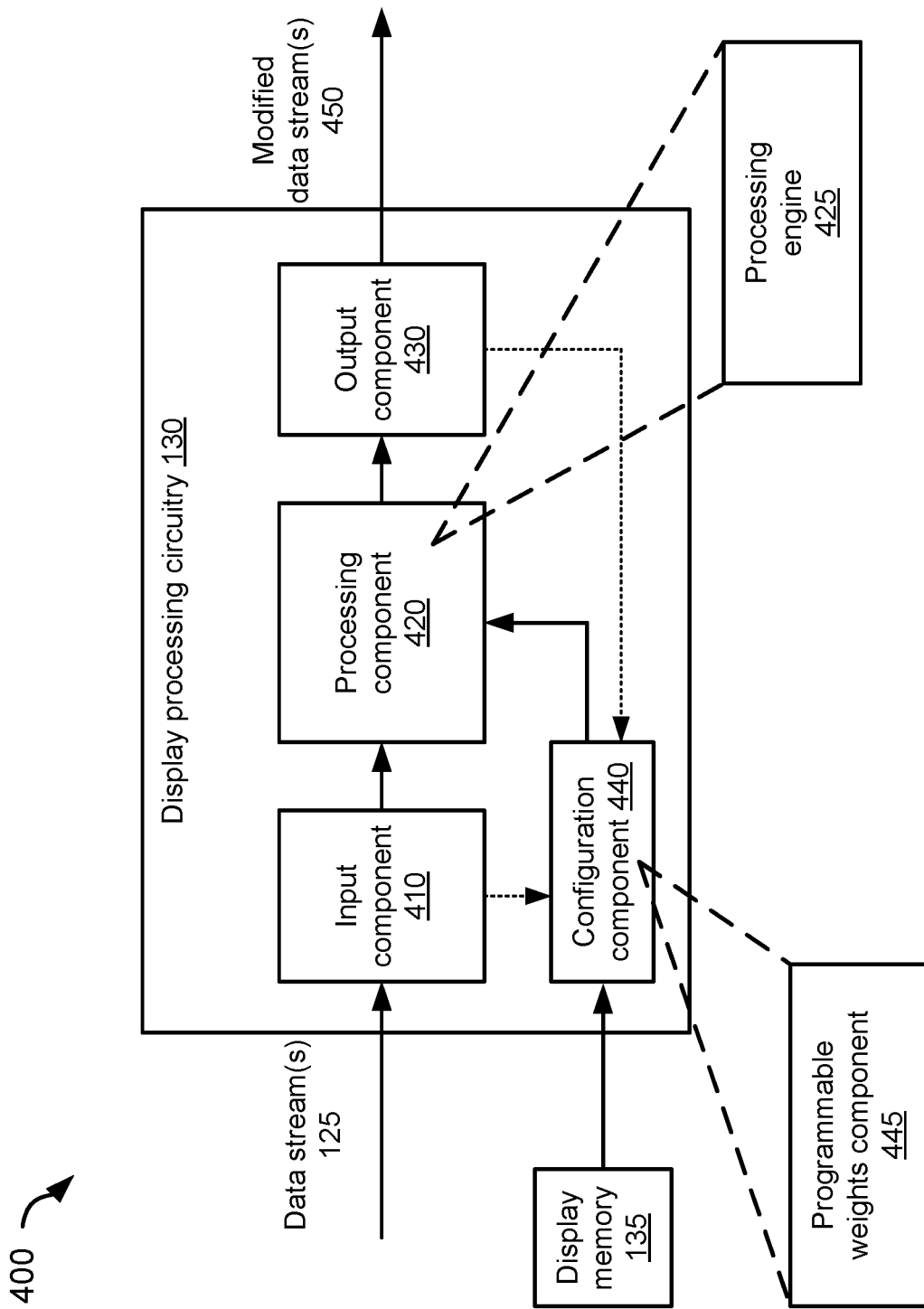
FIG. 4 is a block diagram illustrating an example of a display processing circuitry, in accordance with aspects of this disclosure.

FIG. 4 shows a block diagram 400 illustrating one example of an architecture of the display processing circuitry 130 in a display 110 (FIG. 8 below describes another architecture for the display processing circuitry 130). The display processing circuitry 130 can include an input component 410, a processing component 420, and an output component 430. The input component 410 is configured to receive content from a source (e.g., content/data or other information in the one or more data streams 125 from the source 120). The processing component 420 is configured to implement and execute one or more neural networks to perform a set of tasks that modify the data stream(s) 125 to generate modified data stream(s) 450 with data and/or signaling for presentation by the display 110. The one or more neural networks can include convolutional neural networks. A convolutional neural network consists of one or more convolutional layers. The convolutional neural network may also include one or more down-sampling layers. Optionally, the convolutional layers and/or sub-sampling layers can be followed by fully connected layers. The convolutional neural networks can be used to perform associated 2D, 3D, 4D, or 5D convolutional operations, for example.

When the one or more data streams 125 includes an image, for example, the modification of the one or more data streams 125 can be selectively performed by the processing component 420 on the whole image or on one or more parts of the image.

The processing component 420 can include a processing engine 425 that enables the implementation of the one or more neural networks. In one example, the processing engine 425 includes a dynamically configurable fabric with which to implement different neural network configurations based on different sets of weights. A different configuration may have a different number of layers, nodes, and/or weights. The neural networks are implemented in the processing component 420 and/or the processing engine 425 using weights stored in the display memory 135 and provided to the display 110. The output component 430 is configured to provide modified content (e.g., modified data stream(s) 450) to a respective backplane(s) 150 and array(s) of pixels 151 in the display 110.

As described above, the display processing circuitry 130 (and the processing engine 425) can be dynamically programmed or configured before operation and/or during operation. As such, the display processing circuitry 130 can include a configuration component 440 that configures the processing component 420 and/or the processing engine 425 in accordance with the various tasks to be performed by the display processing circuitry 130. In an aspect, the configuration component 440 can receive or obtain one or more sets of neural network weights from the display memory 135 and store the weights in an internal memory structure, such as a programmable weights component 445. The weights in the programmable weights component 445 can be used to program different neural network configurations in the processing component 420 and/or the processing engine 425.

In an aspect, the configuration component 440 may receive from the input component 410 information associated with the data stream(s) 125. The configuration component 440 may receive from the output component 430 information associated with the modified content/data 450. The configuration component 440 may determine which set of weights to use for a particular task (or for a particular set of tasks) based on the information it receives. In other words, the configuration component 440 may use input information and/or output information to determine conditional criteria to determine the most appropriate set of weights, and consequently, the most appropriate neural network configuration, to use for certain tasks. For example, the modification or processing of the data stream(s) 125 by the processing component 420 for presentation by the display 110 may be based at least in part on the content itself, an estimated saliency, or perceptual metrics (e.g., from the one or more sensors 155). With respect to saliency, one aspect of the display processing circuitry 130 is to minimize compression/display artifacts that might introduce spurious saliency cues, such as straight-edged blocks in low-bitrate JPEG compression, which may draw attention to themselves.

The processing component 420 is configured to perform one or more tasks, include the tasks described above in connection with the display-side pipeline 330 in the diagram 300 in FIG. 3, as well as one or more of the tasks described below.

For example, the processing component 420, and therefore the display processing circuitry 130, can be configured to perform image and video super-resolution (e.g., as part of the interpolation/super-resolution 360 or some other task). Image and video super-resolution may refer to techniques that take as input a single 2D image, a video, or multiple images or videos, and improve the resolution or pixel count of this data by generating as output a single high-resolution image or a high-resolution video. This technique is necessary when the input image(s) or video has a lower resolution than the display. Existing displays may use simple algorithms, such as linear or cubic up-sampling, for super-resolution applications. However, by using neural networks techniques, a wider range of algorithms may be used. Moreover, neural networks can outperform simple interpolation by applying natural image statistics learnt from a large training dataset. Neural networks could be trained independently, for example on low-resolution/high-resolution pairs, or corresponding RGB, RGBD, stereo, light field data. The data that is used for the training could be synthetic or recorded. It is also possible to train the network as a whole by incorporating multiple tasks into a single network.

In another example, the processing component 420, and therefore the display processing circuitry 130, can be configured to perform low-dynamic-range to high-dynamic-range (LDR-to-HDR) image and video conversion. Conventional image and video content is digitally encoded using 8 bits per color channel, that is, 8 bits for each of the red, green, and blue color channel. Emerging high-contrast or high-dynamic-range displays (e.g., the display 110 having high-contrast or high-dynamic-range capabilities) require more bits per color channel to adequately encoded the range of luminance/color/intensity values addressable by the display. Without a sufficient bit depth, intensity/color artifacts would be observable, such as contouring. High-dynamic-range images and videos can be produced, typically encoded with 10, 16, or 32 bits per channel, but content in this format is currently rare and not all display data communication standards support these data formats. A few algorithms for converting legacy low-dynamic-range images or videos into high-dynamic-range images or videos have been proposed for image and video processing, but these algorithms may have limitations. By using neural networks implemented in the processing component 420, it is possible to perform a wide range of display-centric LDR-to-HDR operations directly on the display. The input of the algorithms would be a single low-dynamic-range image, multiple low-dynamic-range images, or a low-dynamic-range video and the output would be a single high-dynamic-range image or video.

In another example, the processing component 420, and therefore the display processing circuitry 130, can be configured to perform depth estimation from single image or video. A light field or glasses-free 3D display typically requires 3D image content, for example, image or video with depth information or the light field image or video, as input. Legacy 2D images or videos usually do not provide this information. The processing component 420 may be configured to use neural networks on the display to take as an input a single 2D image or video to estimate depth information of this image or video for every frame. The output is thus a depth map or a video of depth information, giving the distance for each pixel to the camera or viewer. This depth information could then be used directly or further processed for light field synthesis.

In another example, the processing component 420, and therefore the display processing circuitry 130, can be configured to perform light field synthesis from single image or video. A light field display physically addresses light rays or light ray bundles (see, e.g., ray 205 in FIG. 2C) with the purpose of displaying multiple different images into different directions of the display. This allows for glasses-free 3D viewing of the content by one or multiple users or it could also allow for the user to accommodate (e.g., focus) their eyes to different distances and not just the physical distance of the display or it could allow visual deficiencies of the user to be corrected (e.g., prescription correction of myopia, hyperopia, presbyopia, or other optical aberrations).

A light field contains intensity and color information that varies over the surface of the display (e.g., pixels, like in a normal display) but for each pixel, the light field also contains directional information. That is, the display pixel is capable of emitting a different intensity or color into different directions. As shown in FIGS. 2A-2C, a light field display can have picture elements 220 (super-raxels), groups of light-emitting elements 260 (raxels), and light-emitting elements 225 (sub-raxels). A light field display may control the different intensity or color into different directions for individual light-emitting elements 225, groups of light-emitting elements 260, and picture elements 220.

Light fields can be recorded with dedicated light field cameras or be computer generated. However, most existing content is not available in the light field format. The processing component 420 can be configured to use of neural networks on the display to take as an input a 2D image or video and directly compute the light field image or video from it. This could directly be done using a neural network, or in multiple stages, where each stage could use a neural network or another algorithm. These stages can include one or more of the following operations but are not limited to these: (a) depth estimation from single image or video (as described above), (b) view warping or depth-based image warping, (c) hole filling, (d) color or intensity processing, or (e) view interlacing.

In another example, the processing component 420, and therefore the display processing circuitry 130, can be configured to perform light field synthesis from image and depth or video and depth. Similar to the concept described above, however, instead of taking 2D image or video as input and outputting the light field, the processing component 420 can be configured to use neural networks for light field synthesis by taking as input either a single 2D image with depth information, multiple 2D images with depth information, or a 3D video with depth information and outputting a light field image or video. The stages may be the same or similar to those described above the same as described in claim 4 but depth estimation from single image or video may not be necessary because the information is already provided, either previously computed, streamed from the GPU, or otherwise provided by the application.

In another example, the processing component 420, and therefore the display processing circuitry 130, can be configured to perform light field synthesis from stereo image or video. This is again similar to the concepts described above but in this case instead of taking as input a 2D image or video or a 2D image or video with depth information, the processing component 420 can be configured to use of neural networks for light field synthesis by taking as input a stereo pair of images or videos. This type of content is widely available for use with stereoscopic displays, where each of the image pairs encodes one image for the left or right eye of the user, respectively. The necessary steps to convert this type of content to a light field may include either stereo image to depth conversion and then followed by (b) view warping or depth-based image warping, (c) hole filling, (d) color or intensity processing, and/or (e) view interlacing, or direct light field view synthesis from the stereo image and then followed by (c) hole filling, (d) color or intensity processing, and/or (e) view interlacing. Alternatively, this conversion can be done in a single step using a neural network.

In another example, the processing component 420, and therefore the display processing circuitry 130, can be configured to perform temporal tracking of video motion and shape. Image quality can be further improved by tracking motion across frames in the video. This information could be used to up-sample the temporal framerate for displays with high refresh rate, reduce compression artifacts, or fill in 3D holes (e.g., hole filling). For 3D or light field data, the tracking algorithm may utilize both 2D and 3D depth features to establish more accurate temporal correspondences. The detection and interpolation of corresponded features may also utilize a neural-network based architecture.

In another example, the processing component 420, and therefore the display processing circuitry 130, can be configured to perform interlacing of light field views and light field intensity and color processing. The processing component 420 can perform display-centric neural network-based processing of the light field, which may include intensity or color processing, white balancing, view interlacing, vignetting correction of the micro-optics in a display panel, tone mapping, or other display panel-specific processing.

In another example, the processing component 420, and therefore the display processing circuitry 130, can be configured to perform viewer-specific or gaze-contingent processing with user, head, or eye tracking (e.g., by using the sensor(s) 155). Each of the processing tasks described above, and also those described in more detail below, may also benefit from knowing the specific position, head orientation, or gaze direction of the user(s). For example, all 3D image processing may be accelerated or improved in quality if the user's position with respect to the display or their gaze direction is known. User position, head orientation, or gaze direction may be estimated with the use of one or more camera or other sensors. The detection of faces and/or users may also leverage neural network processing.

Moreover, the processing component 420 can be further configured to receive information from the one or more sensors 155 in the display 110, where the information includes one or more of brightness or color of display environment, and where the information can be used in connection with performing the set of tasks that modify the data stream(s) 125 to produce modified data stream(s) 450 for presentation by the display 110.

Returning to FIG. 4, the processing engine 425 in the processing component 420 can be used to implement and execute the one or more neural networks that the display processing circuitry 130 uses to perform the various tasks described in this disclosure. Diagrams 500*a* and 500*b* in FIGS. 5A and 5B, respectively, illustrate examples of neural networks implemented and executed within the processing engine 425. These examples of neural networks, and variations thereof, may also be implemented by the architecture of the display processing circuitry 130 described below in connection with FIG. 8. In one implementation, the processing engine 425 can include a programmable neural network fabric 510 that is dynamically configurable or programmable by using different sets of neural network weights from, for example, the programmable weights component 445 in the configuration component 440 shown in FIG. 4.

In general, a neural network connects an input, which may be a collection of numbers to one or more interconnect layers, and eventually to an output layer. The input to a layer can come from the previous layer, or some other earlier layer (skip or residual connection), or later layer (recurrent connection). The inputs can be optionally multiplied with numerical weights. The sum of the optionally weighted inputs may be passed to a non-linear activation layer, such as a sigmoid function or a rectified linear unit (ReLU). There can be an optional pooling layer that combines several values into a single value, for example by taking a maximum or minimum of the inputs, or by summing them, or by averaging them. There can be one or more outputs at a layer, each with their own set of weights, non-linearities, and pooling.

The diagram 500*a* shows a couple of examples of neural network configurations that can be implemented and executed in the programmable neural network fabric 510.

In an example, a first neural network configuration (configuration 1 515) is shown that includes an input layer, a first intermediate layer (hidden layer 1), a second intermediate layer (hidden layer 2), and an output layer. Each of these layers can include one or more nodes, represented in the diagram 500a by a circle for each respective node. For example, the input layer has three (3) nodes, the hidden layer 1 has four (4) nodes, the hidden layer 2 has four (4) nodes, and the output layer has three (3) nodes. The particular set of weights that is used by the programmable neural network fabric 510 to implement this configuration establishes the number of nodes in each layer and the relationships between the node(s) in one layer and the node(s) in another layer. These relationships are represented in the diagram 500a by lines connecting any two particular nodes in separate layers.

In another example, a second neural network configuration (configuration 2 520) is shown that includes an input layer, a first intermediate layer (hidden layer 1), a second intermediate layer (hidden layer 2), a third intermediate layer (hidden layer 3), and an output layer. Each of these layers can include one or more nodes. For example, the input layer has four (4) nodes, the hidden layer 1 has six (6) nodes, the hidden layer 2 has four (4) nodes, the hidden layer 3 has three (3) nodes, and the output layer has one (1) node. The particular set of weights that is used by the programmable neural network fabric 510 to implement this configuration establishes the number of nodes in each layer and the relationships between the node(s) in one layer and the node(s) in another layer. Accordingly, the set of weights used to implement the configuration 1 515 is different from the set of weights used to implement the configuration 2 520.

The diagram 500b shows another example, where the programmable neural network fabric 510 can be used to implement and execute more than one neural network. In this example, two neural network configurations are shown, a configuration 3 525a and a configuration 4 525b, which can be implemented in the programmable neural network fabric 510. For purposes of illustration only, the configuration 3 525a and the configuration 4 525b are similar to the configuration 1 515 in the diagram 500a; however, the configurations and the number of configurations that can be implemented and executed can vary. Moreover, the configuration 3 525a and the configuration 4 525b can be implemented concurrently and performed or executed sequentially (e.g., the configuration 3 525a is performed first and its output(s) are provided as input(s) to the configuration 4 525b that is performed second), or they can be implemented and executed sequentially (e.g., the configuration 3 525a is implemented first and executed first, and its output(s) are stored and provided as input(s) to the configuration 4 525b that is implemented second and executed second). Similar approaches may be used when the number of neural networks to be implemented is greater than two (2).

Figure 5A:
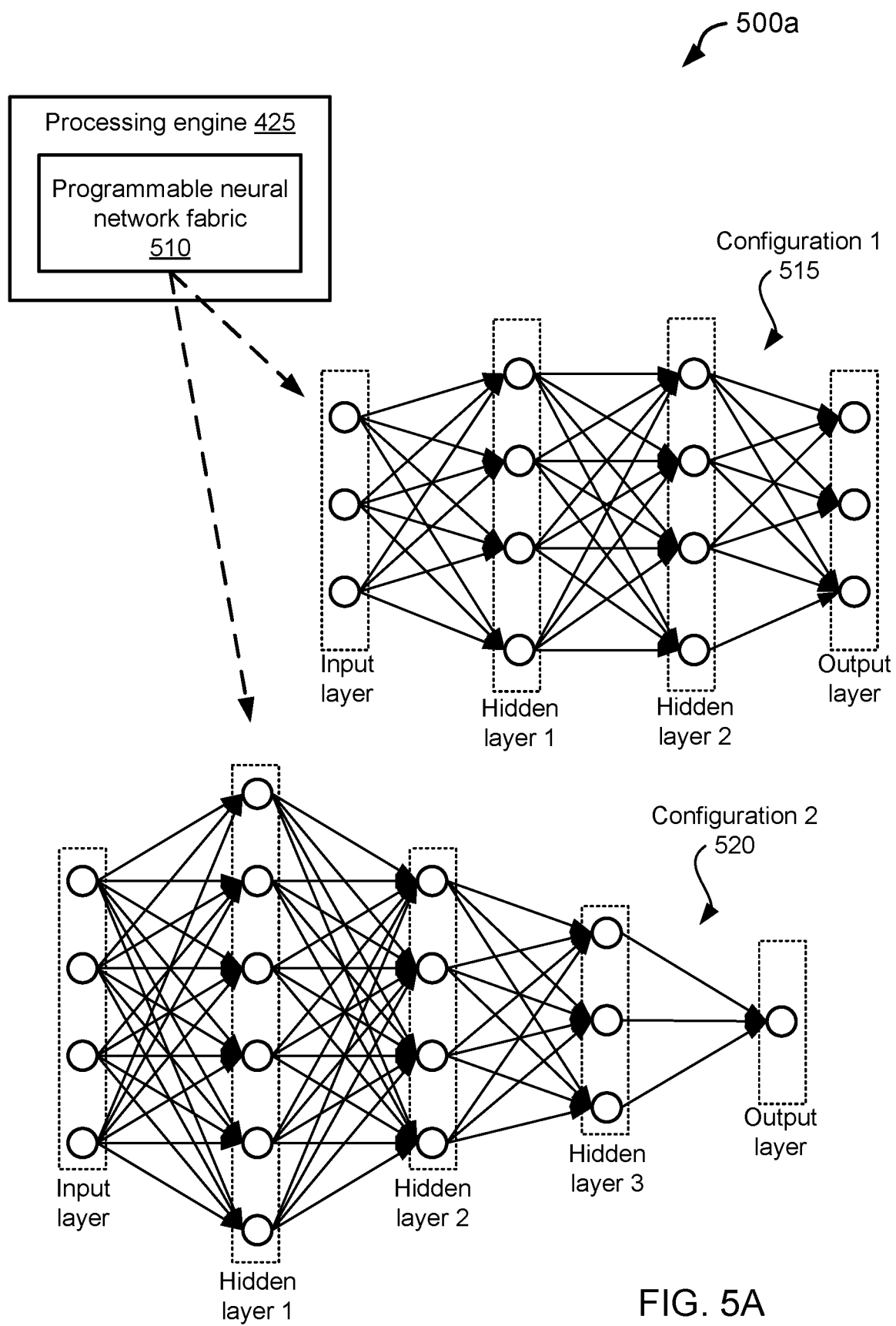
FIGS. 5A and 5B illustrate examples of programmable neural networks within a processing engine of a display processing unit, in accordance with aspects of this disclosure.
Figure 5B:
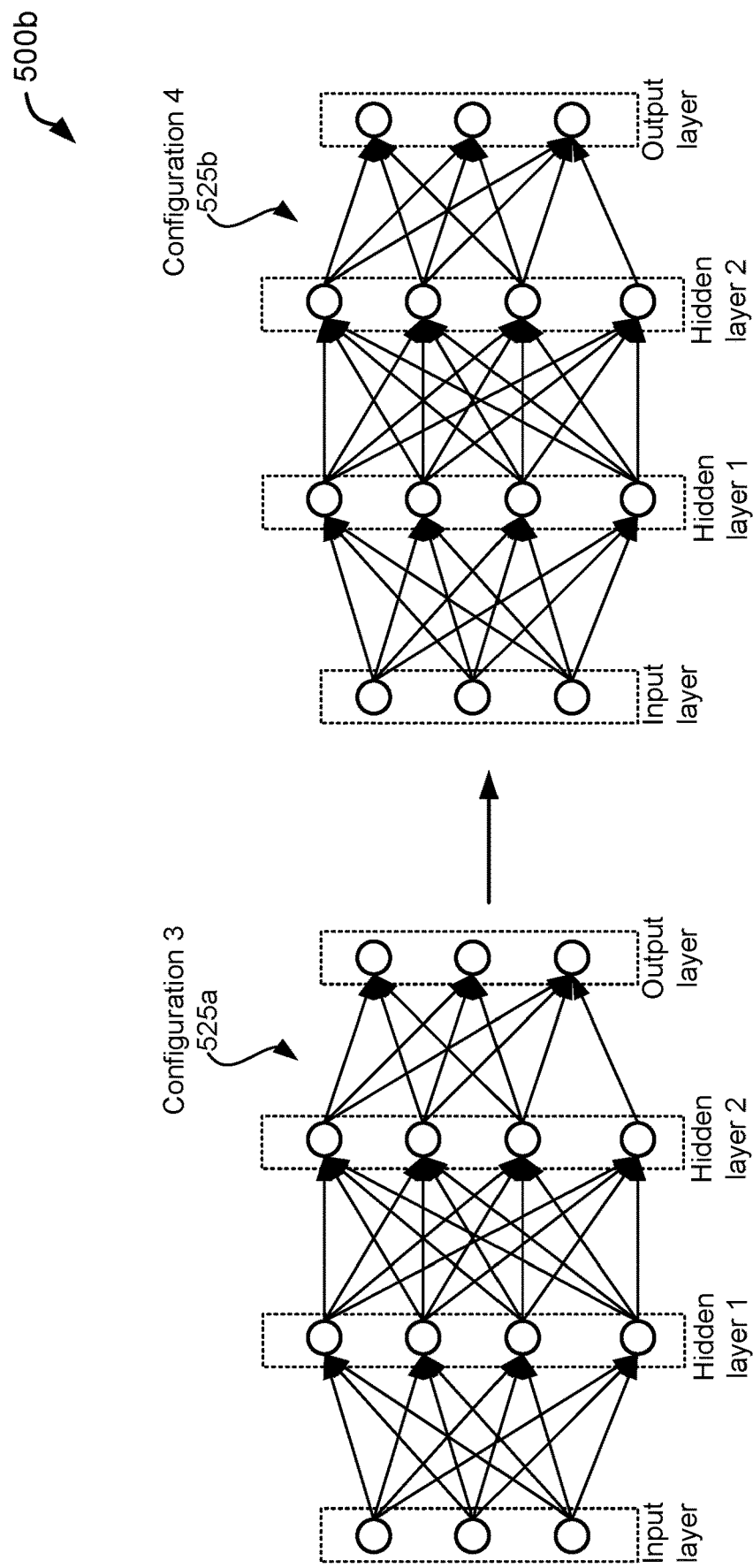

The examples shown in FIGS. 5A and 5B are provided by way of illustration and not of limitation, and many different configurations of neural networks can be implemented and executed in the programmable neural network fabric 510. That is, the number of nodes in a layer and the number of layers that are needed in a particular neural network configuration (that is, the set of weights being used) may vary according to the task being performed and the conditions for performing the task. Moreover, the number and size (e.g., number of layers and/or nodes per layer) of neural networks that can be implemented and/or executed sequentially can depend on the capabilities of the programmable neural network fabric 510. For example, if the programmable neural network fabric 510 can support large neural network configurations, multiple tasks may be combined into a single or a few neural networks. On the other hand, if the programmable neural network fabric 510 can support neural network configurations of a limited size, different tasks may be separated and implemented independently and sequentially using respective neural network configurations.

In another aspect of the diagrams 500a and 500b in FIGS. 5A and 5B, each neural network configuration can include different types of layers and/or connections. For example, a configuration can include at least one convolutional layer, at least one fully connected layer, at least one non-linear activation layer, at least one pooling layer, at least one up-sampling layer, at least one down-sampling layer, at least one skip or residual connection, at least one dense connection, or at least one feedback connection.

In another aspect of the implementation and execution of neural networks in and by the programmable neural network fabric 510, when the content/data or other information in the data stream(s) 125 being processed includes temporal video content, the one or more neural networks can include a recurrent neural network that maintains some information between frames of the temporal video content.

In yet another aspect of the implementation and execution of neural networks in and by the programmable neural network fabric 510, when the when the content/data or other information in the data stream(s) 125 being processed includes temporal video content, the one or more neural networks can include an on-board network that is trained at least in part with the temporal video content.

In yet another aspect of the implementation and execution of neural networks in and by the programmable neural network fabric 510, it is possible to modify or change one or more of the weights being used on the fly based on recent frames to adapt the one or more neural networks to current scene content. In this case, the types of tasks that may be performed by the adapted neural networks may include interpolation, super-resolution, or both, and the interpolation task can include one or more of spatial interpolation, angular interpolation, or temporal interpolation.

In yet another aspect of the implementation and execution of neural networks in and by the programmable neural network fabric 510, when the content/data or other information in the data stream(s) 125 includes multiple frames, then the set of tasks performed by the one or more neural networks can include estimation of a persistent 3D model of a scene by combining and aligning the multiple frames over time.

In yet another aspect of the implementation and execution of neural networks in and by the programmable neural network fabric 510, when the content/data or other information in the data stream(s) 125 includes multiple frames, then the set of tasks performed by the one or more neural networks can include estimation of a higher resolution model of a scene by combining visual details from the multiple frames over time.

In yet another aspect of the implementation and execution of neural networks in and by the programmable neural network fabric 510, when the content/data or other information in the data stream(s) 125 includes video, the processing engine 425 in the processing component 420 can be configured to detect one or both of cuts or jumps in the video by measuring a magnitude of visual changes that occur in one or both of scene content or views in the video. The one or more neural networks in the programmable neural network fabric 510 may be adapted or changed based on the detection of cuts or jumps in the video.

In yet another aspect of the implementation and execution of neural networks in and by the programmable neural network fabric 510, when the content/data or other information in the data stream(s) 125 includes multiple scenes, then the one or more neural networks are configured to maintain in short-term memory one or more of features, weights, or information associated with recently shown scenes from the content. The short term memory may be implemented in any of the components of the display processing circuitry 130, and in some cases, within the processing component 420 or the processing engine 425 in the processing component 420.

Figure 5C:
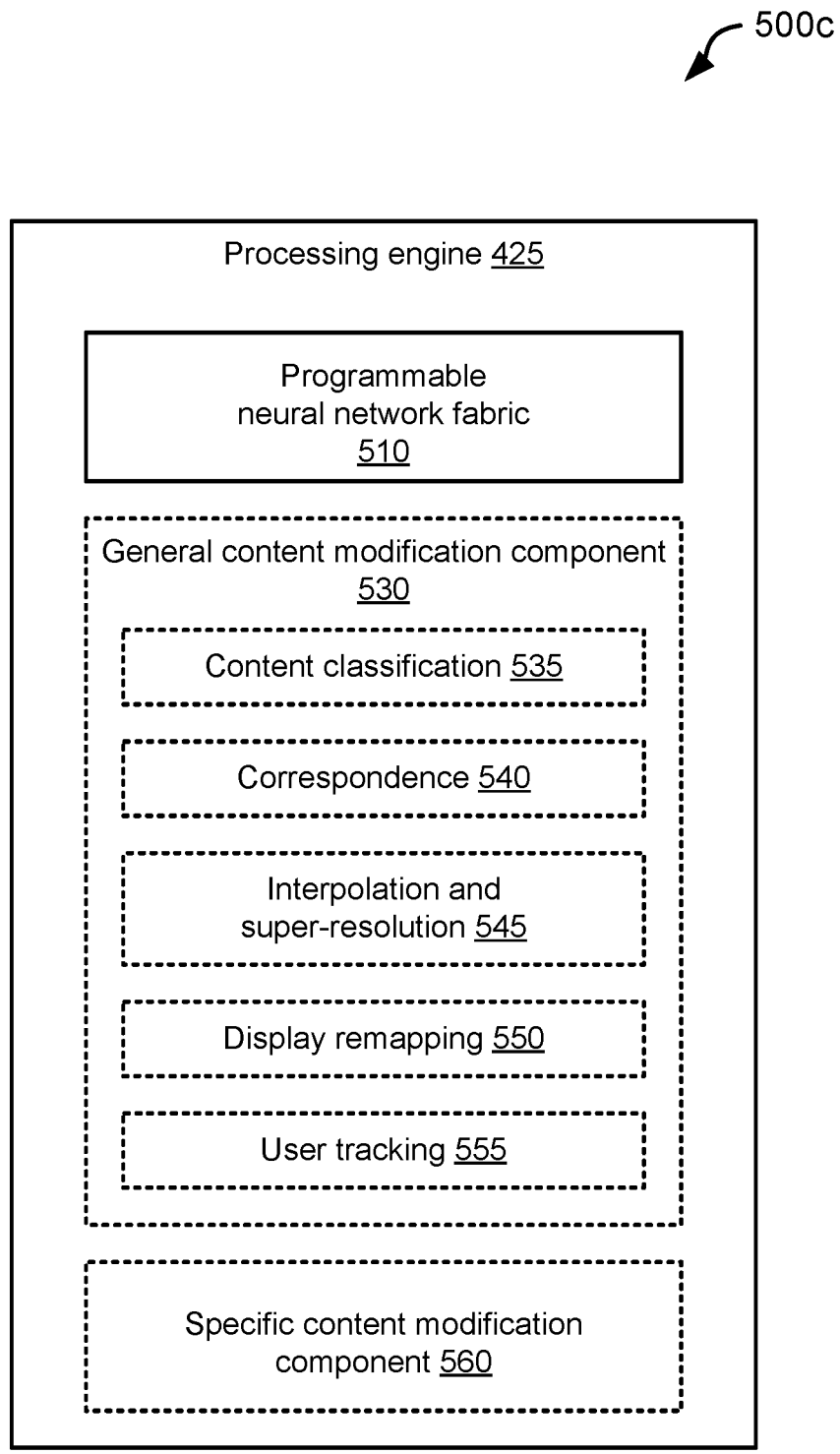
FIG. 5C is a block diagram illustrating the processing engine, in accordance with aspects of this disclosure.

FIG. 5C shows a block diagram 500c illustrating an example of the processing engine 425. In addition to the programmable neural network fabric 510, the processing engine 425 can optional include a general content modification component 530 that is configured to enable and control the tasks described above in connection with the display-side pipeline 330. For example, the general content modification component 530 can be used to enable and control the implementation and execution of different neural network configurations in the programmable neural network fabric 510 to perform the features of one or more of the content classification 340, the correspondence 350, the interpolation/super-resolution 360, the display remapping 370, or the user tracking 380 described above in connection with the diagram 300 in FIG. 3. In this regard, the general content modification component 530 can include a content classification 535 to coordinate aspects of the implementation and execution of features of the content classification 340 with one or more neural networks in the programmable neural network fabric 510, a correspondence 540 to coordinate aspects of the implementation and execution of features of the correspondence 530 with one or more neural networks in the programmable neural network fabric 510, an interpolation/super-resolution 545 to coordinate aspects of the implementation and execution of features of the interpolation/super-resolution 360 with one or more neural networks in the programmable neural network fabric 510, a display remapping 550 to coordinate aspects of the implementation and execution of features of the display mapping 370 with one or more neural networks in the programmable neural network fabric 510, and/or a user tracking 555 to coordinate aspects of the implementation of execution of features of the user tracking 380 with one or more neural networks in the programmable neural network fabric 510.

The processing engine 425 may also optionally include a specific content modification component 560 that is configured to enable and control more particular tasks such as the ones described in more detail below in connection with FIGS. 6A and 6B.

Figure 6A:
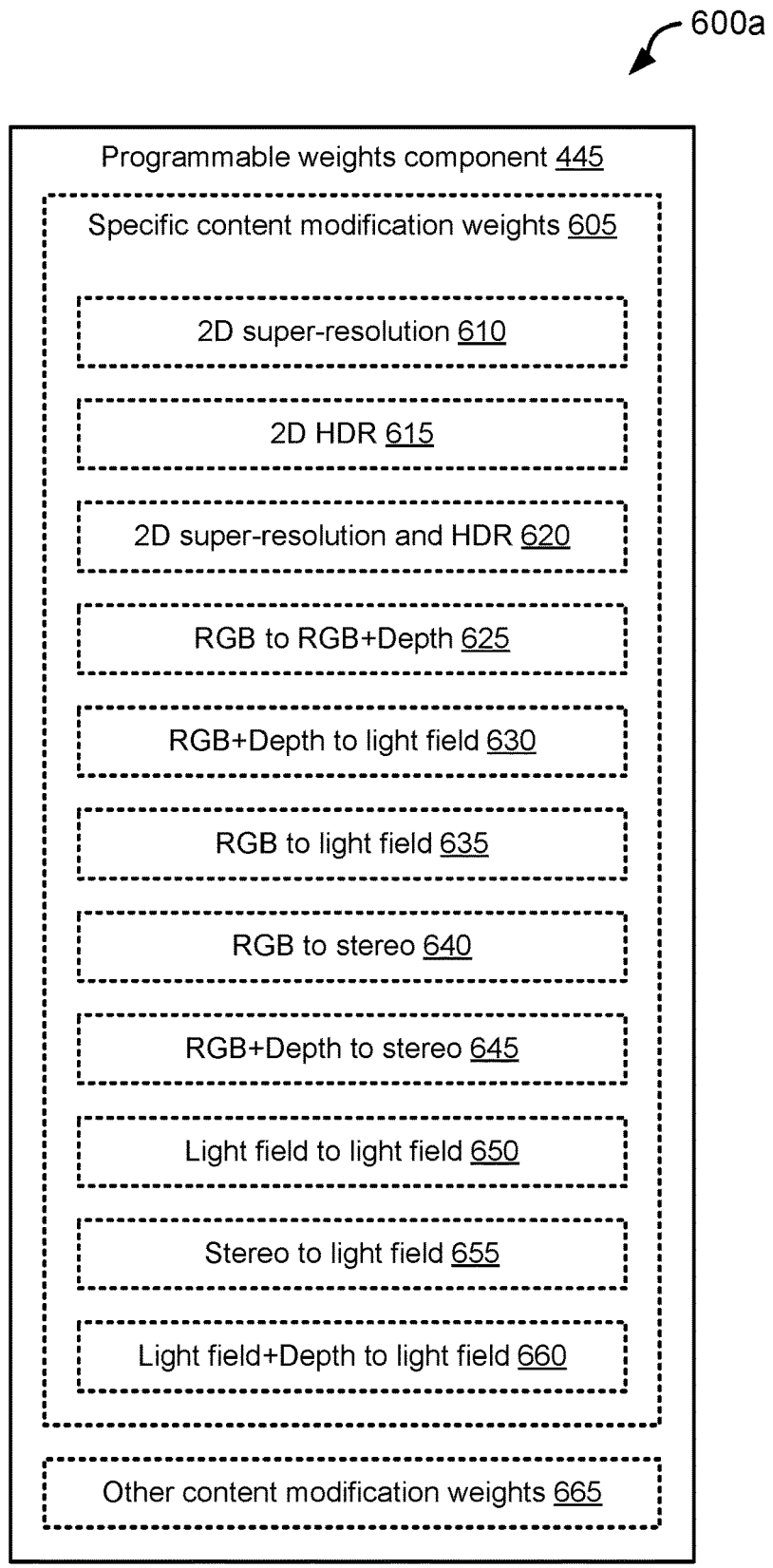
FIGS. 6A and 6B illustrate examples of different programmable weights for neural networks, in accordance with aspects of this disclosure.
Figure 6B:
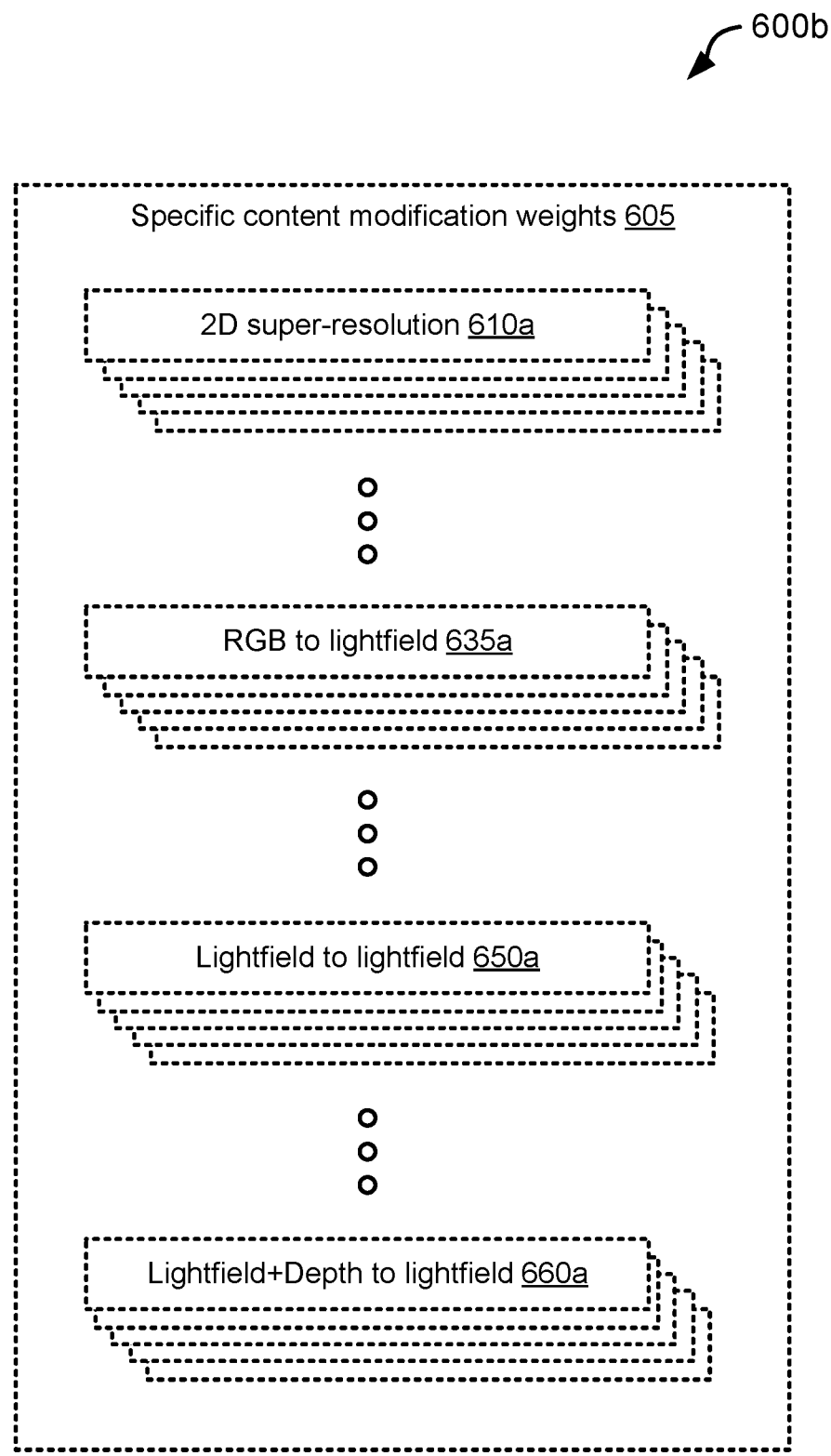

FIGS. 6A and 6B show diagrams 600a and 600b, respectively, that illustrate examples of different programmable weights for neural networks used in connection with the various tasks that can be performed by the display processing circuitry 130.

The diagram 600a shows the programmable weights component 445 that can be part of the configuration component 440, and which can be used to store different sets of weights for different tasks. These sets of weights can then be provided to or accessed by the processing component 420 for use by the programmable neural network fabric 510 in the processing engine 425 to implement and execute particular neural network configurations to perform various display-centric tasks on content/data received by the display processing circuitry 130.

In this example of the programmable weights component 445, there can optionally be another content modification weights 665 that may include neural network weights for performing any one of the tasks described above in connection with the display-side pipeline 330. In this regard, the general content modification component 530 in the processing engine 425 may use the weights in the other content modification weights 665 to enable and control the implementation and execution of neural networks for performing one or more of the content classification 340 (via the content classification 535), the correspondence 350 (via the correspondence 540), the interpolation/super-resolution 360 (via the interpolation and super-resolution 545), the display remapping 370 (via the display remapping 550), or the user tracking 380 (via the user tracking 555).

The programmable weights component 445 may optionally include a specific content modification weights 605 that may include neural network weights for performing specific or particular tasks described below. In this regard, the specific content modification component 560 in the processing engine 425 may use the weights in the specific content modification weights 605 to enable and control the implementation and execution of neural networks for performing one or more of these other tasks.

In some instances, the specific tasks associated with the specific content modification weights 605 may include the same or similar functionality, a subset of the functionality, or a combination of the functionality of the tasks described above, including the tasks in the display-side pipeline 330, and may also include additional or different functionality than that of the tasks described above.

In a first example of a specific task, a task involving 2D super-resolution may be performed by implementing and executing one or more neural networks in the programmable neural network fabric 510 of the processing engine 425, which is part of the processing component 420. The one or more neural networks are implemented using a set of weights from a 2D super-resolution 610 in the specific content modification weights 605.

In this example, the data stream(s) 125 from the source 120 include a 2D image or a 2D video, the modified content (e.g., the modified data stream(s) 450) produced by the processing component 420 includes a 2D image or a 2D video at a higher resolution than a resolution of the content from the source, and the weights (e.g., a set of weights from the 2D super-resolution 610) are determined such that the one or more neural networks are trained to up-sample the content from the source 120 to produce the higher resolution. A higher resolution includes a higher number of total pixels than a number of total pixels in the data stream(s) 125 of the source 120, or a higher resolution includes a higher density of pixels than a density of pixels in the data stream(s) 125 of the source 120.

In a second example of a specific task, a task involving 2D high dynamic range (HDR) may be performed by implementing and executing one or more neural networks in the programmable neural network fabric 510 of the processing engine 425, which is part of the processing component 420. The one or more neural networks are implemented using a set of weights from a 2D HDR 615 in the specific content modification weights 605.

In this example, the data stream(s) 125 from the source 120 include a 2D image or a 2D video, the modified content (e.g., the modified data stream(s) 450) produced by the processing component 120 includes a 2D image or a 2D video at a higher dynamic range than a dynamic range of the content from the source, and the weights (e.g., a set of weights from the 2D HDR 615) are determined such that the one or more neural networks are trained to process the data stream(s) 125 from the source 120 to produce the higher dynamic range.

In a third example of a specific task, a task involving 2D super-resolution and HDR may be performed by implementing and executing one or more neural networks in the programmable neural network fabric 510 of the processing engine 425, which is part of the processing component 420. The one or more neural networks are implemented using a set of weights from a 2D super-resolution and HDR 620 in the specific content modification weights 605.

In this example, the data stream(s) 125 from the source 120 include a 2D image or a 2D video, the modified content (e.g., the modified data stream(s) 450) produced by the processing component 420 includes a 2D image or a 2D video at a higher resolution and a higher dynamic range than a resolution and a dynamic range of the content/data 125 from the source 120, and the weights (e.g., a set of weights from the 2D super-resolution and HDR 620) are determined such that the one or more neural networks are trained to process the content from the source to produce the higher resolution and the higher dynamic range. In one implementation, the one or more neural networks can include a first neural network to produce the higher resolution and a second neural network to produce the higher dynamic range, the first neural network and the second neural network being concatenated (e.g., two configurations used in sequence). In another implementation, the one or more neural networks include a single neural network to produce the higher resolution and the higher dynamic range.

In a fourth example of a specific task, a task involving a conversion of red-green-blue (also referred to as red, green, blue or RGB) content to RGB with depth information (RGB+Depth) content may be performed by implementing and executing one or more neural networks in the programmable neural network fabric 510 of the processing engine 425, which is part of the processing component 420. The one or more neural networks are implemented using a set of weights from an RGB to RGB+Depth 625 in the specific content modification weights 605.

In this example, the data stream(s) 125 from the source 120 include an RGB image or video, the modified content (e.g., the modified data stream(s) 450) produced by the processing component 420 includes an RGB image or video with depth information, and the weights (e.g., a set of weights from the RGB to RGB+Depth 625) are determined such that the one or more neural networks are trained to process the data stream(s) 125 from the source 120 to produce the RGB image or video with depth information. The processing component 420 can be further configured to implement and execute a rendering engine to process the RGB image or video with depth information when modifying the content/data 125 for presentation by the display 110. The depth information can be in the form of one or more depth maps.

In a fifth example of a specific task, a task involving a conversion of RGB with depth information (RGB+Depth) content to light field content may be performed by implementing and executing one or more neural networks in the programmable neural network fabric 510 of the processing engine 425, which is part of the processing component 420. Light field content as described herein may refer to light field content used in a light field display such as the one described above in connection with FIGS. 2A-2C. Accordingly, light field content may include color and directionality information for one or more of picture elements, groups of light-emitting elements, or light-emitting elements (see, e.g., FIG. 2C). The one or more neural networks are implemented using a set of weights from an RGB+Depth to light field 630 in the specific content modification weights 605.

In this example, the data stream(s) 125 from the source 120 includes an RGB image or video with depth information, the modified content (e.g., the modified data stream(s) 450) produced by the processing component 420 includes light field or light field video with multiple RGB views of a three-dimensional (3D) scene, and the weights (e.g., a set of weights from the RGB+Depth to light field 630 are determined such that the one or more neural networks are trained to process the data stream(s) 125 from the source 120 to produce the multiple RGB views of the 3D scene. The one or more neural networks used in this case can be further trained to process the content/data 125 from the source 120 to produce the multiple RGB views of the 3D scene to perform one or more of a view synthesis operation, a hole filing operation, a super-resolution operation, or a low-dynamic-range (LDR) to high-dynamic-range (HDR) operation (LDR-to-HDR operation).

In a sixth example of a specific task, a task involving a conversion of RGB content to light field content may be performed by implementing and executing one or more neural networks in the programmable neural network fabric 510 of the processing engine 425, which is part of the processing component 420. The one or more neural networks are implemented using a set of weights from an RGB to light field 635 in the specific content modification weights 605.

In this example, the data stream(s) 125 from the source 120 includes an RGB image or video, the modified content (e.g., the modified data stream(s) 450) produced by the processing component 420 includes light field or light field video with multiple RGB views of a 3D scene, and the weights (e.g., a set of weights from the RGB to light field 635) are determined such that the one or more neural networks are trained to process the data stream(s) from the source 120 to produce the multiple RGB views of the 3D scene. The one or more neural networks can be further trained to process the content/data 125 from the source 120 to produce an intermediate result of the modified content that includes depth information.

In a seventh example of a specific task, a task involving a conversion of RGB content to stereo content may be performed by implementing and executing one or more neural networks in the programmable neural network fabric 510 of the processing engine 425, which is part of the processing component 420. The one or more neural networks are implemented using a set of weights from an RGB to stereo 640 in the specific content modification weights 605.

In this example, the data stream(s) from the source 120 includes an RGB image or video, the modified content (e.g., the modified data stream(s) 450) produced by the processing component 420 includes stereo image or stereo video, and the weights (e.g., a set of weights from the RGB to stereo 640) are determined such that the one or more neural networks are trained to process the data stream(s) 125 from the source 120 to produce the stereo image or stereo video. The stereo image or stereo video includes two views of a 3D scene.

In an eighth example of a specific task, a task involving a conversion of RGB with depth information content to stereo content may be performed by implementing and executing one or more neural networks in the programmable neural network fabric 510 of the processing engine 425, which is part of the processing component 420. The one or more neural networks are implemented using a set of weights from an RGB+Depth to stereo 645 in the specific content modification weights 605.

In this example, the data stream(s) 125 from the source 120 includes an RGB image or video with depth information, the modified content (e.g., the modified data stream(s) 450) produced by the processing component 420 includes stereo image or stereo video, and the weights (e.g., a set of weights from the RGB+Depth to stereo 645) are determined such that the one or more neural networks are trained to process the data stream(s) 125 from the source 120 to produce the stereo image or stereo video. As mentioned above, the stereo image or stereo video includes two views of a 3D scene.

In a ninth example of a specific task, a task involving a conversion of light field content to light field content may be performed by implementing and executing one or more neural networks in the programmable neural network fabric 510 of the processing engine 425, which is part of the processing component 420. The one or more neural networks are implemented using a set of weights from a light field to light field 650 in the specific content modification weights 605.

In this example, the data stream(s) 125 from the source 120 includes light field or light field video, the modified content (e.g., the modified data stream(s) 450) produced by the processing component 420 includes a modified light field or light field video with one or more of additional RGB views of a 3D scene compared to a number of RGB views in the content from the source, a higher resolution than a resolution of the content of the source, or a higher dynamic range than a dynamic range of the content of the source, and the weights (e.g., a set of weights from the light field to light field 650) are determined such that the one or more neural networks are trained to process the data stream(s) 125 from the source 120 to produce the modified light field or light field video.

In a tenth example of a specific task, a task involving a conversion of stereo content to light field content may be performed by implementing and executing one or more neural networks in the programmable neural network fabric 510 of the processing engine 425, which is part of the processing component 420. The one or more neural networks are implemented using a set of weights from a stereo to light field 655 in the specific content modification weights 605.

In this example, the data stream(s) 125 from the source 120 includes stereo image or stereo video, the modified content (e.g., the modified data stream(s) 450) includes light field or light field video with one or more of additional RGB views of a 3D scene compared to a number of RGB views in the content from the source, a higher resolution than a resolution of the content of the source, or a higher dynamic range than a dynamic range of the content of the source, and the weights (e.g., a set of weights from the stereo to light field 655) are determined such that the one or more neural networks are trained to process the data stream(s) 125 from the source 120 to produce the light field or light field video.

In an eleventh example of a specific task, a task involving a conversion of light field with depth information (light field+Depth) content to light field content may be performed by implementing and executing one or more neural networks in the programmable neural network fabric 510 of the processing engine 425, which is part of the processing component 420. The one or more neural networks are implemented using a set of weights from a light field+Depth to light field 660 in the specific content modification weights 605.

In this example, the data stream(s) 125 from the source 120 includes light field or light field video with depth information, the modified content (e.g., the modified data stream(s) 450) produced by the processing component 420 includes a modified light field or light field video with one or more of additional RGB views of a 3D scene compared to a number of RGB views in the content from the source, a higher resolution than a resolution of the content of the source, or a higher dynamic range than a dynamic range of the content of the source, and the weights (e.g., a set of weights from the light field+Depth to light field 660) are determined such that the one or more neural networks are trained to process the data stream(s) 125 from the source 120 to produce the modified light field or light field video. The depth information can include one of depth information for one RGB view in the content of the source, depth information for multiple RGB views in the content of the source, or depth information for all RGB view in the content of the source.

Aspects from any of these specific tasks, or from any of the other tasks described above, can be combined by using an appropriate set of weights that result from the training of the corresponding neural networks to be used to perform the combined aspects.

The diagram 600b in FIG. 6B shows how for a specific task there may be multiple sets of weights available from which one is selected or identified to perform the task based on various conditions or criteria. For example, limitations in the display capabilities, changes in user operation (e.g., user tracking), or environmental changes may be used to determine the best set of weights to use to perform a particular task. In the example shown in the diagram 600b, for each specific task there may be from a, . . . , n possible sets of weights from which one can be selected. The number of sets of weights may differ for each task such that one task may have fewer or more sets of weights than another task.

Figure 7:
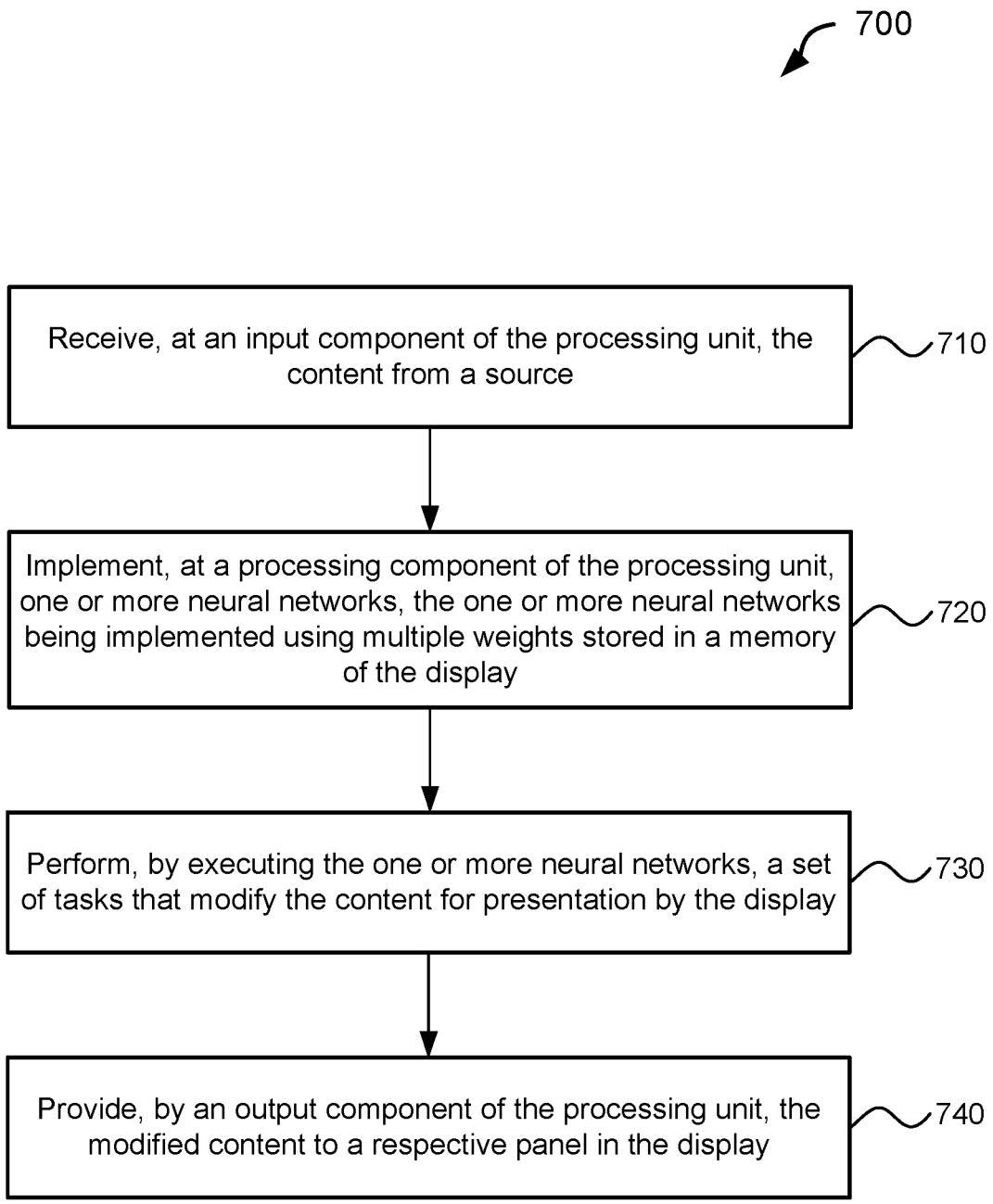
FIG. 7 is a flow chart illustrating an example of a method for a processing circuitry to process content within a display, in accordance with aspects of this disclosure.

FIG. 7 shows a flow chart illustrating an example of a method 700 for a processing unit such as the display processing circuitry 130 to process content within a display. Aspects of the method 700 may be performed by the display processing circuitry 130 (e.g., the one shown in FIG. 4), including one of more of its components and subcomponents such as the input component 410, the processing component 420, the output component 430, the processing engine 425, the configuration component 440, and/or the programmable weights component 445. The method 700 may also be performed by, for example, the display processing circuitry 130 shown in FIG. 8

At 710, the method 700 includes receiving, at an input component of the processing unit (e.g., the input component 410), the content from a source (e.g., content/data or other information from the one or more data streams 125 from the source 120).

At 720, the method 700 includes implementing, at a processing component of the processing unit (e.g., the processing component 420), one or more neural networks (see, e.g., FIGS. 5A and 5B), the one or more neural networks being implemented using multiple weights stored in a memory of the display (see, e.g., FIGS. 4, 6A, and 6B).

At 730, the method 700 includes performing, by executing the one or more neural networks (e.g., the processing component 420, the processing engine 425), a set of tasks that modify the content for presentation by the display.

At 740, the method 700 includes providing, by an output component of the processing unit (e.g., the output component 430), the modified content (e.g., the modified content/data in the modified one or more data streams 450) to a respective panel in the display (e.g., to respective backplane(s) 150 and array(s) of pixels 151 in the display 110).

In an aspect of the method 700, the content includes image content, video content, or both.

In another aspect of the method 700, performing the set of tasks includes modifying the content to increase a resolution of a 2D image or a 2D video.

In another aspect of the method 700, performing the set of tasks includes modifying the content to increase a dynamic range of a 2D image or a 2D video.

In another aspect of the method 700, performing the set of tasks includes modifying the content to increase a resolution and a dynamic range of a 2D image or a 2D video.

In another aspect of the method 700, performing the set of tasks includes modifying the content having an RGB image or video to produce an RGB image or video with depth information.

In another aspect of the method 700, performing the set of tasks includes modifying the content having RGB image or video with depth information to produce light field or light field video with multiple RGB views of a 3D scene.

In another aspect of the method 700, performing the set of tasks includes modifying the content having RGB image or video to produce light field or light field video with multiple RGB views of a 3D scene.

In yet another aspect of the method 700, performing the set of tasks includes modifying the content having light field or light field video to produce a modified light field or light field video including one or more of additional RGB views of a 3D scene compared to a number of RGB views in the content, a higher resolution than a resolution of the content, or a higher dynamic range than a dynamic range of the content.

In yet another aspect of the method 700, performing the set of tasks includes modifying the content having RGB image or video to produce stereo image or stereo video.

In yet another aspect of the method 700, performing the set of tasks includes modifying the content having RGB image or video with depth information to produce stereo image or stereo video.

In another aspect of the method 700, performing the set of tasks includes modifying the content having stereo image or stereo video to produce light field or light field video including one or more of additional RGB views of a 3D scene compared to a number of RGB views in the content, a higher resolution than a resolution of the content, or a higher dynamic range than a dynamic range of the content.

In another aspect of the method 700, performing the set of tasks includes modifying the content having light field or light field video with depth information to produce a modified light field or light field video including one or more of additional RGB views of a 3D scene compared to a number of RGB views in the content, a higher resolution than a resolution of the content, or a higher dynamic range than a dynamic range of the content.

It is to be understood that the method 700 described above can include additional aspects associated with the operation described above in connection with the display processing circuitry 130 and/or any of its components. Moreover, the example of the architecture for the display processing circuitry 130 and/or any of its components is provided by way of illustration and the functionality of two or more components or sub-components can be combined or distributed according to various design considerations without taking away from the overall features being covered by this disclosure.

Figure 8:
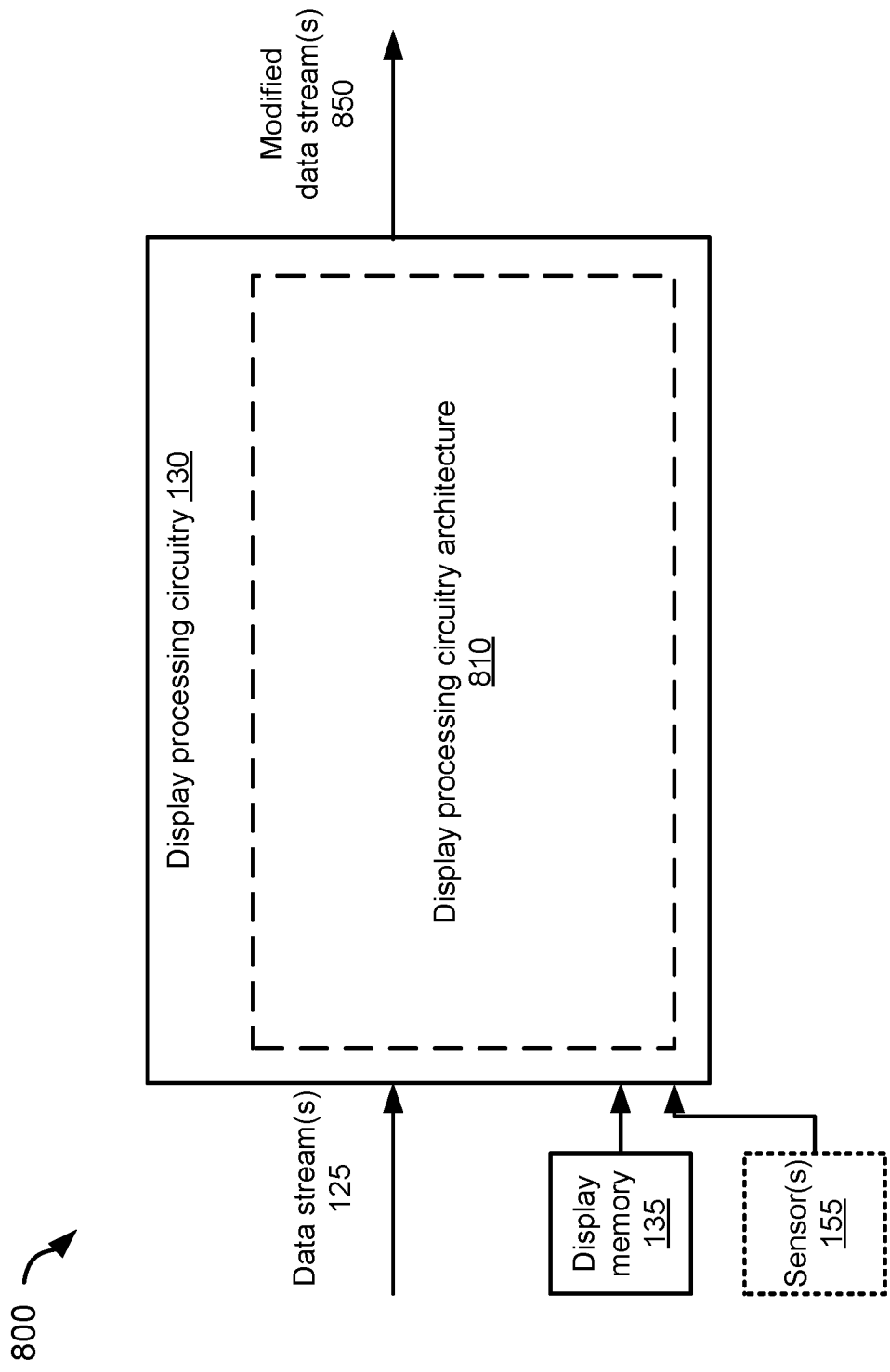
FIG. 8 is a block diagram illustrating another example of a display processing circuitry, in accordance with aspects of this disclosure.

FIG. 8 is a block diagram 800 illustrating another example of a display processing circuitry 130 that may be used with one or more displays 110, for example, where the displays 110 have light field capabilities (e.g., the display 210). The display processing circuitry 130 in FIG. 8 may receive one or more data streams 125 and generate one or more modified data streams 850. In some implementations, the display processing circuitry 130 may include a display processing circuitry architecture 810 that is configured to perform various operations associated with the display processing circuitry 130, including policy operations, modes of operation, and tasks, for example. The display processing circuitry 130 may be configured to receive data, signaling, or other information from the display memory 135 and/or optionally from the sensor(s) 155 (see, e.g., FIGS. 1B-1D).

Aspects of the display processing circuitry 130 in FIG. 8 may be combined with aspects of the display processing circuitry 130 in FIG. 4. For example, the types of inputs, outputs, and processing described in connection with one may be applicable with the other. For example, when the display processing circuitry 130 in FIG. 8 is configured to implement one or more neural networks, the display processing circuitry 130 in FIG. 8 may be configured to implement one or more of the aspects described in FIGS. 5A-6B, for example.

The display processing circuitry 130 in FIG. 8 may be used with one or more displays (see, e.g., displays 110a and 110b in FIG. 1D) and these displays may support multiple views (e.g., light field displays 210). The one or more displays may include one or more arrays of pixels (e.g., array of pixels 151), one or more backplanes (e.g., backplane 150) coupled to the one or more arrays of pixels; and processing circuitry (e.g., the display processing circuitry 130 in FIG. 8) coupled to the one or more backplanes. The processing circuitry is configured to receive one or more data streams (e.g., the data streams 125). The processing circuitry is further configured to control processing of the one or more data streams based on policies from which to select a mode of operation supported by the processing circuitry, where each mode of operation defines which rays of light (e.g., the rays 205 in FIG. 2C) the one or more arrays of pixels in the one or more displays are to contribute to generate a particular view or views and the tasks (e.g., operations, computations, algorithms) to be performed by the processing circuitry to modify the one or more data streams (e.g., modified data streams 850) such that the one or more arrays of pixels contribute the rays of light that will generate the particular view or views of the mode of operation. The processing circuitry is further configured to provide signaling (e.g., electrical, optical signaling) representative of the modified one or more data streams to the one or more arrays of pixels through a circuit configuration of the one or more backplanes for the one or more arrays of pixels to contribute the rays that will to generate the particular view or views of the mode of operation.

The processing circuitry in the one or more displays supports one or more modes of operation, and the one or more modes of operation may include one or more of: a first mode of operation in which a single view is generated for all viewers of the one or more displays, a second mode of operation in which a different view is generated for each viewer of the one or more displays, a third mode of operation in which multiple views are generated for each of one or more viewers of the one or more displays, a fourth mode of operation in which one or more views are generated for each of one or more viewers of the one or more displays, or a fifth mode of operation in which a single view is generated for one or more viewers of the one or more displays, and one or more views are generated for each of the remaining viewers of the one or more displays.

In an aspect, the circuit configuration of the one or more backplanes is a logical arrangement configured to distribute the signaling associated with the modified one or more data streams to specified portions of the one or more arrays of pixels.

In an aspect, an architecture (e.g., the display processing circuitry architecture 810) of at least a portion of the processing circuitry in the one or more displays may include a neural network architecture, a fixed-function logic signal processing architecture, or a programmable pipeline architecture. In some instances, the architecture of the processing circuitry may include a combination of the architectures described above.

In an aspect, when the architecture includes a neural network architecture, the neural network architecture is configured to perform an algorithm that processes one or more streams of input data (e.g., the data streams 125) into one or more streams of output data (e.g., the modified data streams 850), where a computation that the algorithm performs has been learned in a training process, and where the training process has been performed prior to processing of the input data.

The training process may be performed in a system different from the one or more displays prior to transferring a network configuration of the algorithm to the processing circuitry. Alternatively, the training process is performed in the processing circuitry of the one or more displays. In yet another alternative, the training process may be performed initially in a system different from the one or more displays prior to transferring a network configuration of the algorithm to the processing circuitry, and subsequently performed in the processing circuitry of the one or more displays as new data from the one or more data streams is processed. The learning in the training process may include an optimization of one or more cost or objective functions. The computation that the algorithm performs may be implemented using one or more networks (e.g., the neural networks in FIGS. 5A and 5B), and the one or more networks include one or more computational units the function of which is specified by one or more numbers and the one or more cost or objective functions are optimized by varying these one or more numbers. The one or more cost or objective functions are optimized by numerically applying gradient decent based optimization.

The training process may consist of providing a training set comprised of input data item and output data item pairs and the computation is optimized to produce an output substantially similar to the output item of the pair when the input item of the pair is provided as input to the computation. The output being substantially similar to the output item of the pair indicates a short distance apart using any one at least one distance metric including a Euclidian distance.

The training process may consist of providing a training set that includes input data items, where the computation that the algorithm performs is implemented using one or more networks, and the one or more networks are optimized to substantially reproduce the input data items in response to the training process. The input data items are modified, and the one or more networks are optimized to remove the modification to reproduce the unmodified input data items. The modification to the input data items include, but need not be limited to, one or more of adding noise to the input data items, adding distortions to the input data items, removing or masking parts of an image in the input data items.

The training process may consist of providing a training set, and the training set is a hybrid of samples that only contain an input item and samples that contain both the input item and a desired output item, where the computation that the algorithm performs is implemented using one or more networks, and the one or more networks are optimized to reproduce an unmodified input item for the samples that do not have an output item pair and to produce the desired output item for the samples that have a desired output item.

In another aspect, the computation that the algorithm performs may be implemented using at least two networks, and the two networks are trained jointly, where one network is trained to generate samples resembling samples from a training set and the other network is trained to determine if the samples are from the training set or generated by the other network.

In another aspect, the computation that the algorithm performs may be implemented using one or more networks, and the one or more networks are trained to optimize an overall cost or objective function over a sequence of outputs produced by the one or more networks.

In yet another aspect, the computation that the algorithm performs may be implemented using one or more networks, and the one or more networks connect an input provided by the one or more data stream, which is a collection of numbers, to one or more interconnect layers of the one or more networks, and eventually to an output layer of the one or more networks.

In another aspect, the computation that the algorithm performs may be implemented using one or more networks, and an input to a layer in the one or more networks (see, e.g., layers in neural networks in FIGS. 5A and 5B) can come from a previous layer in the one or more networks, a skip or residual connection to an earlier layer in the one or more networks, a feedback connection from a later layer in the one or more networks, or recurrent connection to a historical value of any layer in the one or more networks. Each of these inputs may be optionally multiplied by a numerical weight. Moreover, a sum of optionally weighted inputs may be passed to a non-linear activation layer of the one or more networks, wherein the non-linear activation layer provides one of a sigmoid function, a tan h function, a rectified linear unit (ReLU), or leaky rectified linear unit (leaky ReLU). When a hierarchical approach is used in connection with the display processing circuitry 130 (e.g., multiple processing levels or layers distributed over different ICs and/or different transistor-level circuitry), it is possible to implement different layers of a computational network (e.g., a neural network) in different levels or layers of the hierarchy. For example, a top level or layer of the display processing circuitry 130 may implement and execute one layer of a neural network, while a lower level or layer of the display processing circuitry 130 may implement a different layer or layers of the neural network.

In another aspect, the computation that the algorithm performs may be implemented using one or more networks, and the one or more networks include an optional pooling layer that combines several values into a single value. The combination of the several values into a single value is by taking a maximum or minimum of inputs, by summing the inputs, or by averaging the inputs.

In another aspect, the computation that the algorithm performs is implemented using one or more networks, and the one or more networks include one or more outputs at a layer, each output having its own set of weights, non-linearities, and pooling.

In yet another aspect, the computation that the algorithm performs may include simultaneous (or concurrent) processing of multiple tasks to be performed by the processing circuitry, where an output of each task is represented by a unique output data stream. The simultaneous processing of multiple tasks may include processing multiple input data streams from the one or more data streams into multiple output data streams.

In another aspect, the computation that the algorithm performs is implemented using one or more networks, and the one or more networks include layers that are shared by multiple tasks and task-specific layers that are not shared among tasks.

In those instances in which the architecture of the processing circuitry in the one or more displays (e.g., the display processing circuitry architecture 810) includes a neural network architecture, the neural network architecture is configured to implement and execute one or more neural networks (e.g., the neural network in FIGS. 5A and 5B) to perform, for the selected mode of operation, the tasks to modify the one or more data streams. Multiple weights of the one or more neural networks may be determined by optimizing a cost function over a set of training data, where the set of training data may include real world content, synthetic data, or both. The multiple weights of the one or more neural networks may be set during manufacturing of the one or more displays or dynamically updated during operation of the one or more displays, wherein the dynamic update occurs in response to the one or more data streams being received, in response to a software update, or both. The multiple weights of the one or more neural networks may be hard coded into the implementation of the one or more neural networks or may be stored in memory (e.g., display memory 135) and accessed for the implementation of the one or more neural networks. The multiple weights of the one or more neural networks may be adjusted based on one or more of which data streams are available in the one or more data streams, a content in the one or more data streams for display, a task to be performed to modify the one or more data streams, or an output mode of the one or more displays. Moreover, as discussed above, when a hierarchical approach is used in connection with the display processing circuitry 130 (e.g., multiple processing levels or layers distributed over different ICs and/or different transistor-level circuitry), it is possible to implement different layers of a computational network (e.g., a neural network) in different levels or layers of the hierarchy.

A configuration of each of the one or more neural networks in the neural network architecture includes one or more of: one or more convolutional layers, one or more fully connected layers, one or more pooling layers, one or more up-sampling layers, one or more down-sampling layers, one or more skip or residual connections, one or more dense connections, one or more feedback connections, one or more sparsely connected layers, one or more long-term or short-term memory units, or one or more recurrent connections.

In another aspect, the one or more neural networks include multiple neural networks and the multiple neural networks are concatenated. The one or more neural networks include multiple neural networks and different neural networks perform different tasks to modify the one or more data streams.

Further with respect to FIG. 8, when the display processing circuitry 130 is used with one or more displays, the one or more displays may also include one or more arrays of pixels (e.g., array of pixels 151). FIGS. 2A-2C illustrate examples where arrays of pixels in light field displays (e.g., light field display 210) may refer to arrays of picture elements 220 or arrays of light emitting elements 225, however, the arrays of pixels that may be used with the display processing circuitry 130 in one or more displays need not be so limited. The pixels in the array may be directional pixels (see, e.g., FIG. 2C). That is, different subsets of pixels in the one or more arrays of pixels may be configured to contribute to light directed towards different directions. Moreover, the pixels in the one or more arrays of pixels may be configured to contribute different colors of light and different intensities of light in one or more directions.

The one or more arrays of pixels used with the display processing circuitry 130 in FIG. 8 and with one or more displays may include one or more layers, where each layer includes one or more of light producing elements, light absorbing elements, light reflective elements, light transmissive elements, light modifying elements, or optical elements. The optical elements may include on or more of lenses, optical barriers, waveguides, fiber optics, switchable optics, directional modifying elements, polarization modifying elements, or light splitting elements.

In another aspect of the display processing circuitry 130 in FIG. 8, the display processing circuitry 130 may include one or more of application specific integrated circuits, field programmable gate arrays, programmable integrated circuits, central processing units, graphics processing units, tensor processing units, neural network integrated circuits, vision processing units, or neuromorphic processors. For example, the display processing circuitry architecture 810 of the display processing circuitry 130 includes one or more of the above listed devices or is implemented using one or more of the above listed devices.

As described above in connection with FIGS. 2D and 2E, the processing circuitry (e.g., the display processing circuitry 130 in FIG. 8) includes electronic hardware that operates in accordance with the policies and the selected mode of operation. The processing circuitry may further include stored instructions to operate the electronic hardware in accordance with the policies and the selected mode of operation. The instructions may be in the form of software, firmware, or both. The electronic hardware in the processing circuitry may include transistor-level circuitry spatially distributed across the one or more backplanes. The transistor-level circuitry distributed across the one or more backplanes may be formed on a same substrate as transistor-level circuitry of the circuit configuration of the backplane. The electronic hardware in the processing circuitry may include multiple discrete integrated circuit (IC) units (see, e.g., FIG. 2E) spatially distributed across the backplane, wherein each IC unit is associated with a subset of the array of pixels. Each of the IC units may be configured to perform the same functionality, or alternatively, different IC units may be configured to perform different functionality. In a different implementation, the electronic hardware in the processing circuitry may include multiple IC units spatially distributed across the one or more backplanes and may also include transistor-level circuitry that is also spatially distributed across the one or more backplanes. Moreover, the electronic hardware in the processing circuitry may be implemented as a hierarchy of circuits (see, e.g., FIG. 2E) that separate processing tasks spatially, angularly, temporally, by random distribution, by order of arrival, by some other order associated with the one or more data streams, or by a combination thereof. The separate processing tasks in the hierarchy of circuits may be processed simultaneously, sequentially, or both.

Further with respect to FIG. 8, when the display processing circuitry 130 is used with one or more displays, at least one of the one or more data streams (e.g., the data streams 125) received by the display processing circuitry 130 includes a representation of real world content, synthetic data, or both, that when modified by the processing circuitry produces signals that are provided to the one or more arrays of pixels through the circuit configuration of the one or more backplanes to contribute the rays of light that will generate the particular view or views.

The one or more data streams received by the display processing circuitry 130 include one or more of a two-dimensional (2D) image or a 2D video, multi-colored image or multi-colored video (e.g., RGB image or RGB video), multi-colored image or multi-colored video with depth information, depth information including one or more depth maps, light field or light field video, multiple frames, ray or ray bundles, sequence or sequences of rays or ray bundles, sensory data, audio data, brightness, color of display environment, or both, from the one or more displays, or an estimate of a viewer position with respect to the one or more displays, a viewer head orientation, or a viewer gaze direction. The sensory data may be received from, for example, the sensor(s) 155 through the data stream(s) 125 and/or directly from the sensor(s) 155. The depth information may include one or more of depth information for one color stream in a data source, depth information for multiple color streams in a data source, or depth information for all color streams in a data source.

The one or more data streams received by the display processing circuitry 130 may include channels associated with the pixels in the one or more arrays of pixels, where each channel includes one or more of one or more colors, depth, transparency, embedded features, image segmentation and labeling, directional data, or saliency or importance weights. With respect to saliency, a part of a 3D scene or 2D image that perceptually stands out from the rest is referred to as being salient. Fast changes in color or intensity, either in time or space, tend to be more salient than uniform areas. For a human observer a human face tends to be salient. In general, viewers pay more attention to salient regions, so it is more important to display salient regions with higher fidelity than non-salient regions.

The one or more data streams received by the display processing circuitry 130 may include scene description, where the scene description is one or more of: 2D or 3D objects, material properties, lighting, camera parameters, user or viewer positions, timecode, high-level image features, image segmentation or labeling, or content descriptions.

The one or more data streams received by the display processing circuitry 130 may include one or more images, images representing view positions or eye positions, one or more stereo pairs representing eye position, regular or irregular sampling of view positions or eye positions, or one or more light fields.

In an aspect, each of the one or more data streams received by the display processing circuitry 130 may be compressed or uncompressed.

The one or more data streams received by the display processing circuitry 130 may include information from one or more sensors in the one or more displays (e.g., the sensor (s0 155), where the information includes one or more of photosensors recording of brightness and color of the display environment, camera viewing of environment, users, or both, around the one or more displays, microphone recording of environment, users, or both, around the one or more displays, or user input and preferences. Accordingly, the sensor(s) 155 may include photosensors, cameras, microphones, and/or input devices.

Further with respect to FIG. 8, when the display processing circuitry 130 is used with one or more displays, the one or more modified data streams (e.g., the modified data streams 850) that are generated, produced, or formed by the display processing circuitry 130 include one or more of a two-dimensional (2D) image or a 2D video, multi-colored image or multi-colored video (e.g., RGB image or RGB video) with depth information, stereo image or stereo video, rays or ray bundles, sequences of rays or sequences of ray bundles, light field or light field video, or light field or light field video with multiple multi-color views of a 3D scene.

The modified one or more data streams may include channels associated with the pixels in the one or more arrays of pixels, each channel including one or more of one or more colors, depth, transparency, embedded features, image segmentation and labeling, directional data, or saliency or importance weights. With respect to transparency, objects or image layers can be opaque, meaning that they block all the light, and a viewer cannot see through them. An object or image layer that is fully transparent is invisible. A partially transparent object or layer shows part of the scene that is behind it, and adds its own color. Transparency is often encoded with an additional color channel called an alpha channel, where alpha value one means fully opaque, zero means fully transparent, and value between one and zero is partially transparent.

The modified one or more data streams may include scene description (e.g., some form of metadata), where the scene description is one or more of 2D or 3D objects, material properties, lighting, camera parameters, user or viewer positions, timecode, high-level image features, image segmentation or labeling, or content descriptions.

In another aspect, the modified one or more data streams may include one or more of one or more images, images representing view positions or eye positions, one or more stereo pairs representing eye positions, regular or irregular sampling of view positions or eye positions, or one or more light fields.

Moreover, each of the modified one or more data streams is compressed or is uncompressed.

Further with respect to FIG. 8, when the display processing circuitry 130 is used with one or more displays, the task or tasks to be performed by the processing circuitry to modify the one or more data streams may include one or more of converting to a higher resolution having a higher number of total pixels than an original number of pixels or a higher density of pixels than an original density of pixels, producing a higher dynamic range by extrapolating a range beyond an original range, producing multi-colored image or multi-colored video with depth information, producing a stereo image or stereo video, producing one or multiple multi-color views of a 3D scene, producing additional multi-color views of a 3D scene, estimating of a higher resolution model of a scene by combining visual details from multiple frames, or detecting one or both of cuts or jumps in video by measuring a magnitude of visual changes that occur in one or both of scene content or views in the video.

The task of producing one or multiple multi-color views of a 3D scene further includes one or more of a view synthesis operation, a hole-filling operation, a super-resolution operation, a depth adjusting operation, a bandwidth controlling by foveated rendering, or a low-dynamic-range (LDR)-to-high-dynamic-range (HDR) conversion.

The task or tasks to be performed by the processing circuitry to modify the one or more data streams may include one or more of content classification, correspondence, interpolation and super-resolution, display remapping, user tracking, conversion to multi-view, depth estimation, image segmentation, or estimation of scene properties.

The task of content classification described above provides for dimension reduction to classify individual pixels, 2D features, 3D features, image type, or a combination thereof. Dimension reduction enables representation of information with fewer information that is more easy to process and/or more targeted.

In another aspect, the task of content classification described above provides for the classification of content in the one or more data streams, where the processing circuitry is further configured to dynamically load in response to the classification a unique set of multiple weights from different sets of multiple weighs accessible by the processing circuitry (e.g., from the display memory 135), and where one or more processing networks (e.g., neural networks) are implemented in the processing circuitry using the unique set of multiple weights.

In another aspect, the content classification described above may include one or more of the following: classifying content by application (e.g., gaming, word-processing, sports, teleconferencing, etc.), classifying content by subject (humans, text, landscape, indoor, outdoor, etc.), classification based on estimated depth, motion, performing estimation/classification of scene parameters (e.g., lighting, camera, geometry), and performing estimation of scene cuts (e.g., due to magnitude of change, intensity, motion). Scene estimation relates both to content classification but also general depth/3D estimation. Estimation of depth is a lot more robust if each frame is not treated in isolation, but use the additional information to fill in holes, estimate depth from motion, reduce noise, etc. In some applications, such as word-processing, will tend to be dominated by 2D text—in which case content would most likely be optimized to be viewed at the display plane with a focus on spatial resolution, contrast, and legibility. Teleconferencing tends to focus on the human body where capturing the eyes and mouth detail is most important. Other applications such as gaming or sports will be more dynamic and have much larger range of content for purposes of classification. In practice it would be possible to train a neural network on a specific class of data (e.g., faces, sports, text) and switch the weights needed by the neural network at run-time based on the data being processes.

The task of display remapping described above includes one or more of an intensity remapping, a brightness remapping, a resolution remapping, an aspect ratio remapping, a color remapping, or a depth remapping. The display remapping may include a depth remapping that provides for an adjustment of weights in the interpolation portion of the interpolation and super-resolution to warp image intensity and disparity to fit within a display depth budget using one or more perceptual metrics. As described above, the process of depth remapping involves modifying the 3D structure of the scene so that parts of the scene are moved closer to the display plane. The display remapping may include a depth remapping that is applicable when depth information is available or a disparity remapping that is applicable when depth information is not available. The disparity remapping may be used in connection with, for example, stereo image or stereo video. Additionally, the processing circuitry is further configured to convert the disparity remapping to depth information.

The task of display remapping described above may be based on one or more remapping parameters, where the one or more remapping parameters are associated with one or both of parameters of the one or more displays or capabilities of the one or more displays, and where the one or both of parameters of the one or more displays or capabilities of the one or more displays include one or more of spatial resolution, angular resolution, dynamic range, or field of view.

The task of content classification described above provides for classification of data in the one or more data streams based on one or more criteria, and the processing circuitry is configured to dynamically update the tasks to be performed by the processing circuitry to modify the one or more data streams in response to the classification.

The task of interpolation and super-resolution described above provides for one or both of a 2D-to-3D conversion or an LDR-to-HDR conversion.

The task of display remapping described above may include one or more of an intensity remapping, a brightness remapping, a resolution remapping, an aspect ratio remapping, a color remapping, or a content depth remapping.

In another aspect, the processing circuitry (e.g., the display processing circuitry 130 in FIG. 8) is further configured to modify the tasks to be performed by the processing circuitry to modify the one or more data streams based on recent frames by adapting the tasks to current scene content, and when the modified tasks include interpolation, the interpolation may include one or more of spatial interpolation, angular interpolation, or temporal interpolation.

In another aspect, the one or more data streams received by the processing circuitry may include multiple frames, and the tasks to be performed by the processing circuitry to modify the one or more data streams may include estimation of a persistent 3D model of a scene by combining and aligning the multiple frames over time.

In yet another aspect, the one or more data streams received by the processing circuitry may include multiple frames, and the tasks to be performed by the processing circuitry to modify the one or more data streams may include estimation of a higher resolution model of a scene by combining visual details from the multiple frames over time.

In yet another aspect, the one or more data streams received by the processing circuitry may include video, and the processing circuitry is further configured to detect one or both of cuts or jumps in the video by measuring a magnitude of visual changes that occur in one or both of scene content or views in the video.

In another aspect, the one or more data streams received by the processing circuitry may include multiple scenes, and the processing circuitry is configured to maintain one or more of features, weights, or information associated with previously shown scenes.

Further with respect to FIG. 8, when the display processing circuitry 130 is used with one or more displays, the task or tasks to be performed by the processing circuitry to modify the one or more data streams may include estimation of depth information for multiple frames from 2D image or video in the one or more data streams.

Moreover, the task or tasks to be performed by the processing circuitry to modify the one or more data streams may include synthesizing additional pixel data by increasing the pixel data by one or more of spatial resolution, angular resolution, temporal resolution, bit depth, dynamic range, or both, pixel channels including color, depth, spectral sampling, or transparency, directional data, or saliency or importance weights.

At least some of the tasks to be performed by the processing circuitry to modify the one or more data streams may be configured to adapt content in the one or more data streams based on an architecture and capabilities of the one or more displays including one or more of available spatial resolution, available angular resolution, refresh rate, color gamut, or dynamic range, the at least some of the tasks may include one or more of intensity processing, color processing, white balancing, view interlacing, tone mapping, or correction for display optics.

The one or more displays (e.g., the displays 110, 210) may be calibrated to measure display capabilities and variations in one or more of pixel intensity, color gamut, refresh rate, or dynamic range, where the calibration of the one or more displays is performed during manufacturing of the one or more displays or during operation of the one or more displays.

The tasks to be performed by the processing circuitry to modify the one or more data streams may be selectively applied to one or more subsets of the pixels in the array of pixels, where the one or more subsets being spatial subsets, angular subsets, or temporal sub sets.

In another aspect, at least some of the tasks to be performed by the processing circuitry to modify the one or more data streams may be configured to analyze multiple frames, and these tasks may include tracking motion across frames in video content.

In yet another aspect, at least one of the tasks to be performed by the processing circuitry to modify the one or more data streams may be based at least in part on an estimate of one or more user positions with respect to the one or more displays, the user position being indicated by 2D or 3D head position information, 2D or 3D eye position information, head orientation information, eye orientation information, gaze direction, or a combination thereof.

Further with respect to FIG. 8, where the display processing circuitry 130 is used with one or more displays and the capabilities of the one or more displays include one or more of ultra-high-resolution capabilities, or high-dynamic-range capabilities. In an example, the ultra-high-resolution capabilities may include support for resolutions of 8 K and higher.

Figure 9:
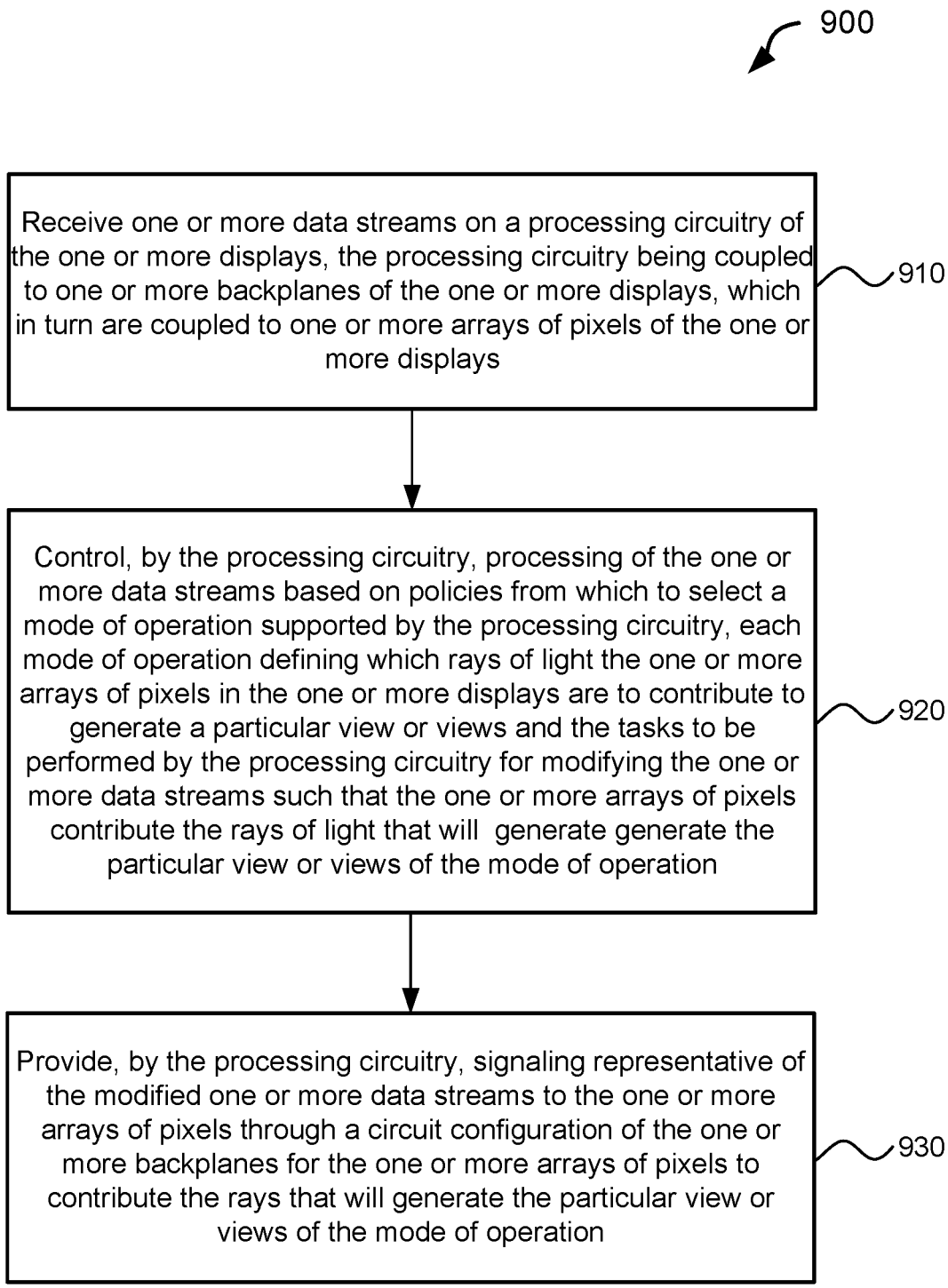
FIG. 9 is a flow chart illustrating an example of a method for a processing circuitry to process one or more data streams within one or more displays, in accordance with aspects of this disclosure.

FIG. 9 is a flow chart illustrating an example of a method 900 for a processing circuitry to process one or more data streams within one or more displays (e.g., the displays 110, 210). The method 900 may be performed by the display processing circuitry 130 shown in FIG. 8. Additionally, aspects of the method 900 may also be performed by the display processing circuitry 130 shown in FIG. 4. The method 900 enables processing of data streams (e.g., the data streams 125) on one or more displays that support multiple views (e.g., the displays 210).

At 910, the method 900 includes receiving one or more data streams on a processing circuitry (e.g., the display processing circuitry 130) of the one or more displays, where the processing circuitry is coupled to one or more backplanes (e.g., the backplane(s) 150) of the one or more displays, which in turn are coupled to one or more arrays of pixels (e.g., the array(s) of pixels 151) of the one or more displays.

At 920, the method 900 includes controlling, by the processing circuitry, processing of the one or more data streams based on policies from which to select a mode of operation supported by the processing circuitry, each mode of operation defining which rays of light (see, e.g., the ray 205 in FIG. 2C) the one or more arrays of pixels in the one or more displays are to contribute to generate a particular view or views and the tasks to be performed by the processing circuitry for modifying the one or more data streams (e.g., the modified data streams 850) such that the one or more arrays of pixels contribute the rays of light that will generate the particular view or views of the mode of operation.

At 930, the method 900 includes providing, by the processing circuitry, signaling representative of the modified one or more data streams to the one or more arrays of pixels through a circuit configuration of the one or more backplanes for the one or more arrays of pixels to contribute the rays that will generate the particular view or views of the mode of operation.

In an aspect of the method 900, the processing circuitry supports one or more modes of operation, and the one or more modes of operation include one or more of a first mode of operation in which a single view is generated for all viewers of the one or more displays, a second mode of operation in which a different view is generated for each viewer of the one or more displays, a third mode of operation in which multiple views are generated for each of one or more viewers of the one or more displays, a fourth mode of operation in which one or more view are generated for each of one or more viewers of the one or more displays, or a fifth mode of operation in which a single view is generated for one or more viewers of the one or more displays, and one or more views are generated for each remaining viewer of the one or more displays.

In another aspect of the method 900, the circuit configuration of the one or more backplanes is a logical arrangement configured to distribute the signaling associated with the modified one or more data streams to specified portions of the one or more arrays of pixels.

In another aspect of the method 900, an architecture of at least a portion of the processing circuitry (e.g., the display processing circuitry architecture 810) includes a neural network architecture, a fixed-function logic signal processing architecture, or a programmable pipeline architecture.

In another aspect of the method 900, when the architecture is a neural network architecture, the method 900 further comprises performing, by the neural network architecture, an algorithm for processing one or more streams of input data into one or more streams of output data, where a computation that the algorithm performs has been learned in a training process, and where the training process has been performed prior to processing of the input data.

In another aspect of the method 900, the method 900 includes performing the training process a system different from the one or more displays prior to transferring a network configuration of the algorithm to the processing circuitry. Alternatively, the training process may be performed in the processing circuitry of the one or more displays. Moreover, the training process may be performed initially in a system different from the one or more displays prior to transferring a network configuration of the algorithm to the processing circuitry, and may be performed subsequently in the processing circuitry of the one or more displays as new data from the one or more data streams is processed.

In another aspect of the method 900, the learning in the training process may include optimizing one or more cost or objective functions.

In another aspect of the method 900, the method 900 may further include implementing the computation that the algorithm performs using one or more networks, and the one or more networks include one or more computational units the function of which is specified by one or more numbers and the one or more cost or objective functions are optimized by varying these one or more numbers. The method may further include optimizing the one or more cost or objective functions by numerically applying gradient decent based optimization.

In another aspect of the method 900, the training process may consist of providing a training set comprised of input data item and output data item pairs and the computation is optimized to produce an output substantially similar to the output item of the pair when the input item of the pair is provided as input to the computation. The output being substantially similar to the output item of the pair indicates a short distance apart using any one at least one distance metric including a Euclidian distance.

In another aspect of the method 900, the training process may consist of providing a training set comprised of input data items, the method further including implementing the computation that the algorithm performs using one or more networks (e.g., the neural networks as in FIGS. 5A and 5B), and the method further including optimizing the one or more networks to substantially reproduce the input data items in response to the training process. The method may further include modifying the input data items, and the one or more networks are optimized to remove the modification to reproduce the unmodified input data items. In addition, modifying the input data items may include one or more of adding noise to the input data items, adding distortions to the input data items, removing or masking parts of an image in the input data items.

In another aspect of the method 900, the training process may consist of providing a training set, and the training set is a hybrid of samples that only contain an input item and samples that contain both the input item and a desired output item, the method may further include implementing the computation that the algorithm performs using one or more networks, and the method further include optimizing the one or more networks to reproduce an unmodified input item for the samples that do not have an output item pair and to produce the desired output item for the samples that have a desired output item.

In another aspect of the method 900, the method 900 may further include implementing the computation that the algorithm performs using at least two networks, where the two networks are trained jointly, and where one network is trained to generate samples resembling samples from a training set and the other network is trained to determine if the samples are from the training set or generated by the other network.

In another aspect of the method 900, the method 900 may further include implementing the computation that the algorithm performs using one or more networks, where the one or more networks are trained to optimize an overall cost or objective function over a sequence of outputs produced by network, the one or more networks connect an input provided by the one or more data stream, which is a collection of numbers, to one or more interconnect layers of the network, and eventually to an output layer of the one or more networks, an input to a layer in the one or more networks can come from a previous layer in the one or more networks, a skip or residual connection to an earlier layer in the one or more networks, a feedback connection from a later layer in the one or more networks, or recurrent connection to a historical value of any layer in the one or more networks, or a combination thereof. The method may further include optionally multiplying each input by a numerical weight, and passing a sum of optionally weighted inputs to a non-linear activation layer of the one or more networks, wherein the non-linear activation layer provides one of a sigmoid function, a tan h function, a rectified linear unit (ReLU), or leaky rectified linear unit (leaky ReLU).

In another aspect of the method 900, the method 900 may further include implementing the computation that the algorithm performs using one or more networks, where the one or more networks include an optional pooling layer that combines several values into a single value by taking a maximum or minimum of inputs or by summing the inputs.

In another aspect of the method 900, the method 900 may further include implementing the computation that the algorithm performs using one or more networks, where the one or more networks include one or more outputs at a layer, each output having its own set of weights, non-linearities, and pooling.

In another aspect of the method 900, wherein the computation that the algorithm performs includes simultaneous processing of multiple tasks to be performed by the processing circuitry, wherein an output of each task is represented by a unique output data stream. The method may further include implementing the computation that the algorithm performs using one or more networks, the one or more networks include layers that are shared by multiple tasks and task-specific layers that are not shared among tasks. Moreover, the simultaneous processing of multiple tasks may include processing multiple input data streams from the one or more data streams into multiple output data streams.

In another aspect of the method 900, an architecture of at least a portion of the processing circuitry includes a neural network architecture, and the method further includes implementing and executing as part of the neural network architecture one or more neural networks for performing, for the selected mode of operation, the tasks to modify the one or more data streams. In this case, multiple weights of the one or more neural networks may be determined by optimizing a cost function over a set of training data, where the set of training data includes real world content, synthetic data, or both. The method may further include setting multiple weights of the one or more neural networks during manufacturing of the one or more displays or dynamically updating the multiple weights during operation of the one or more displays, where the dynamic updating occurs in response to the one or more data streams being received, in response to a software update, or both. The method may further include hard coding multiple weights of the one or more neural networks into the implementation of the one or more neural networks or storing the multiple weights in memory and accessing the multiple weights from memory for the implementation of the one or more neural networks. The method may further include adjusting multiple weights of the one or more neural networks based on one or more of which data streams are available in the one or more data streams, a content in the one or more data streams for display, a task to be performed to modify the one or more data streams, or an output mode of the one or more displays.

A configuration of each of the one or more neural networks includes one or more of one or more convolutional layers, one or more fully connected layers, one or more pooling layers, one or more up-sampling layers, one or more down-sampling layers, one or more skip or residual connections, one or more dense connections, or one or more feedback connections, one or more sparsely connected layers, one or more long-term or short-term memory units, or one or more recurrent connections The one or more neural networks may include multiple neural networks and the multiple neural networks are concatenated. The one or more neural networks may include multiple neural networks and different neural networks perform different tasks to modify the one or more data streams.

In another aspect of the method 900, at least one of the one or more data streams includes a representation of real world content, synthetic data, or both, that when modified by the processing circuitry produces signals that are provided to the one or more arrays of pixels through the circuit configuration of the one or more backplanes to contribute the rays of light that will generate the particular view or views of the mode of operation.

In another aspect of the method 900, receiving the one or more data streams includes receiving one or more of a two-dimensional (2D) image or a 2D video, multi-colored image or multi-colored video (e.g., RGB image or RGB video), multi-colored image or multi-colored video with depth information, depth information including one or more depth maps, light field or light field video, multiple frames, ray or ray bundles, sequence or sequences of rays or ray bundles, sensory data, audio data, brightness, color of display environment, or both, from the one or more displays, or an estimate of a viewer position with respect to the one or more displays, a viewer head orientation, or a viewer gaze direction. In an example, the depth information includes one or more of depth information for one color stream in a data source, depth information for multiple color streams in a data source, or depth information for all color streams in a data source.

In another aspect of the method 900, the one or more data streams include channels associated with the pixels in the one or more arrays of pixels, each channel including one or more of one or more colors, depth, transparency, embedded features, image segmentation and labeling, directional data, or saliency or importance weights.

In another aspect of the method 900, the one or more data streams include scene description (e.g., metadata), where the scene description is one or more of 2D or 3D objects, material properties, lighting, camera parameters, user or viewer positions, timecode, high-level image features, image segmentation or labeling, or content descriptions.

In another aspect of the method 900, the one or more data streams include one or more of one or more images, images representing view positions or eye positions, one or more stereo pairs representing eye positions, regular or irregular sampling of view positions or eye positions, or one or more light fields.

In another aspect of the method 900, each of the one or more data streams is compressed or is uncompressed.

In another aspect of the method 900, the one or more data streams include information from one or more sensors in the one or more displays, the information including one or more of photosensors recording of brightness and color of the display environment, camera viewing of environment, users, or both, around the one or more displays, microphone recording of environment, users, or both, around the one or more displays, or user input and preferences. The information from the one or more sensors (e.g., the sensor(s) 155) may be received by the processing circuitry (e.g., the display processing circuitry 130) through the one or more data streams, directly from the sensors, or a combination thereof.

In another aspect of the method 900, modifying the one or more data streams (e.g., the modified data streams 850) may include producing one or more of a two-dimensional (2D) image or a 2D video, multi-colored image or multi-colored video with depth information, stereo image or stereo video, rays or bundles of rays, sequences of rays or sequences of ray bundles, light field or light field video, or light field or light field video with multiple multi-color views of a 3D scene.

In another aspect of the method 900, the modified one or more data streams may include channels associated with the pixels in the one or more arrays of pixels, where each channel includes one or more of one or more colors, depth, transparency, embedded features, image segmentation and labeling, directional data, or saliency or importance weights.

In another aspect of the method 900, the modified one or more data streams may include scene description (e.g., metadata), where the scene description is one or more of 2D or 3D objects, material properties, lighting, camera parameters, user or viewer positions, timecode, high-level image features, image segmentation or labeling, or content descriptions.

In yet another aspect of the method 900, the modified one or more data streams may include one or more of one or more images, images representing view positions or eye positions, one or more stereo pairs representing eye positions, regular or irregular sampling of view positions or eye positions, or one or more light fields. Moreover, each of the modified one or more data streams is compressed or is uncompressed.

In yet another aspect of the method 900, performing the tasks by the processing circuitry for modifying the one or more data streams includes performing one or more of converting to a higher resolution having a higher number of total pixels than an original number of pixels or a higher density of pixels than an original density of pixels, producing a higher dynamic range by extrapolating a range beyond an original range, producing multi-colored image or multi-colored video with depth information, producing a stereo image or stereo video, producing one or multiple multi-color views of a 3D scene, producing additional multi-color views of a 3D scene, estimating of a higher resolution model of a scene by combining visual details from multiple frames, or detecting one or both of cuts or jumps in video by measuring a magnitude of visual changes that occur in one or both of scene content or views in the video.

Producing, as part of the method 900, one or multiple multi-color views of a 3D scene further includes performing one or more of a view synthesis operation, a hole-filling operation, a super-resolution operation, a depth adjusting operation, a bandwidth controlling by foveated rendering, or a low-dynamic-range (LDR)-to-high-dynamic-range (HDR) conversion.

In another aspect of the method 900, performing the tasks by the processing circuitry for modifying the one or more data streams includes performing one or more of content classification, correspondence, interpolation and super-resolution, display remapping, user tracking, conversion to multi-view, depth estimation, image segmentation, or estimation of scene properties.

Performing, as part of the method 900, the content classification described above includes providing for dimension reduction to classify individual pixels, 2D features, 3D features, image type, or a combination thereof.

Performing, as part of the method 900, the content classification described above may include classifying content in the one or more data streams, dynamically loading in response to the classification a unique set of multiple weights from different sets of multiple weighs accessible by the processing circuitry, and implementing one or more processing networks in the processing circuitry using the unique set of multiple weights.

Performing, as part of the method 900, the display remapping described above may include performing one or more of an intensity remapping, a brightness remapping, a resolution remapping, an aspect ratio remapping, a color remapping, or a content depth remapping.

Performing, as part of the method 900, the display remapping described above may include performing a depth remapping that provides for an adjustment of weights in the interpolation portion of the interpolation and super-resolution to warp image intensity and disparity to fit within a display depth budget using one or more perceptual metrics.

Performing, as part of the method 900, the display remapping described above may include performing a depth remapping that is applicable when depth information is available or a disparity remapping that is applicable when depth information is not available, where the disparity remapping is used in connection with stereo image or stereo video, and where the method may further include converting the disparity remapping to depth information.

The display remapping described above may be based on one or more remapping parameters, where the one or more remapping parameters are associated with one or both of parameters of the one or more displays or capabilities of the one or more displays, and where the one or both of parameters of the one or more displays or capabilities of the one or more displays include one or more of spatial resolution, angular resolution, dynamic range, or field of view.

Performing, as part of the method 900, the content classification described above provides for classification of data in the one or more data streams based on one or more criteria, and the method further includes dynamically updating, by the processing circuitry, the tasks to be performed by the processing circuitry to modify the one or more data streams in response to the classification.

Performing, as part of the method 900, the interpolation and super-resolution described above provides for one or both of a 2D-to-3D conversion or an LDR-to-HDR conversion.

Performing, as part of the method 900, the display remapping described above includes performing one or more of an intensity remapping, a brightness remapping, a resolution remapping, an aspect ratio remapping, a color remapping, or a content depth remapping.

In another aspect of the method 900, the method 900 may further include modifying the tasks to be performed by the processing circuitry to modify the one or more data streams based on recent frames by adapting the tasks to current scene content, and when the modified tasks includes interpolation, the interpolation may include one or more of spatial interpolation, angular interpolation, or temporal interpolation.

In another aspect of the method 900, the one or more data streams may include multiple frames, and the tasks to be performed by the processing circuitry to modify the one or more data streams may include estimation of a persistent 3D model of a scene by combining and aligning the multiple frames over time.

In another aspect of the method 900, the one or more data streams may include multiple frames, and the tasks to be performed by the processing circuitry to modify the one or more data streams may include estimation of a higher resolution model of a scene by combining visual details from the multiple frames over time.

In yet another aspect of the method 900, the one or more data streams may include video, and the method may further include detecting, by the processing circuitry, one or both of cuts or jumps in the video by measuring a magnitude of visual changes that occur in one or both of scene content or views in the video.

In another aspect of the method 900, the one or more data streams may include multiple scenes, and the method may further include maintaining, by the processing circuitry, one or more of features, weights, or information associated with previously shown scenes.

In another aspect of the method 900, the tasks to be performed by the processing circuitry to modify the one or more data streams may include estimation of depth information for multiple frames from 2D image or video in the one or more data streams.

In another aspect of the method 900, the tasks to be performed by the processing circuitry to modify the one or more data streams may include synthesizing additional pixel data by increasing the pixel data by one or more of spatial resolution, angular resolution, temporal resolution, bit depth, dynamic range, or both, pixel channels including color, depth, spectral sampling, or transparency, directional data, or saliency or importance weights.

In yet another aspect of the method 900, at least some of the tasks to be performed by the processing circuitry to modify the one or more data streams may include adapting content in the one or more data streams based on an architecture and capabilities of the one or more displays including one or more of available spatial resolution, available angular resolution, refresh rate, color gamut, or dynamic range. The at least some of the tasks may include one or more of intensity processing, color processing, white balancing, view interlacing, tone mapping, or correction for display optics.

In another aspect of the method 900, the method 900 may further include calibrated measuring, by the one or more displays, display capabilities and variations in one or more of pixel intensity, color gamut, refresh rate, or dynamic range, where the calibration is performed during manufacturing of the one or more displays or during operation of the one or more displays.

In another aspect of the method 900, the method 900 may further include selectively applying the tasks to be performed by the processing circuitry to modify the one or more data streams to one or more subsets of the pixels in the array of pixels, where the one or more subsets are spatial subsets, angular subsets, or temporal subsets.

In another aspect of the method 900, at least some of the tasks to be performed by the processing circuitry to modify the one or more data streams are configured to analyze multiple frames, where the at least some of the tasks include tracking motion across frames in video content.

In yet another aspect of the method 900, at least one of the tasks to be performed by the processing circuitry to modify the one or more data streams is based at least in part on an estimate of one or more user positions with respect to the one or more displays, the user position being indicated by 2D or 3D head position information, 2D or 3D eye position information, head orientation information, eye orientation information, gaze direction, or a combination thereof.

Accordingly, although the present disclosure has been provided in accordance with the implementations shown, one of ordinary skill in the art will readily recognize that there could be variations to the embodiments and those variations would be within the scope of the present disclosure. Therefore, many modifications may be made by one of ordinary skill in the art without departing from the scope of the appended claims.

What is claimed is:

1. A display configured to support multiple views, comprising:
    at least one array of pixels configured to producing rays of light;
    at least one backplane electronically coupled with the at least one array of pixels; and
    processing circuitry electronically coupled with the at least one backplane,
    wherein the processing circuitry includes a neural network architecture configured to process a data stream of input data received at the display,
    wherein the processing circuitry is configured to:
        receive the data stream of input data,
        select a mode of operation out of a plurality of modes of operation supported by the processing circuitry, each one of the plurality of modes of operation defining rays of light that generate a particular view and tasks to be performed by the processing circuitry to modify the data stream of input data to generate the particular view, and
        provide signaling representative of the data stream so modified to the at least one array of pixels through a circuit configuration of the at least one backplane to contribute the rays of light to generate the particular view, and
    wherein the processing circuitry is configured to use the neural network architecture to process the data stream of input data into a stream of output data including the data stream so modified.

2. The one or more displays of claim 1, wherein the processing circuitry supports one or more modes of operation.

3. The one or more displays of claim 2, wherein the one or more modes of operation include one or more of:
    a first mode of operation in which a single view is generated for all viewers of the one or more displays,
    a second mode of operation in which a different view is generated for each viewer of the one or more displays,
    a third mode of operation in which multiple views are generated for each of one or more viewers of the one or more displays,
    a fourth mode of operation in which one or more views are generated for each of one or more viewers of the one or more displays, or
    a fifth mode of operation in which a single view is generated for one or more viewers of the one or more displays, and one or more views are generated for each of the remaining viewers of the one or more displays.

4. The one or more displays of claim 1, wherein the circuit configuration of the one or more backplanes is a logical arrangement configured to distribute the signaling associated with the modified one or more data streams to specified portions of the one or more arrays of pixels.

5. The display of claim 1, wherein the
    the neural network architecture includes multiple weights stored in the processing circuitry of the display, and
    wherein the processing circuitry is further configured to modify the data stream of input data in accordance with at least one of the multiple weights stored therein.

6. The one of more displays of claim 1, wherein different subsets of pixels in the one or more arrays of pixels are configured to contribute to light directed towards different directions.

7. The one or more displays of claim 1, wherein the pixels in the one or more arrays of pixels are configured to contribute different colors of light and different intensities of light in one or more directions.

8. The one or more displays of claim 1, wherein the one or more arrays of pixels include one or more layers, wherein each layer includes one or more of light producing elements, light absorbing elements, light reflective elements, light transmissive elements, light modifying elements, or optical elements.

9. The one or more displays of claim 8, wherein the optical elements include on or more of lenses, optical barriers, waveguides, fiber optics, switchable optics, directional modifying elements, polarization modifying elements, or light splitting elements.

10. The one or more displays of claim 1, wherein the processing circuitry includes one or more of application specific integrated circuits, field programmable gate arrays, programmable integrated circuits, central processing units, graphics processing units, tensor processing units, neural network integrated circuits, vision processing units, or neuromorphic processors.

11. The one or more displays of claim 1, wherein the processing circuitry includes electronic hardware.

12. The one or more displays of claim 11, wherein the processing circuitry further includes stored instructions to operate the electronic hardware in accordance with the policies and the selected mode of operation.

13. The one or more displays of claim 12, wherein the instructions are in the form of software, firmware, or both.

14. The one or more displays of claim 1, wherein electronic hardware in the processing circuitry includes transistor-level circuitry spatially distributed across the one or more backplanes.

15. The one or more displays of claim 14, wherein the transistor-level circuitry distributed across the one or more backplanes is formed on a same substrate as transistor-level circuitry of the circuit configuration of the backplane.

16. The one or more displays of claim 1, wherein electronic hardware in the processing circuitry includes multiple discrete integrated circuit (IC) units spatially distributed across the backplane, wherein each IC unit is associated with a subset of the array of pixels.

17. The one or more displays of claim 16, wherein the IC units are configured to perform the same functionality.

18. The one or more displays of claim 16, wherein the IC units are configured to perform different functionality.

19. The one or more displays of claim 1, wherein electronic hardware in the processing circuitry includes multiple IC units spatially distributed across the one or more backplanes and transistor-level circuitry that is also spatially distributed across the one or more backplanes.

20. The one or more displays of claim 1, wherein the electronic hardware in the processing circuitry is implemented as a hierarchy of circuits that separate processing tasks spatially, angularly, temporally, by random distribution, by order of arrival, by some other order associated with the one or more data streams, or by a combination thereof.

21. The one or more displays of claim 20, wherein the separate processing tasks in the hierarchy of circuits are processed simultaneously, sequentially, or both.

22. The one or more displays of claim 1, wherein at least one of the one or more data streams includes a representation of real world content, synthetic data, or both, that when modified by the processing circuitry produces signals that are provided to the one or more arrays of pixels through the circuit configuration of the one or more backplanes to contribute the rays of light that will generate the particular view or views.

23. The one or more displays of claim 1, wherein the one or more data streams include one or more of:
a two-dimensional (2D) image or a 2D video,
multi-colored image or multi-colored video,
multi-colored image or multi-colored video with depth information,
depth information including one or more depth maps,
light field or light field video,
multiple frames,
ray or ray bundles,
sequence or sequences of rays or ray bundles,
sensory data,
audio data,
brightness, color of display environment, or both, from the one or more displays, or
an estimate of a viewer position with respect to the one or more displays, a viewer head orientation, or a viewer gaze direction.

24. The one or more displays of claim 23, wherein the depth information includes one or more of:
depth information for one color stream in a data source,
depth information for multiple color streams in a data source, or
depth information for all color streams in a data source.

25. The one or more displays of claim 1, wherein the one or more data streams include channels associated with the pixels in the one or more arrays of pixels, each channel including one or more of:
one or more colors,
depth,
transparency,
embedded features,
image segmentation and labeling,
directional data, or
saliency or importance weights.

26. The one or more displays in claim 1, wherein the one or more data streams include scene description, the scene description being one or more of:
2D or 3D objects,
material properties,
lighting,
camera parameters,
user or viewer positions,
timecode,
high-level image features,
image segmentation or labeling, or
content descriptions.

27. The one of more displays of claim 1, wherein the one or more data streams include one or more of:
one or more images,
images representing view positions or eye positions,
one or more stereo pairs representing eye positions,
regular or irregular sampling of view positions or eye positions, or
one or more light fields.

28. The one or more displays of claim 1, wherein the one or more data streams are compressed.

29. The one or more displays of claim 1, wherein the one or more data streams are uncompressed.

30. The one or more displays of claim 1, wherein the one or more data streams include information from one or more sensors in the one or more displays, the information including one or more of:
photosensors recording of brightness and color of the display environment,
camera viewing of environment, users, or both, around the one or more displays,
microphone recording of environment, users, or both, around the one or more displays, or
user input and preferences.

31. The one or more displays of claim 1, wherein the modified one or more data streams include one or more of:
a two-dimensional (2D) image or a 2D video,
multi-colored image or multi-colored video with depth information,
stereo image or stereo video,
rays or ray bundles,
sequences of rays or sequences of ray bundles,
light field or light field video, or
light field or light field video with multiple multi-color views of a 3D scene.

32. The one or more displays of claim 1, wherein the modified one or more data streams include channels associated with the pixels in the one or more arrays of pixels, each channel including one or more of:
one or more colors,
depth,
transparency,
embedded features,
image segmentation and labeling,
directional data, or
saliency or importance weights.

33. The one or more displays in claim 1, wherein the modified one or more data streams include scene description, the scene description being one or more of:
2D or 3D objects,
material properties,
lighting,
camera parameters,
user or viewer positions,
timecode,
high-level image features,
image segmentation or labeling, or
content descriptions.

34. The one of more displays of claim 1, wherein the modified one or more data streams include one or more of:
one or more images,
images representing view positions or eye positions,
one or more stereo pairs representing eye positions,
regular or irregular sampling of view positions or eye positions, or
one or more light fields.

35. The one or more displays of claim 1, wherein the modified one or more data streams are compressed.

36. The one or more displays of claim 1, wherein the modified one or more data streams are uncompressed.

37. The one or more displays of claim 1, wherein the tasks to be performed by the processing circuitry to modify the one or more data streams include one or more of:
converting to a higher resolution having a higher number of total pixels than an original number of pixels or a higher density of pixels than an original density of pixels,
producing a higher dynamic range by extrapolating a range beyond an original range,
producing multi-colored image or multi-colored video with depth information,
producing a stereo image or stereo video,
producing one or multiple multi-color views of a 3D scene,
producing additional multi-color views of a 3D scene,
estimating of a higher resolution model of a scene by combining visual details from multiple frames, or detecting one or both of cuts or jumps in video by measuring a magnitude of visual changes that occur in one or both of scene content or views in the video.

38. The one or more displays of claim 37, wherein the task of producing one or multiple multi-color views of a 3D scene further includes one or more of:
a view synthesis operation,
a hole-filling operation,
a super-resolution operation,
a depth adjusting operation,
a bandwidth controlling by foveated rendering, or
a low-dynamic-range (LDR)-to-high-dynamic-range (HDR) conversion.

39. The one or more displays of claim 1, wherein the tasks to be performed by the processing circuitry to modify the one or more data streams include one or more of:
content classification,
correspondence,
interpolation and super-resolution,
display remapping,
user tracking,
conversion to multi-view,
depth estimation,
image segmentation, or
estimation of scene properties.

40. The one or more displays of claim 39, wherein the content classification provides for dimension reduction to classify individual pixels, 2D features, 3D features, image type, or a combination thereof.

41. The one or more displays of claim 39, wherein the content classification provides for the classification of content in the one or more data streams, wherein the processing circuitry is further configured to dynamically load in response to the classification a unique set of multiple weights from different sets of multiple weighs accessible by the processing circuitry, and wherein one or more processing networks are implemented in the processing circuitry using the unique set of multiple weights.

42. The one or more displays of claim 39, wherein the display remapping includes one or more of:
an intensity remapping,
a brightness remapping,
a resolution remapping,
an aspect ratio remapping,
a color remapping, or
a depth remapping.

43. The one or more displays of claim 39, wherein the display remapping includes a depth remapping that provides for an adjustment of weights in the interpolation portion of the interpolation and super-resolution to warp image intensity and disparity to fit within a display depth budget using one or more perceptual metrics.

44. The one or more displays of claim 39, wherein the display remapping includes a depth remapping that is applicable when depth information is available or a disparity remapping that is applicable when depth information is not available.

45. The one or more displays of claim 44, wherein the disparity remapping is used in connection with stereo image or stereo video.

46. The one or more displays of claim 44, wherein the processing circuitry is further configured to convert the disparity remapping to depth information.

47. The one or more displays of claim 39, wherein:
the display remapping is based on one or more remapping parameters,
the one or more remapping parameters are associated with one or both of parameters of the one or more displays or capabilities of the one or more displays, and
the one or both of parameters of the one or more displays or capabilities of the one or more displays include one or more of spatial resolution, angular resolution, dynamic range, or field of view.

48. The one or more displays of claim 39, wherein:
the content classification provides for classification of data in the one or more data streams based on one or more criteria, and
the processing circuitry is configured to dynamically update the tasks to be performed by the processing circuitry to modify the one or more data streams in response to the classification.

49. The one or more displays of claim 39, wherein the interpolation and super-resolution provides for one or both of a 2D-to-3D conversion or an LDR-to-HDR conversion.

50. The one or more displays of claim 39, wherein the display remapping includes one or more of:
an intensity remapping,
a brightness remapping,
a resolution remapping,
an aspect ratio remapping,
a color remapping, or
a content depth remapping.

51. The one or more displays of claim 1, wherein:
the processing circuitry is further configured to modify the tasks to be performed by the processing circuitry to modify the one or more data streams based on recent frames by adapting the tasks to current scene content, and
when the modified tasks include interpolation, the interpolation includes one or more of spatial interpolation, angular interpolation, or temporal interpolation.

52. The one or more displays of claim 1, wherein:
the one or more data streams include multiple frames, and
the tasks to be performed by the processing circuitry to modify the one or more data streams include estimation of a persistent 3D model of a scene by combining and aligning the multiple frames over time.

53. The one or more displays of claim 1, wherein:
the one or more data streams include multiple frames, and
the tasks to be performed by the processing circuitry to modify the one or more data streams include estimation of a higher resolution model of a scene by combining visual details from the multiple frames over time.

54. The one or more displays of claim 1, wherein:
the one or more data streams includes video, and
the processing circuitry is further configured to detect one or both of cuts or jumps in the video by measuring a magnitude of visual changes that occur in one or both of scene content or views in the video.

55. The one or more displays of claim 1, wherein:
the one or more data streams include multiple scenes, and
the processing circuitry is configured to maintain one or more of features, weights, or information associated with previously shown scenes.

56. The one or more displays of claim 1, wherein the tasks to be performed by the processing circuitry to modify the one or more data streams include estimation of depth information for multiple frames from 2D image or video in the one or more data streams.

57. The one or more displays of claim 1, wherein the tasks to be performed by the processing circuitry to modify the one or more data streams include synthesizing additional pixel data by increasing the pixel data by one or more of:
spatial resolution,
angular resolution,
temporal resolution,
bit depth, dynamic range, or both,
pixel channels including color, depth, spectral sampling, or transparency,
directional data, or
saliency or importance weights.

58. The one or more displays of claim 1, wherein at least some of the tasks to be performed by the processing circuitry to modify the one or more data streams are configured to adapt content in the one or more data streams based on an architecture and capabilities of the one or more displays including one or more of available spatial resolution, available angular resolution, refresh rate, color gamut, or dynamic range, the at least some of the tasks include one or more of:
intensity processing,
color processing,
white balancing,
view interlacing,
tone mapping, or
correction for display optics.

59. The one or more displays of claim 1, wherein the one or more displays are calibrated to measure display capabilities and variations in one or more of pixel intensity, color gamut, refresh rate, or dynamic range, wherein the calibration is performed during manufacturing of the one or more displays or during operation of the one or more displays.

60. The one or more displays of claim 1, wherein the tasks to be performed by the processing circuitry to modify the one or more data streams are selectively applied to one or more subsets of the pixels in the array of pixels, the one or more subsets being spatial subsets, angular subsets, or temporal subsets.

61. The one or more displays of claim 1, wherein at least some of the tasks to be performed by the processing circuitry to modify the one or more data streams are configured to analyze multiple frames, the at least some of the tasks include tracking motion across frames in video content.

62. The one or more displays of claim 1, wherein at least one of the tasks to be performed by the processing circuitry to modify the one or more data streams is based at least in part on an estimate of one or more user positions with respect to the one or more displays, the user position being indicated by 2D or 3D head position information, 2D or 3D eye position information, head orientation information, eye orientation information, gaze direction, or a combination thereof.

63. The one or more displays of claim 1, wherein capabilities of the one or more displays include one or more of:
ultra-high-resolution capabilities, or
high-dynamic-range capabilities.

64. The one or more displays of claim 63, wherein ultra-high-resolution capabilities include support for resolutions of 8 K and higher.

65. A method for processing at least one data stream on a display supporting multiple views, the display including an array of pixels for producing rays of light, a backplane electronically coupled with the array of pixels, and processing circuitry electronically coupled with the backplane, the method comprising:
receiving a data stream at the processing circuitry;
selecting a mode of operation out of a plurality of modes of operation supported by the processing circuitry, each one of the plurality of modes of operation defining rays of light that generate a particular view and tasks to be performed by the processing circuitry for modifying the data stream to generate the particular view;
processing, in according to the mode of operation so selected, the data stream to obtain a modified data stream; and
providing signaling representative of the modified data stream to the array of pixels through a circuit configuration of the backplane for the array of pixels to generate the particular view
wherein the plurality of modes of operation are implemented using a neural network architecture.

66. The method of claim 65, wherein the processing circuitry supports one or more modes of operation, and the one or more modes of operation include one or more of:
a first mode of operation in which a single view is generated for all viewers of the one or more displays,
a second mode of operation in which a different view is generated for each viewer of the one or more displays,
a third mode of operation in which multiple views are generated for each of one or more viewers of the one or more displays,
a fourth mode of operation in which one or more view are generated for each of one or more viewers of the one or more displays, or
a fifth mode of operation in which a single view is generated for one or more viewers of the one or more displays, and one or more views are generated for each remaining viewer of the one or more displays.

67. The method of claim 65, wherein the circuit configuration of the one or more backplanes is a logical arrangement configured to distribute the signaling associated with the modified one or more data streams to specified portions of the one or more arrays of pixels.

68. The method of claim 65, wherein processing the data stream includes setting multiple weights of the neural network architecture during at least one of: manufacturing of the display, operation of the display, receipt of the data stream, and receipt of a software update as part of the data stream.

69. The method of claim 68, wherein setting multiple weights of the neural network architecture includes hard coding multiple weights of the neural network architecture into the processing circuitry.

70. The method of claim 65, wherein processing the data stream includes adjusting multiple weights of the neural network architecture based on at least one of: the data stream, a content in the data stream, the mode of operation so selected, and an output mode of the display.

71. The method of claim 65, wherein the neural network architecture comprises at least one of:
a convolutional layer,
a fully connected layer,
a pooling layer,
a up-sampling layer,
a down-sampling layer,
a skip connection,
a residual connection,
a dense connection,
a feedback connection, a sparsely connected layer,
a long-term or short-term memory unit, and
a recurrent connection.

72. The method of claim 65, wherein the neural network architecture includes multiple concatenated neural networks.

73. The method of claim 65, wherein the neural network architecture includes multiple neural networks, and wherein each one of the multiple neural networks performs a different task to modify the data stream.

74. The method of claim 65, wherein at least one of the one or more data streams includes a representation of real world content, synthetic data, or both, that when modified by the processing circuitry produces signals that are provided to the one or more arrays of pixels through the circuit configuration of the one or more backplanes to contribute the rays of light that will generate the particular view or views of the mode of operation.

75. The method of claim 65, wherein receiving the one or more data streams includes receiving one or more of:
   a two-dimensional (2D) image or a 2D video,
   multi-colored image or multi-colored video,
   multi-colored image or multi-colored video with depth information,
   depth information including one or more depth maps,
   light field or light field video,
   multiple frames,
   ray or ray bundles,
   sequence or sequences of rays or ray bundles,
   sensory data,
   audio data,
   brightness, color of display environment, or both, from the one or more displays, or
   an estimate of a viewer position with respect to the one or more displays, a viewer head orientation, or a viewer gaze direction.

76. The method of claim 75, wherein the depth information includes one or more of:
   depth information for one color stream in a data source,
   depth information for multiple color streams in a data source, or
   depth information for all color streams in a data source.

77. The method of claim 65, wherein the one or more data streams include channels associated with the pixels in the one or more arrays of pixels, each channel including one or more of:
   one or more colors,
   depth,
   transparency,
   embedded features,
   image segmentation and labeling,
   directional data, or
   saliency or importance weights.

78. The method of claim 65, wherein the one or more data streams include scene description, the scene description being one or more of:
   2D or 3D objects,
   material properties,
   lighting,
   camera parameters,
   user or viewer positions,
   timecode,
   high-level image features,
   image segmentation or labeling, or
   content descriptions.

79. The method of claim 65, wherein the one or more data streams include one or more of:
   one or more images,
   images representing view positions or eye positions,
   one or more stereo pairs representing eye positions,
   regular or irregular sampling of view positions or eye positions, or
   one or more light fields.

80. The method of claim 65, wherein the one or more data streams are compressed.

81. The method of claim 65, wherein the one or more data streams are uncompressed.

82. The method of claim 65, wherein the one or more data streams include information from one or more sensors in the one or more displays, the information including one or more of:
   photosensors recording of brightness and color of the display environment,
   camera viewing of environment, users, or both, around the one or more displays,
   microphone recording of environment, users, or both, around the one or more displays, or
   user input and preferences.

83. The method of claim 65, wherein modifying the one or more data streams includes producing one or more of:
   a two-dimensional (2D) image or a 2D video,
   multi-colored image or multi-colored video with depth information,
   stereo image or stereo video,
   rays or bundles of rays,
   sequences of rays or sequences of ray bundles,
   light field or light field video, or
   light field or light field video with multiple multi-color views of a 3D scene.

84. The method of claim 65, wherein the modified one or more data streams include channels associated with the pixels in the one or more arrays of pixels, each channel including one or more of:
   one or more colors,
   depth,
   transparency,
   embedded features,
   image segmentation and labeling,
   directional data, or
   saliency or importance weights.

85. The method of claim 65, wherein the modified one or more data streams include scene description, the scene description being one or more of:
   2D or 3D objects,
   material properties,
   lighting,
   camera parameters,
   user or viewer positions,
   timecode,
   high-level image features,
   image segmentation or labeling, or
   content descriptions.

86. The method of claim 65, wherein the modified one or more data streams include one or more of:
   one or more images,
   images representing view positions or eye positions,
   one or more stereo pairs representing eye positions,
   regular or irregular sampling of view positions or eye positions, or
   one or more light fields.

87. The method of claim 65, wherein the modified one or more data streams are compressed.

88. The method of claim 65, wherein the modified one or more data streams are uncompressed.

89. The method of claim 65, wherein performing the tasks by the processing circuitry for modifying the one or more data streams includes performing one or more of:
- converting to a higher resolution having a higher number of total pixels than an original number of pixels or a higher density of pixels than an original density of pixels,
- producing a higher dynamic range by extrapolating a range beyond an original range,
- producing multi-colored image or multi-colored video with depth information,
- producing a stereo image or stereo video,
- producing one or multiple multi-color views of a 3D scene,
- producing additional multi-color views of a 3D scene,
- estimating of a higher resolution model of a scene by combining visual details from multiple frames, or
- detecting one or both of cuts or jumps in video by measuring a magnitude of visual changes that occur in one or both of scene content or views in the video.

90. The method of claim 89, wherein producing one or multiple multi-color views of a 3D scene further includes performing one or more of:
- a view synthesis operation,
- a hole-filling operation,
- a super-resolution operation,
- a depth adjusting operation,
- a bandwidth controlling by foveated rendering, or
- a low-dynamic-range (LDR)-to-high-dynamic-range (HDR) conversion.

91. The method of claim 65, wherein performing the tasks by the processing circuitry for modifying the one or more data streams includes performing one or more of:
- content classification,
- correspondence,
- interpolation and super-resolution,
- display remapping,
- user tracking,
- conversion to multi-view,
- depth estimation,
- image segmentation, or
- estimation of scene properties.

92. The method of claim 91, wherein performing the content classification includes providing for dimension reduction to classify individual pixels, 2D features, 3D features, image type, or a combination thereof.

93. The method of claim 91, wherein performing the content classification includes classifying content in the one or more data streams, dynamically loading in response to the classification, a unique set of multiple weights from different sets of multiple weighs accessible by the processing circuitry, and implementing one or more processing networks in the processing circuitry using the unique set of multiple weights.

94. The method of claim 91, wherein performing display remapping includes performing one or more of:
- an intensity remapping,
- a brightness remapping,
- a resolution remapping,
- an aspect ratio remapping,
- a color remapping, or
- a content depth remapping.

95. The method of claim 91, wherein performing display remapping includes performing a depth remapping that provides for an adjustment of weights in the interpolation portion of the interpolation and super-resolution to warp image intensity and disparity to fit within a display depth budget using one or more perceptual metrics.

96. The method of claim 91, wherein performing display remapping includes performing a depth remapping that is applicable when depth information is available or a disparity remapping that is applicable when depth information is not available.

97. The method of claim 96, wherein the disparity remapping is used in connection with stereo image or stereo video.

98. The method of claim 96, further comprising converting the disparity remapping to depth information.

99. The method of claim 91, wherein:
- the display remapping is based on one or more remapping parameters,
- the one or more remapping parameters are associated with one or both of parameters of the one or more displays or capabilities of the one or more displays, and
- the one or both of parameters of the one or more displays or capabilities of the one or more displays include one or more of spatial resolution, angular resolution, dynamic range, or field of view.

100. The method of claim 91, wherein performing the content classification provides for classification of data in the one or more data streams based on one or more criteria, and the method further includes dynamically updating, by the processing circuitry, the tasks to be performed by the processing circuitry to modify the one or more data streams in response to the classification.

101. The method of claim 91, wherein performing the interpolation and super-resolution provides for one or both of a 2D-to-3D conversion or an LDR-to-HDR conversion.

102. The method of claim 91, wherein performing display remapping includes performing one or more of:
- an intensity remapping,
- a brightness remapping,
- a resolution remapping,
- an aspect ratio remapping,
- a color remapping, or
- a content depth remapping.

103. The method of claim 65, further comprising modifying the tasks to be performed by the processing circuitry to modify the one or more data streams based on recent frames by adapting the tasks to current scene content, and when the modified tasks includes interpolation, the interpolation includes one or more of spatial interpolation, angular interpolation, or temporal interpolation.

104. The method of claim 65, wherein:
- the one or more data streams include multiple frames, and
- the tasks to be performed by the processing circuitry to modify the one or more data streams include estimation of a persistent 3D model of a scene by combining and aligning the multiple frames over time.

105. The method of claim 65, wherein:
- the one or more data streams include multiple frames, and
- the tasks to be performed by the processing circuitry to modify the one or more data streams include estimation of a higher resolution model of a scene by combining visual details from the multiple frames over time.

106. The method of claim 65, wherein:
- the one or more data streams includes video, and
- the method further comprising detecting, by the processing circuitry, one or both of cuts or jumps in the video by measuring a magnitude of visual changes that occur in one or both of scene content or views in the video.

107. The method of claim 65, wherein:
the one or more data streams include multiple scenes, and
the method further comprising maintaining, by the processing circuitry, one or more of features, weights, or information associated with previously shown scenes.

108. The method of claim 65, wherein the tasks to be performed by the processing circuitry to modify the one or more data streams include estimation of depth information for multiple frames from 2D image or video in the one or more data streams.

109. The method of claim 65, wherein the tasks to be performed by the processing circuitry to modify the one or more data streams include synthesizing additional pixel data by increasing the pixel data by one or more of:
spatial resolution,
angular resolution,
temporal resolution,
bit depth, dynamic range, or both,
pixel channels including color, depth, spectral sampling, or transparency,
directional data, or
saliency or importance weights.

110. The method of claim 65, wherein at least some of the tasks to be performed by the processing circuitry to modify the one or more data streams include adapting content in the one or more data streams based on an architecture and capabilities of the one or more displays including one or more of available spatial resolution, available angular resolution, refresh rate, color gamut, or dynamic range, the at least some of the tasks include one or more of:
intensity processing,
color processing,
white balancing,
view interlacing,
tone mapping, or
correction for display optics.

111. The method of claim 65, further comprising calibrated measuring, by the one or more displays, display capabilities and variations in one or more of pixel intensity, color gamut, refresh rate, or dynamic range, wherein the calibration is performed during manufacturing of the one or more displays or during operation of the one or more displays.

112. The method of claim 65, further comprising selectively applying the tasks to be performed by the processing circuitry to modify the one or more data streams to one or more subsets of the pixels in the array of pixels, the one or more subsets being spatial subsets, angular subsets, or temporal subsets.

113. The method of claim 65, wherein at least some of the tasks to be performed by the processing circuitry to modify the one or more data streams are configured to analyze multiple frames, the at least some of the tasks include tracking motion across frames in video content.

114. The method of claim 65, wherein at least one of the tasks to be performed by the processing circuitry to modify the one or more data streams is based at least in part on an estimate of one or more user positions with respect to the one or more displays, the user position being indicated by 2D or 3D head position information, 2D or 3D eye position information, head orientation information, eye orientation information, gaze direction, or a combination thereof.

115. A display configured to support multiple views, comprising:
an array of pixels configured to produce light rays;
a backplane electronically coupled with the array of pixels; and
processing circuitry electronically coupled with the backplane,
wherein the processing circuitry includes a neural network architecture configured to process an input data stream received at the display,
wherein the processing circuitry is configured to support a plurality of modes of operation defining a particular set of light rays that generate a particular view and tasks to be performed by the neural network architecture to modify the input data stream to generate the particular view,
wherein the processing circuitry is further configured to:
receive the input data stream,
select a particular mode of operation from the plurality of modes of operation in accordance with the input data stream,
process the input data stream to generate an output data stream in accordance with the particular mode of operation, and
provide signaling representative of the output data stream to the array of pixels through the backplane, where the array of pixels is configured to contribute the particular set of light rays to generate the particular view.

116. The display of claim 115, wherein the display is configured for viewing by a plurality of viewers, and wherein the plurality of modes of operation include at least one of:
a first mode of operation in which a single view is generated for the plurality of viewers,
a second mode of operation in which a different view is generated for each one of the plurality of viewers, and
a third mode of operation in which multiple views are generated for each one of the plurality of viewers.

117. The display of claim 115,
wherein the neural network architecture includes multiple weights stored in the processing circuitry of the display, and
wherein the processing circuitry is further configured to modify the input data stream in accordance with at least one of the multiple weights stored therein.

118. The display of claim 115, wherein different pixels within the array of pixels produce light rays directed toward different directions.

119. The display of claim 115, wherein the array of pixels produces light rays comprising at least two different colors.

120. The display of claim 115, wherein the processing circuitry includes at least one of an application specific integrated circuit, a field programmable gate array, a programmable integrated circuit, a central processing unit, a graphics processing unit, a tensor processing unit, a neural network integrated circuit, a vision processing unit, and a neuromorphic processor.

121. The display of claim 115, wherein the processing circuitry includes transistor-level circuitry distributed across the backplane.

122. The display of claim 121, wherein the transistor-level circuitry is formed on a same substrate as the backplane.

123. The display of claim 115, wherein the input data stream includes at least one of real world content and synthetic data.

124. The display of claim 123, wherein the input data stream includes at least one of:
a two-dimensional (2D) image,
a 2D video,
a multi-colored image,
a multi-colored video, depth information,
a depth map,
a light field image,
a light field video,
sensory data,
audio data,
brightness data,
color of display environment data,
an estimate of a viewer position with respect to the display,
viewer head orientation data, and
viewer gaze direction data.

125. The display of claim 115, wherein the processing circuitry is configured to process the input data stream by performing at least one of:
content classification,
correspondence,
interpolation,
display remapping,
user tracking,
conversion to multi-view,
depth estimation,
image segmentation,
estimation of scene properties,
view synthesis,
hole-filling,
super-resolution,
depth adjusting,
bandwidth controlling by foveated rendering, and
low-dynamic-range to high-dynamic-range (LDR-to-HDR) conversion.

* * * * *